(12) United States Patent
Kurtz et al.

(10) Patent No.: US 8,649,094 B2
(45) Date of Patent: *Feb. 11, 2014

(54) LOW THERMAL STRESS BIREFRINGENCE IMAGING LENS

(75) Inventors: Andrew F. Kurtz, Macedon, NY (US); Joseph R. Bietry, Rochester, NY (US); Barry D. Silverstein, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/784,520

(22) Filed: May 21, 2010

(65) Prior Publication Data

US 2011/0292505 A1 Dec. 1, 2011

(51) Int. Cl.
*G02B 5/30* (2006.01)
*G02B 27/28* (2006.01)
*G02B 3/00* (2006.01)
*G02B 9/00* (2006.01)

(52) U.S. Cl.
USPC ............ 359/489.03; 359/434; 359/489.14; 359/489.18; 359/649; 359/691; 359/708

(58) Field of Classification Search
USPC ............ 359/489.03, 649, 663, 434, 489.02, 359/566, 642, 691, 708, 726, 489.14, 359/489.18
See application file for complete search history.

(56) References Cited

U.S. PATENT DOCUMENTS

| | | |
|---|---|---|
| 583,336 A | 5/1897 | Rudolph |
| 4,441,791 A | 4/1984 | Hornbeck |
| 4,704,011 A | 11/1987 | Mercado |
| 4,770,477 A * | 9/1988 | Shafer ............... 359/355 |
| 4,977,426 A * | 12/1990 | Hirose ............... 355/53 |
| 5,172,275 A | 12/1992 | DeJager |
| 5,535,047 A | 7/1996 | Hornbeck |
| 5,576,854 A | 11/1996 | Schmidt et al. |
| 5,600,383 A | 2/1997 | Hornbeck |
| 5,625,495 A * | 4/1997 | Moskovich ........... 359/663 |
| 6,317,268 B1 | 11/2001 | Harrigan |

(Continued)

FOREIGN PATENT DOCUMENTS

| | | |
|---|---|---|
| WO | 03/009050 | 3/2003 |
| WO | 2004/019077 | 3/2004 |

OTHER PUBLICATIONS

R. Cline et al. "Thermal Stress Birefringence in LCOS Projection Displays", vol. 23, pp. 151-159 (2002).

(Continued)

*Primary Examiner* — Ricky D Shafer
(74) *Attorney, Agent, or Firm* — Kevin E. Spaulding

(57) ABSTRACT

An imaging lens having reduced susceptibility to thermally-induced stress birefringence for imaging an object plane to an image plane; comprising: an aperture stop positioned between the object plane and the image plane; a first group of lens elements located on the object plane side of the aperture stop; and a second group of lens elements located on the image plane side of the aperture stop; wherein the lens elements immediately adjacent to the aperture stop are fabricated using glasses having a negligible susceptibility to thermal stress birefringence as characterized by a thermal stress birefringence metric; and wherein the other lens elements in the first or second groups of lens elements are fabricated using glasses having at most a moderate susceptibility to thermal stress birefringence as characterized by the thermal stress birefringence metric.

14 Claims, 39 Drawing Sheets

(56) References Cited

U.S. PATENT DOCUMENTS

| | | |
|---|---|---|
| 6,774,983 B2 * | 8/2004 | Kuchibhotla ............... 355/67 |
| 6,785,051 B2 | 8/2004 | Allan et al. |
| 6,793,341 B2 | 9/2004 | Svardal et al. |
| 6,795,255 B2 | 9/2004 | Reinecke et al. |
| 6,877,859 B2 * | 4/2005 | Silverstein et al. ............ 353/20 |
| 6,879,379 B2 | 4/2005 | Brunotte et al. |
| 6,909,473 B2 | 6/2005 | Mi et al. |
| 6,958,864 B2 * | 10/2005 | McGuire, Jr. ............... 359/649 |
| 7,170,574 B2 | 1/2007 | Tan et al. |
| 7,357,511 B2 | 4/2008 | Aastuen et al. |
| 7,518,662 B2 | 4/2009 | Chen et al. |
| 7,582,906 B2 | 9/2009 | Kurihara |
| 8,287,129 B2 * | 10/2012 | Kurtz et al. ............... 353/20 |
| 2004/0263989 A1 * | 12/2004 | Cobb et al. ............... 359/634 |
| 2005/0190455 A1 * | 9/2005 | Rostalski et al. ............ 359/649 |
| 2006/0132931 A1 | 6/2006 | Epple et al. |
| 2006/0203359 A1 * | 9/2006 | Yamamoto ............... 359/754 |
| 2006/0268104 A1 | 11/2006 | Cowan et al. |
| 2007/0127121 A1 | 6/2007 | Maximus et al. |
| 2011/0288824 A1 * | 11/2011 | Bietry et al. ............... 703/1 |

OTHER PUBLICATIONS

R. Kingslake, "Lens Design Fundamentals," Academic Press, New York (1978), pp. 36-38.

\* cited by examiner

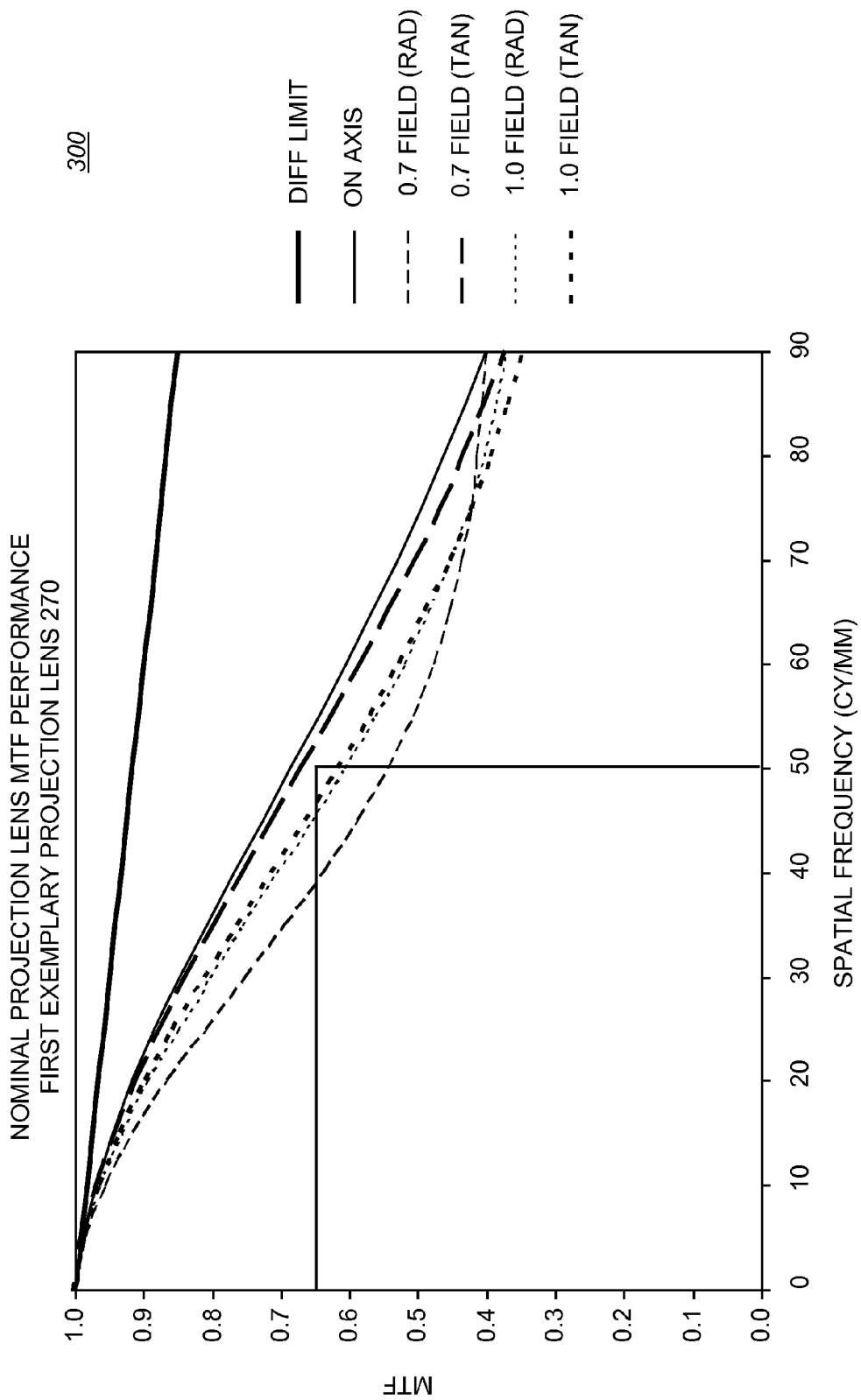

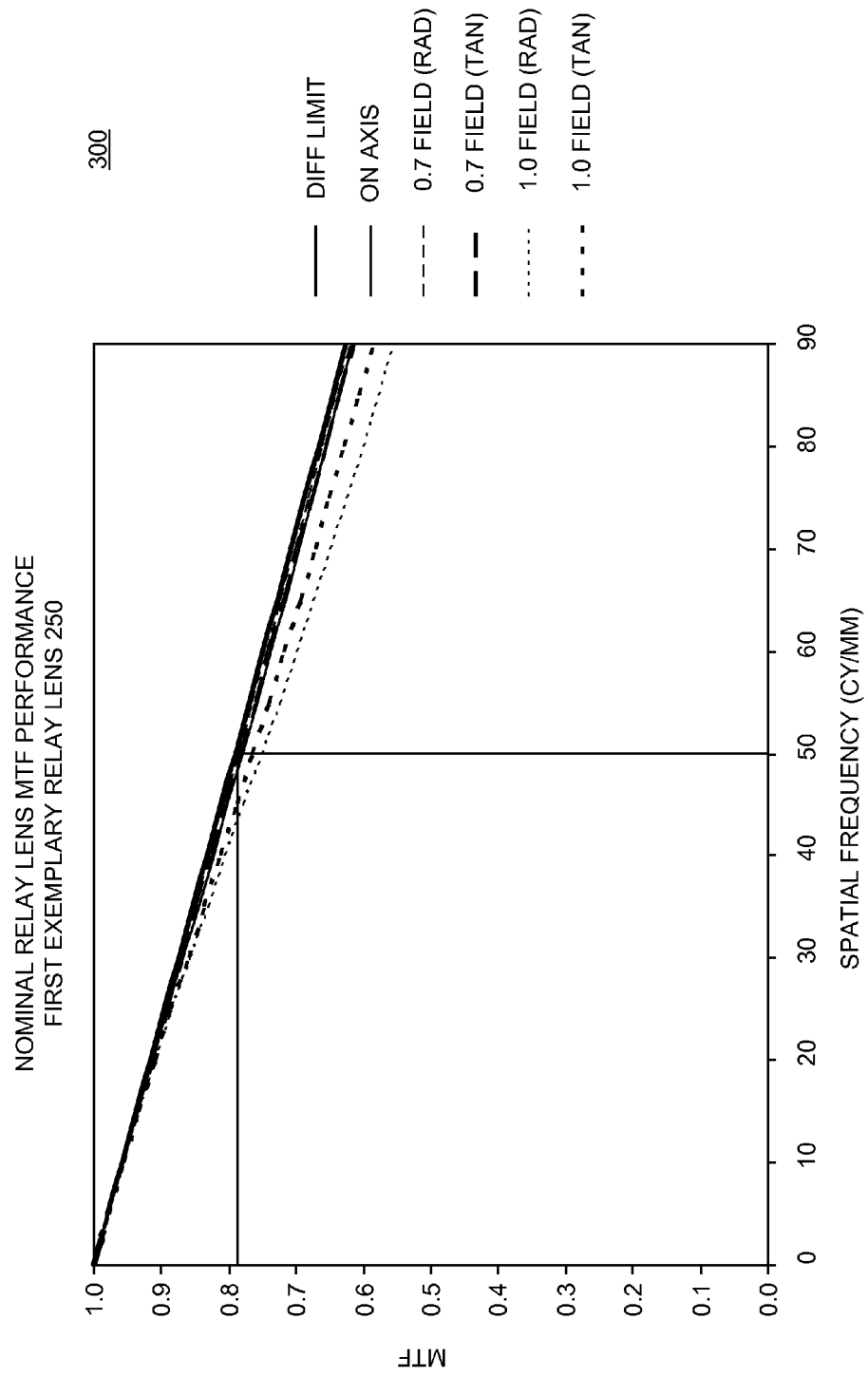

| GLASS | GLASS TYPE | REFRACTIVE INDICES ($n_d$) | ABBE NUMBER ($v_d$) | THERMAL CONDUCTIVITY (k) (W/m-K) | THERMAL COEFFICIENT OF EXPANSION (ρ) ($10^{-6}$/K) | POISSON'S RATIO (μ) | YOUNG'S MODULUS (E) $10^3$ N/mm² | STRESS OPTICAL COEFFICIENT (k) $10^{-6}$ mm²/N | INTERNAL TRANSMITTANCE (t) (FOR 10mm @ 460nm) | ABSORPTION COEFFICIENT (α) (BLUE) mm⁻¹ |
|---|---|---|---|---|---|---|---|---|---|---|
| SCHOTT LITHOSIL-Q | CROWN | 1.458 | 67.83 | 1.31 | 0.50 | 0.170 | 72 | 3.40 | 0.9999 | 0.000010 |
| SCHOTT SF57HHT | FLINT | 1.847 | 23.83 | 0.62 | 8.30 | 0.248 | 54 | 0.02 | 0.9911 | 0.000890 |
| OHARA S-FSL5 | CROWN | 1.487 | 70.23 | 1.01 | 9.00 | 0.227 | 62 | 2.87 | 0.9999 | 0.000010 |
| SCHOTT SF57 | FLINT | 1.847 | 23.83 | 0.62 | 8.30 | 0.248 | 54 | 0.02 | 0.9871 | 0.001300 |
| OHARA PBH56 | FLINT | 1.841 | 24.56 | 0.64 | 8.40 | 0.250 | 59 | 0.09 | 0.995 | 0.000501 |
| SCHOTT N-PK52A | CROWN | 1.497 | 81.61 | 0.73 | 13.0 | 0.298 | 71 | 0.67 | 0.997 | 0.000301 |
| SCHOTT N-FK51A | CROWN | 1.487 | 84.47 | 0.76 | 12.7 | 0.302 | 73 | 0.70 | 0.997 | 0.000301 |
| SCHOTT LLF1 | WEAK FLINT | 1.548 | 45.75 | 0.8 | 8.10 | 0.208 | 60 | 3.05 | 0.998 | 0.000160 |
| OHARA S-FPL53 | CROWN | 1.439 | 94.93 | 0.86 | 14.5 | 0.303 | 69 | 0.57 | 0.996 | 0.000400 |
| SCHOTT F2 | FLINT | 1.620 | 36.37 | 0.78 | 8.20 | 0.220 | 57 | 2.81 | 0.998 | 0.000200 |
| SCHOTT LF5 | FLINT | 1.581 | 40.85 | 0.87 | 9.10 | 0.223 | 59 | 2.83 | 0.998 | 0.000201 |
| OHARA S-NSL36 | WEAK CROWN | 1.517 | 52.43 | 1.09 | 8.00 | 0.139 | 64 | 2.82 | 0.997 | 0.000301 |
| SCHOTT N-BK7 | CROWN | 1.517 | 64.17 | 1.11 | 7.10 | 0.206 | 82 | 2.77 | 0.9972 | 0.000281 |
| SCHOTT SF6 | FLINT | 1.805 | 25.43 | 0.67 | 8.10 | 0.244 | 55 | 0.65 | 0.991 | 0.000904 |
| OHARA S-BAL11 | CROWN | 1.573 | 57.74 | 0.97 | 6.60 | 0.237 | 82 | 2.42 | 0.997 | 0.000301 |
| OHARA S-BAL35 | CROWN | 1.589 | 61.14 | 0.92 | 5.70 | 0.250 | 83 | 2.15 | 0.996 | 0.000401 |
| OHARA S-NSL3 | CROWN | 1.518 | 58.9 | 1.03 | 9.00 | 0.217 | 70 | 2.60 | 0.997 | 0.000301 |
| OHARA S-BSM10 | CROWN | 1.623 | 57.05 | 0.82 | 6.50 | 0.266 | 84 | 1.88 | 0.996 | 0.000401 |
| OHARA S-LAL18 | WEAK CROWN | 1.729 | 54.68 | 0.87 | 5.90 | 0.289 | 120 | 1.58 | 0.996 | 0.000401 |

FIG. 8A

| GLASS | GLASS TYPE | REFRACTIVE INDICES ($n_d$) | ABBE NUMBER ($v_d$) | THERMAL CONDUCTIVITY (k) (W/m·K) | THERMAL COEFFICIENT OF EXPANSION (ρ) ($10^{-6}$/K) | POISSON'S RATIO (η) | YOUNG'S MODULUS (E) $10^3$N/mm² | STRESS OPTICAL COEFFICIENT (k) $10^{-6}$mm²/N | INTERNAL TRANSMITTANCE (τ) (FOR 10mm @ 460nm) | ABSORPTION COEFFICIENT (α) (BLUE) mm⁻¹ |
|---|---|---|---|---|---|---|---|---|---|---|
| SCHOTT SF1 | FLINT | 1.717 | 29.51 | 0.70 | 8.10 | 0.232 | 56 | 1.80 | 0.994 | 0.000645 |
| SCHOTT SF4 | FLINT | 1.755 | 27.58 | 0.65 | 8.00 | 0.241 | 56 | 1.36 | 0.992 | 0.000808 |
| SCHOTT SF2 | FLINT | 1.648 | 33.85 | 0.74 | 8.40 | 0.227 | 55 | 2.62 | 0.995 | 0.000483 |
| OHARA S-LAH66 | WEAK FLINT | 1.772 | 49.6 | 0.85 | 6.20 | 0.291 | 122 | 1.43 | 0.994 | 0.000602 |
| OHARA S-LAL54 | WEAK CROWN | 1.651 | 56.16 | 0.76 | 7.10 | 0.277 | 88 | 1.66 | 0.993 | 0.000703 |
| OHARA S-LAM60 | WEAK FLINT | 1.743 | 49.34 | 0.85 | 5.40 | 0.294 | 113 | 1.9 | 0.993 | 0.000703 |
| OHARA S-LAL61 | WEAK CROWN | 1.740 | 52.64 | 0.86 | 5.70 | 0.291 | 119 | 1.55 | 0.991 | 0.000904 |
| OHARA S-LAM54 | FLINT | 1.757 | 47.82 | 0.89 | 5.70 | 0.292 | 117 | 1.70 | 0.990 | 0.001005 |
| SCHOTT N-SSK8 | WEAK FLINT | 1.618 | 49.83 | 1.14 | 7.21 | 0.251 | 84 | 2.36 | 0.988 | 0.001260 |
| SCHOTT N-SF2 | FLINT | 1.648 | 33.82 | 0.84 | 6.68 | 0.231 | 86 | 3.06 | 0.984 | 0.001613 |
| SCHOTT N-KZFS4 | FLINT | 1.613 | 44.49 | 0.84 | 7.30 | 0.241 | 78 | 3.90 | 0.990 | 0.001005 |
| SCHOTT N-SF4 | FLINT | 1.755 | 27.38 | 0.95 | 9.45 | 0.256 | 90 | 2.76 | 0.959 | 0.004186 |
| OHARA S-NPH2 | FLINT | 1.923 | 18.90 | 0.969 | 6.7 | 0.249 | 99.1 | 3.31 | 0.910 | 0.009431 |

*FIG. 8B*

| GLASS | GLASS TYPE | REFRACTIVE INDICES ($n_d$) | ABBE NUMBER ($v_d$) | $M_1'=\rho\kappa\alpha$ | $M_1''=E/(K(1-\mu))$ | $M_1=\rho\kappa\alpha E/(K(1-\mu))$ |
|---|---|---|---|---|---|---|
| | | | | $10^{-12}$mm/(N-K) | $10^{-6}$N-K/(W-mm) | $10^{-6}$/W |
| SCHOTT LITHOSIL-Q | CROWN | 1.458 | 67.83 | 0.000017 | 66.219 | 0.00113 |
| SCHOTT SF57HHT | FLINT | 1.847 | 23.83 | 0.000148 | 115.820 | 0.01711 |
| OHARA S-FSL5 | CROWN | 1.487 | 70.23 | 0.000258 | 80.035 | 0.02067 |
| SCHOTT SF57 | FLINT | 1.847 | 23.83 | 0.000216 | 115.820 | 0.02501 |
| OHARA PBH56 | FLINT | 1.841 | 24.56 | 0.000379 | 124.304 | 0.04710 |
| SCHOTT N-PK52A | CROWN | 1.497 | 81.61 | 0.002619 | 138.547 | 0.36285 |
| SCHOTT N-FK51A | CROWN | 1.487 | 84.47 | 0.002679 | 137.649 | 0.36882 |
| SCHOTT LLF1 | WEAK FLINT | 1.548 | 45.75 | 0.003961 | 94.697 | 0.37507 |
| OHARA S-FPL53 | CROWN | 1.439 | 94.93 | 0.003313 | 115.682 | 0.38321 |
| SCHOTT F2 | FLINT | 1.620 | 36.37 | 0.004613 | 93.688 | 0.43219 |
| SCHOTT LF5 | FLINT | 1.581 | 40.85 | 0.005164 | 87.683 | 0.45275 |
| OHARA S-NSL36 | WEAK CROWN | 1.517 | 52.43 | 0.006778 | 68.257 | 0.46266 |
| SCHOTT N-BK7 | CROWN | 1.517 | 64.17 | 0.005526 | 92.706 | 0.51231 |
| SCHOTT SF6 | FLINT | 1.805 | 25.43 | 0.00476 | 108.100 | 0.51455 |
| OHARA S-BAL11 | CROWN | 1.573 | 57.74 | 0.004799 | 110.205 | 0.52885 |
| OHARA S-BAL35 | CROWN | 1.589 | 61.14 | 0.004912 | 121.239 | 0.59550 |
| OHARA S-NSL3 | CROWN | 1.518 | 58.9 | 0.007031 | 87.134 | 0.61260 |
| OHARA S-BSM10 | CROWN | 1.623 | 57.05 | 0.004898 | 138.394 | 0.67783 |
| OHARA S-LAL18 | WEAK CROWN | 1.729 | 54.68 | 0.003736 | 194.419 | 0.72640 |

*FIG.8C*

| GLASS | GLASS TYPE | REFRACTIVE INDICES ($n_d$) | ABBE NUMBER ($v_d$) | $M_1' = \rho k\alpha$ | $M_1'' = E/(K(1-\mu))$ | $M_1 = \rho k\alpha E/(K(1-\mu))$ |
|---|---|---|---|---|---|---|
| | | | | $10^{-12}$ mm/(N-K) | $10^{-6}$ N-K/(W-mm) | $10^{-6}$/W |
| SCHOTT SF1 | FLINT | 1.717 | 29.51 | 0.009407 | 103.87 | 0.97707 |
| SCHOTT SF4 | FLINT | 1.755 | 27.58 | 0.008792 | 113.51 | 0.99800 |
| SCHOTT SF2 | FLINT | 1.648 | 33.85 | 0.010628 | 96.805 | 1.02881 |
| OHARA S-LAH66 | WEAK FLINT | 1.772 | 49.6 | 0.005336 | 203.47 | 1.08564 |
| OHARA S-LAL54 | WEAK CROWN | 1.651 | 56.16 | 0.008279 | 159.396 | 1.31967 |
| OHARA S-LAM60 | WEAK FLINT | 1.743 | 49.34 | 0.007207 | 189.751 | 1.36759 |
| OHARA S-LAL61 | WEAK CROWN | 1.740 | 52.64 | 0.007987 | 194.938 | 1.55707 |
| OHARA S-LAM54 | FLINT | 1.757 | 47.82 | 0.009739 | 185.788 | 1.80934 |
| SCHOTT N-SSK8 | WEAK FLINT | 1.618 | 49.83 | 0.021433 | 133.511 | 2.86159 |
| SCHOTT N-SF2 | FLINT | 1.648 | 33.82 | 0.03297 | 98.100 | 3.23432 |
| SCHOTT N-KZFS4 | FLINT | 1.613 | 44.49 | 0.028613 | 122.341 | 3.50059 |
| SCHOTT N-SF4 | FLINT | 1.755 | 27.38 | 0.10919 | 127.334 | 13.90368 |
| OHARA S-NPH2 | FLINT | 1.923 | 18.90 | 0.209153 | 136.179 | 28.48221 |

FIG.8D

THERMAL STRESS BIREFRINGENCE PERFORMANCE
OF THE FIRST EXEMPLARY PROJECTION LENS 270

| ELEMENT | GLASS | THICKNESS (mm) | M1 (10⁻⁶/W) | PEAK POWER (NORMALIZED) | $M_2$ |
|---|---|---|---|---|---|
| 400 | OHARA S-LAM60 | 7.21 | 1.3676 | 0.298 | 2.942 |
| 401 | OHARA S-LAM60 | 5.70 | 1.3676 | 0.525 | 4.094 |
| 402 | SCHOTT SF2 | 2.70 | 1.0288 | 1.000 | 2.778 |
| 403 | SCHOTT SF1 | 2.70 | 0.9771 | 0.382 | 1.009 |
| 404 | OHARA S-LAM60 | 5.35 | 1.3676 | 0.246 | 1.798 |
| 405 | OHARA S-BSM10 | 8.28 | 0.6778 | 0.126 | 0.707 |
| AGGREGATE | | | 6.7865 | | 13.328 |

FIG.9A

THERMAL STRESS BIREFRINGENCE PERFORMANCE OF THE FIRST EXEMPLARY RELAY LENS 250

| ELEMENT | GLASS | THICKNESS (mm) | $M_1$ ($10^{-6}$/W) | PEAK POWER (NORMALIZED) | $M_2$ |
|---|---|---|---|---|---|
| 410 | OHARA S-BAL35 | 10.00 | 0.5955 | 0.080 | 0.4764 |
| 411 | OHARA S-BAL35 | 5.58 | 0.5955 | 0.180 | 0.5981 |
| 412 | SCHOTT SF4 | 4.00 | 0.998 | 0.488 | 1.9481 |
| 413 | SCHOTT SF4 | 4.00 | 0.998 | 1.000 | 3.9920 |
| 414 | OHARA S-LAM54 | 8.00 | 1.8093 | 0.388 | 5.6162 |
| 415 | OHARA S-NSL3 | 14.00 | 0.6126 | 0.336 | 2.8817 |
| 416 | OHARA S-LAM54 | 8.00 | 1.8093 | 0.252 | 3.6476 |
| AGGREGATE | | | 7.4183 | | 19.1601 |

*FIG. 9B*

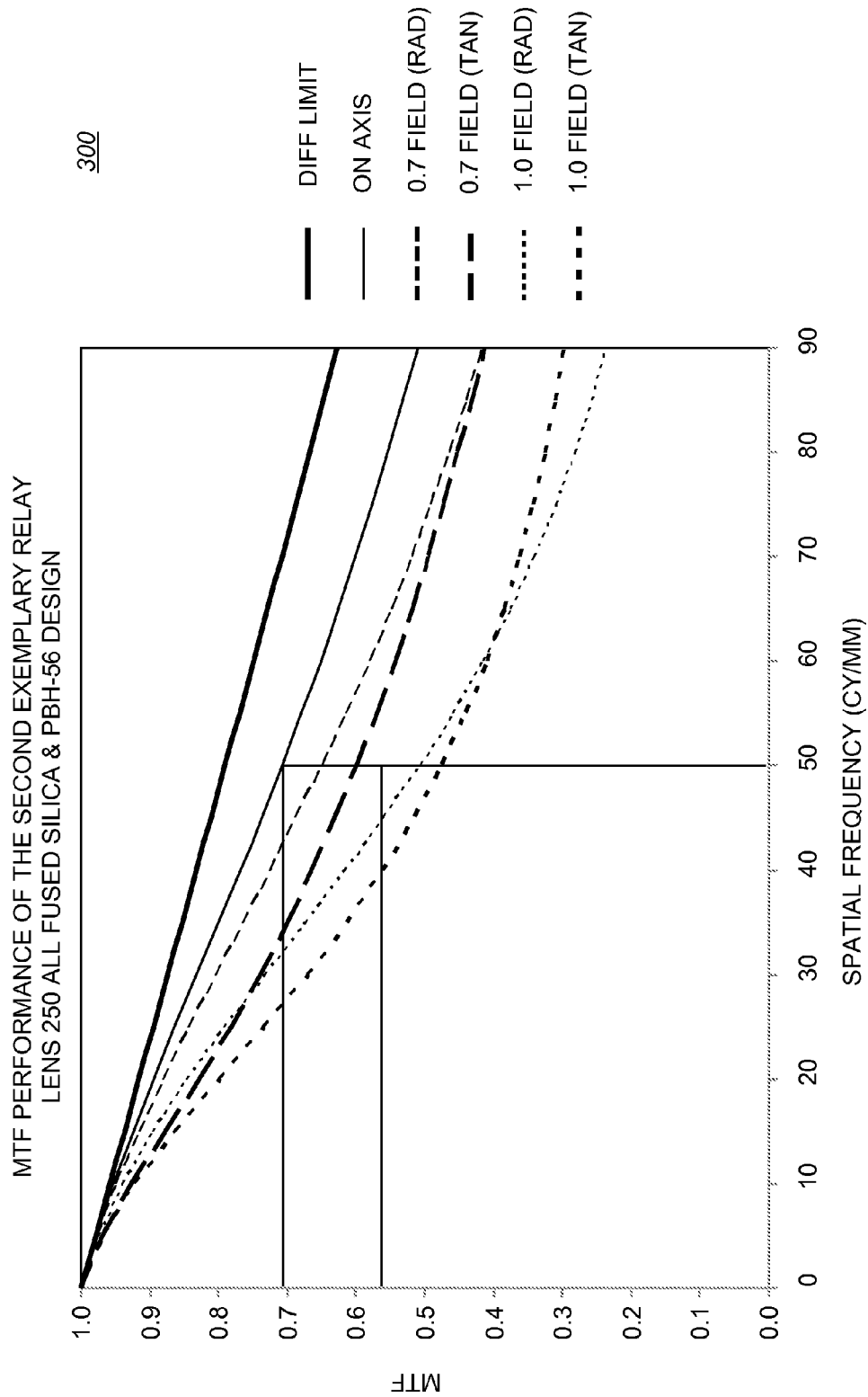

THERMAL STRESS BIREFRINGENCE PERFORMANCE OF THE
SECOND EXEMPLARY PROJECTION LENS 270

| ELEMENT | GLASS | THICKNESS (mm) | $M_1$ ($10^{-6}$/W) | PEAK POWER (NORMALIZED) | $M_2$ |
|---|---|---|---|---|---|
| 420 | SCHOTT LITHOSIL-Q | 6.374 | 0.00113 | 0.298 | 0.002 |
| 421 | SCHOTT LITHOSIL-Q | 7.116 | 0.00113 | 0.378 | 0.003 |
| 422 | OHARA PBH56 | 8.458 | 0.04710 | 0.525 | 0.209 |
| 423 | OHARA PBH56 | 2.700 | 0.04710 | 0.840 | 0.107 |
| 424 | OHARA PBH56 | 2.700 | 0.04710 | 1.000 | 0.127 |
| 425 | OHARA PBH56 | 8.149 | 0.04710 | 0.382 | 0.147 |
| 426 | SCHOTT LITHOSIL-Q | 6.024 | 0.00113 | 0.246 | 0.002 |
| 427 | SCHOTT LITHOSIL-Q | 5.778 | 0.00113 | 0.126 | 0.001 |
| AGGREGATE | | | 0.1929 | | 0.598 |
| IMPROVEMENT RATIO | | | 35.17 | | 22.30 |

FIG.11A

THERMAL STRESS BIREFRINGENCE PERFORMANCE OF
THE SECOND EXEMPLARY RELAY LENS 250

| ELEMENT | GLASS | THICKNESS (mm) | $M_1$ ($10^{-6}$/W) | PEAK POWER (NORMALIZED) | $M_2$ |
|---|---|---|---|---|---|
| 430 | SCHOTT LITHOSIL-Q | 9.998 | 0.00113 | 0.080 | 0.0009 |
| 431 | SCHOTT LITHOSIL-Q | 15.000 | 0.00113 | 0.180 | 0.0031 |
| 432 | SCHOTT SF57 | 5.000 | 0.025012 | 0.488 | 0.0610 |
| 433 | SCHOTT SF57 | 4.000 | 0.025012 | 1.000 | 0.1000 |
| 434 | SCHOTT LITHOSIL-Q | 15.000 | 0.00113 | 0.388 | 0.0066 |
| 435 | SCHOTT LITHOSIL-Q | 9.926 | 0.00113 | 0.336 | 0.0038 |
| 436 | SCHOTT SF57 | 7.000 | 0.025012 | 0.252 | 0.0441 |
| AGGREGATE | | | 0.0796 | | 0.2195 |
| IMPROVEMENT RATIO | | | 93.25 | | 87.291 |

*FIG.11B*

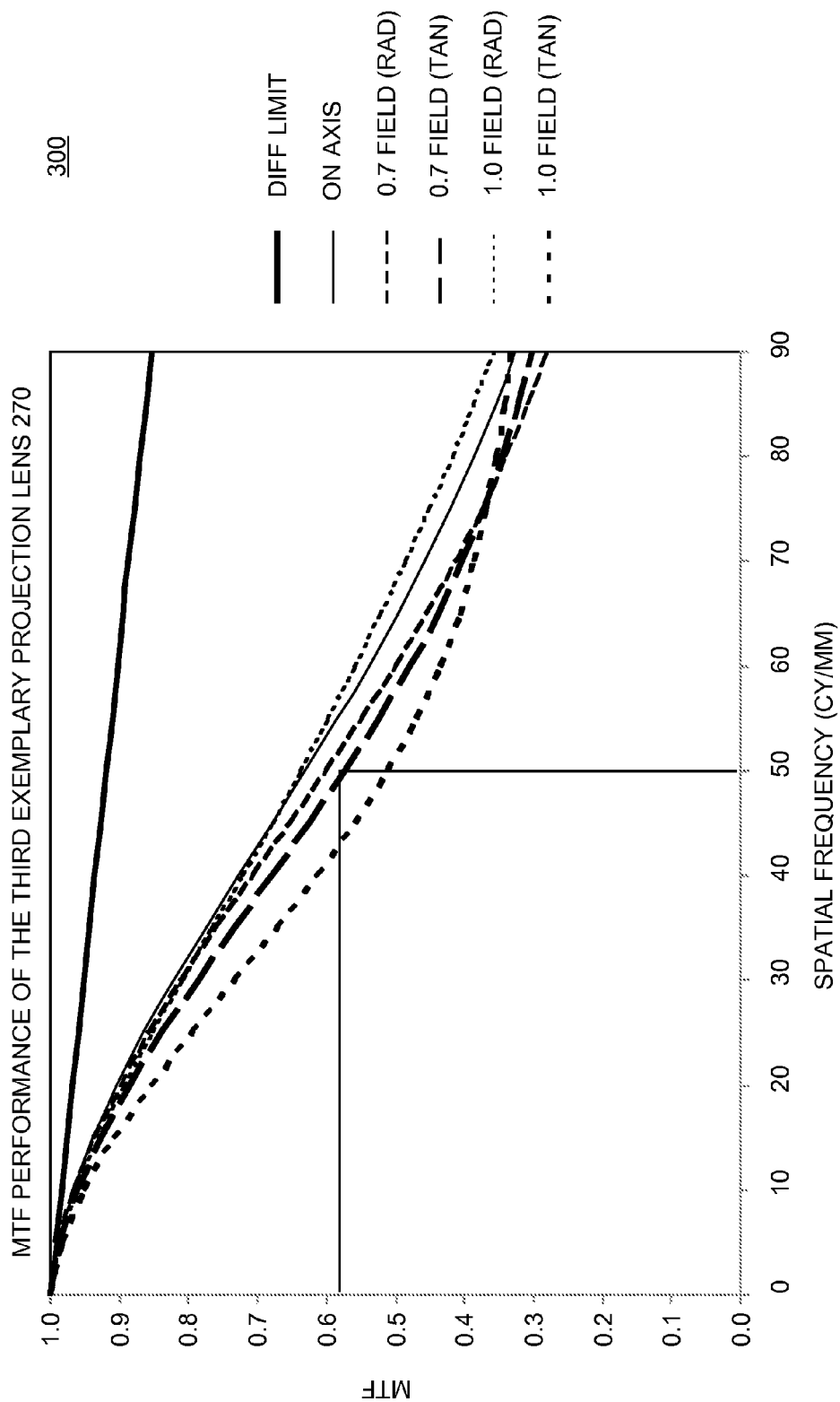

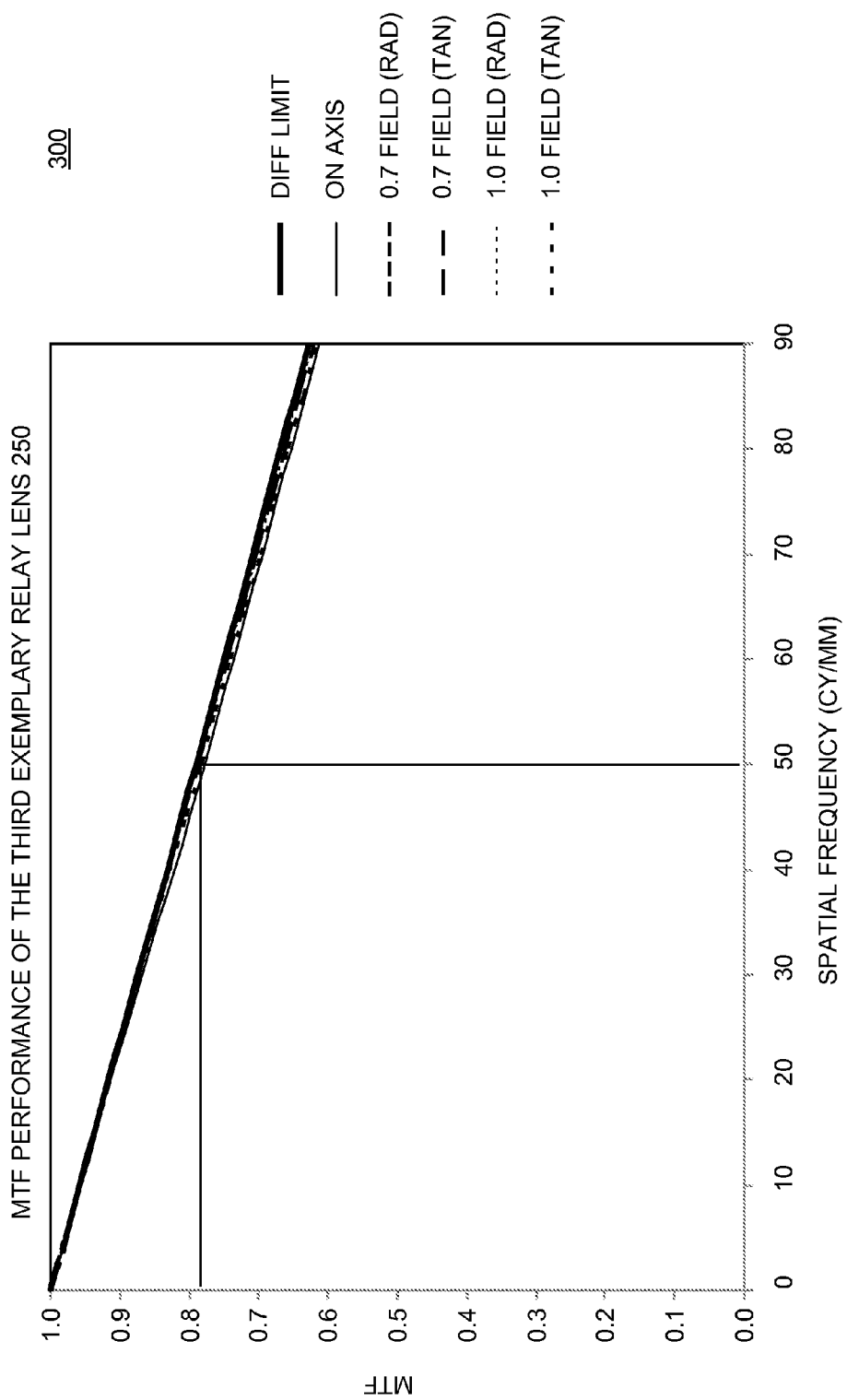

THERMAL STRESS BIREFRINGENCE PERFORMANCE
OF THE THIRD EXEMPLARY PROJECTION LENS 270

| ELEMENT | GLASS | THICKNESS (mm) | $M_1$ ($10^{-6}$/W) | PEAK POWER (NORMALIZED) | $M_2$ |
|---|---|---|---|---|---|
| 440 | OHARA S-LAL18 | 6.98 | 0.7264 | 0.130 | 0.658 |
| 441 | OHARA S-LAL18 | 5.07 | 0.7264 | 0.180 | 0.664 |
| 442 | SCHOTT LITHOSIL-Q | 2.70 | 0.0011 | 0.225 | 0.001 |
| 443 | OHARA PBH56 | 2.50 | 0.0471 | 1.000 | 0.118 |
| 444 | OHARA S-LAL18 | 5.50 | 0.7264 | 0.641 | 2.561 |
| 445 | OHARA S-LAL18 | 8.52 | 0.7264 | 0.124 | 0.765 |
| AGGREGATE | | | 2.9538 | | 4.767 |
| IMPROVEMENT RATIO | | | 2.30 | | 2.80 |

FIG.13A

THERMAL STRESS BIREFRINGENCE PERFORMANCE OF THE THIRD EXEMPLARY RELAY LENS 250

| ELEMENT | GLASS | THICKNESS (mm) | $M_1$ ($10^{-6}$/W) | PEAK POWER (NORMALIZED) | $M_2$ |
|---|---|---|---|---|---|
| 450 | OHARA S-LAL18 | 7.73 | 0.72640 | 0.2752 | 1.5453 |
| 451 | SCHOTT LITHOSIL-Q | 8.97 | 0.00113 | 0.5110 | 0.0052 |
| 452 | OHARA PBH56 | 5.0 | 0.04710 | 0.5781 | 0.1361 |
| 453 | OHARA PBH56 | 4.13 | 0.04710 | 1.0000 | 0.1945 |
| 454 | OHARA S-LAL18 | 11.88 | 0.72640 | 0.5842 | 5.0415 |
| 455 | OHARA S-LAL18 | 11.43 | 0.72640 | 0.1988 | 1.6502 |
| 456 | OHARA PBH56 | 9.53 | 0.04710 | 0.1484 | 0.0666 |
| AGGREGATE | | | 2.3217 | | 8.6395 |
| IMPROVEMENT RATIO | | | 3.195 | | 2.218 |

FIG.13B

| SURFACE | RADIUS (mm) | THICKNESS (mm) | APERTURE (mm) | GLASS |
|---|---|---|---|---|
| OBJECT (SCREEN) | INFINITY | | | |
| 1 | 33.628 | 8.5200 | 41.599 | SLAL18 OHARA |
| 2 | 162.829 | 9.2600 | 39.409 | |
| 3 | 23.032 | 5.5000 | 22.890 | SLAL18 OHARA |
| 4 | 55.548 | 0.6160 | 18.568 | |
| 5 | 158.100 | 2.5000 | 18.287 | PBH56 OHARA |
| 6 | 16.467 | 1.7600 | 14.164 | |
| 7 | | 13.0340 | 13.975 | (STOP) |
| 8 | −16.900 | 2.7000 | 20.415 | SIO2 SCHOTT |
| 9 | −245.900 | 0.5300 | 25.704 | |
| 10 | −109.408 | 5.0700 | 25.847 | SLAL18 OHARA |
| 11 | −30.893 | 0.5000 | 27.948 | |
| 12 | 59.970 | 6.9800 | 32.320 | SLAL18 OHARA |
| 13 | −59.970 | 23.8813 | 32.662 | |
| IMAGE (INT IMG) | INF | | 28.016 | |

FIG.14A

| SURFACE | RADIUS (mm) | THICKNESS (mm) | APERTURE (mm) | GLASS |
|---|---|---|---|---|
| OBJECT (DLP) | | 171.0000 | | |
| 1 | 158.5630 | 7.7300 | 54.6919 | SLAL18 OHARA |
| 2 | -158.5630 | 27.3000 | 54.5364 | |
| 3 | 57.8650 | 8.9700 | 42.5011 | SIO2 SCHOTT |
| 4 | INF | 1.3100 | 40.0894 | |
| 5 | -204.2040 | 5.0000 | 39.8404 | PBH56 OHARA |
| 6 | 277.8740 | 54.4900 | 37.9682 | |
| 7 | INF | 52.5400 | 15.8749 | APERTURE STOP |
| 8 | -21.9660 | 4.1300 | 22.9547 | PBH56 OHARA |
| 9 | 168.8000 | 2.9000 | 27.8491 | |
| 10 | -70.6670 | 11.8800 | 29.1486 | SLAL18 OHARA |
| 11 | -38.6200 | 8.9900 | 37.7977 | |
| 12 | -328.6680 | 11.4300 | 50.1425 | SLAL18 OHARA |
| 13 | -42.7620 | 73.3300 | 52.1954 | |
| 14 | 52.1840 | 9.5300 | 48.0193 | PBH56 OHARA |
| 15 | 86.3170 | 43.1900 | 44.7866 | |
| INT IMAGE | | | 26.9214 | |

*FIG.14B*

LOW THERMAL STRESS BIREFRINGENCE IMAGING LENS

CROSS-REFERENCE TO RELATED APPLICATIONS

Reference is made to commonly assigned, U.S. Patent Application Publication No. 2011/146273, entitled "Designing Lenses Using Stress Birefringence Performance Criterion", by Bietry et al.; and to commonly assigned, U.S. Pat. No. 8,287,129, entitled "Low Thermal Stress Birefringence Imaging System", by Kurtz et al., each of which is incorporated herein by reference.

FIELD OF THE INVENTION

The present invention relates to optical imaging systems, and more particularly to imaging lens having a low sensitivity to stress birefringence induced by the thermal load imparted by the transiting light.

BACKGROUND OF THE INVENTION

Projection and electronic display systems are widely used to display image content. In the case of projection systems, whether the traditional film based systems, or the newer electronic systems, light from a light source (typically a lamp) is directed to an image modulation element (such as film or one or more spatial light modulators) that imparts image data to the transiting light. Typically the film or light modulator arrays are then imaged to the display surface or screen.

As another aspect, there is growing interest in high-quality projection systems that display 3 dimensional (3D) or perceived stereoscopic content in order to offer consumers an enhanced visual experience. Historically, stereoscopic content was projected in theaters using film media, such that two sets of films are loaded to two separate projection apparatus, one for each eye. Left- and right-eye images are then simultaneously projected using polarized light, where one polarization is used for the image presented to the left eye; light of the orthogonal polarization is then used for the image presented to the right eye. Audience members wear corresponding orthogonally polarized glasses that block one polarized light image for each eye while transmitting the orthogonal polarized light image.

Recently, electronic or digital cinema projectors that provide stereo projection have been commercialized. In particular, projectors based on the Digital Light Processor (DUP) or Digital Micro-mirror Device (DMD), developed by Texas Instruments, Inc., Dallas, Tex., are used in theatres in both stereo and non-stereo versions. DLP devices are described in a number of patents, for example U.S. Pat. Nos. 4,441,791, 5,535,047 and 5,600,383 (all to Hornbeck).

FIG. 1A shows a simplified block diagram of a projector 100 that uses DLP spatial light modulators. A light source 50 (typically a xenon arc lamp) provides polychromatic unpolarized light into a prism assembly 55, such as a Philips prism, for example. Prism assembly 55, which is shown as a Philips prism, splits the polychromatic light into red, green, and blue component wavelength bands and directs each band to a corresponding spatial light modulator (SLM) 170r, 170g, or 170b. Prism assembly 55 then recombines the modulated light from the spatial light modulators 170r, 170g, and 170b and provides this unpolarized light to an imaging lens 200 for projection onto a display screen or other suitable surface. DLP-based projectors have demonstrated the capability to provide the necessary light throughput, contrast ratio, and color gamut for most projection applications from desktop to large cinema. Alternately, liquid crystal devices (LCDs), which modulate light by altering polarization states of transiting light, can be used instead of DLP devices, with comparative benefits of higher resolution and larger device size, but greater difficulty in delivering contrast, contrast uniformity, and color uniformity for the projected image.

Conventional methods for forming stereoscopic images from these SLM-based projectors (DLP or LCD) use either of two primary techniques to distinguish between the left- and right-eye content. One less common technique, utilized by Dolby Laboratories, for example, uses color space separation, such as described in U.S. Patent Application Publication 2007/0127121 by Maximus et.al. Filters are used in the white-light illumination system to momentarily block out portions of each of the primary colors for a portion of the frame time. The appropriate color adjusted stereo content that is associated with each eye is then presented to each modulator for the eye. The viewer wears a corresponding filter set that similarly transmits only one of the two 3-color (RGB) spectral sets. Color space separation avoids problems in handling polarized light from the projector, at the screen, and with the viewer's glasses, but light inefficiencies and the cost of the glasses are problematic.

The second method for forming stereoscopic images uses polarized light. For example U.S. Pat. No. 6,793,341, by Svardal et al. describes a method in which the two orthogonal polarization states are provided by separate spatial light modulators and projected simultaneously onto the screen, which typically has properties to preserve the polarization states of the reflected light. The viewer wears polarized glasses with polarization transmission axes for left and right eyes orthogonally oriented with respect to each other. Although this arrangement offers efficient use of light, it can be an expensive configuration.

Another approach, commercialized by Real-D, Beverly Hills, Calif., uses a conventional projector modified to modulate alternate polarization states that are rapidly switched from one to the other. In particular, as shown in FIG. 1A, a DLP projector is modified to have a polarizer and polarizer switching device placed in the output path of the light, such as at a position 90 indicated by a dashed line in FIG. 1A. The polarization switcher is required, since DLP projectors output modulated, but unpolarized light. This output is unpolarized because unpolarized light sources (lamps) are used, and the typical DLP device windows are depolarizing (due to stress induced birefringence). An achromatic polarization switcher, such as that of U.S. Pat. No. 7,528,906 to Robinson et al. can be placed at position 90 after the polarizer. A switcher of this type (the ZScreen™) alternately rotates polarized light between two orthogonal polarization states, such as linear polarization states, to allow the presentation of two distinct images, one to each eye, while the user views the projected image with polarized glasses.

Because the polarization contrast specifications for the polarizer are modest (~50:1) as a trade-off to boost polarizer efficiency, image crosstalk between the left-eye and right-eye images can occur. This can cause viewers to experience ghost images, for example such that the left eye not only sees a bright left-eye image but a dim right-eye image. Real-D provides a variety of solutions to this problem, including the use of real time digital pre-processing of the image content to reduce ghosting in image. In particular, a digital processor applies a crosstalk model to predict potential ghosting by comparing the left- and right-eye images, and then it subtracts the predicted ghost image. U.S. Patent publication 2006/0268104 to M. Cowan et al., entitled "Ghost-compensation for improved stereoscopic projection", expands upon this approach. As another example, in U.S. Pat. No. 7,518,662 by Chen et al., the polarization contrast of the ZScreen switcher is improved with a tilted polarization compensator.

For a variety of reasons, including improving light efficiency, expanding color gamut, increasing light source lifetime and reducing ongoing replacement costs, there is continuing impetus to replace the traditional lamps (such xenon arc, tungsten halogen, or UHP) with solid state light sources (such as lasers or LEDs) in projectors, whether 2-D or 3-D. However, to date, the desire for laser-based projection systems has been unfulfilled, in part as compact, robust, low-to-moderate cost, visible wavelength laser technologies had not emerged in a commercializable form, particularly for green and blue. With the recent emergence of blue diode lasers and compact green SHG lasers, low cost, laser based, pico-projectors from companies such as Microvision are reaching the market place.

In parallel, similar obstacles for compact high power visible lasers capable of supporting digital cinema projection have also started to disappear, as companies such as Laser Light Engines (Salem, N.H.) and Necsel (Milpitas, Calif.) have demonstrated prototype or early product laser devices. For example, Necsel (previously known as Novalux) offers green (532 nm) and blue (465 nm) laser arrays, each of which provides 3-5 Watts of optical output power. At these power levels, and allowing for system efficiency losses, a modest sized projector (~1500 lumens output) for a large conference room or a home theatre, can be achieved using a single laser device per color. However, in the case of cinema, the on-screen luminance requires 10,000-40,000 lumens or 40-170 Watts of combined optical power (flux) incident to the screen, depending on screen size and screen gain. In turn, allowing for internal optical efficiency losses, this means that 40-120 Watts of optical power is required from the laser sources in each color channel. Presently, these power levels can only be accomplished by optically combining the output of multiple laser arrays in each color channel. Eventually, the laser technologies may advance such that a single compact laser device can drive each color. Of course, each approach has its advantages and disadvantages, relative to trade-offs of simplicity, cost, and susceptibility to laser failure.

Simplistically, a digital cinema projector can be provided by replacing the conventional lamp used for the light source 50 of FIG. 1A with a multitude of laser devices. Moreover, as lasers are inherently polarized light sources, more efficient 3D projection can be provided, as the polarization switcher is used at position 90, without an accompanying polarizer. However, this simplistic view is unrealistic for high power laser-based projection applications such as for digital cinema. As just suggested, a projection system providing 40-170 optical watts on screen is subjected to much higher light levels internally, with the highest light levels (in flux or watts) occurring at the light source assemblies, and the lowest likely at the output surface of the projection lens. Because of its spatial and temporal coherence, laser light focuses into smaller volumes with higher power densities than light beams from incoherent (lamp) sources, even when flux levels are comparable. The highest internal power densities occur in places where the light is concentrated, such as at an integrating bar, the spatial light modulators, aperture stops, or intermediate images. Of course, these high light levels can bring accompanying thermal issues, as illumination light, imaging light, or even stray light encounters internal surfaces or materials. There are already numerous problems caused by the intense light in conventional lamp based systems, some of which will only be amplified in laser-based systems. For example, in a lamp-based system, the input aperture of the integrating bar, which receives high intensity focused light and surrounding stray light from the lamp, is typically surrounded with an air-cooled heat sink assembly. As another example, in digital cinema projection systems, the spatial light modulators are typically cooled with circulating chilled water.

At such high light levels, the intense light (and particularly residual UV light) can also impact the performance or reliability of materials, including optical adhesives, cements, or polymers used in prism elements, doublets, or liquid crystal devices. As a result, these materials must be chosen carefully to avoid induced degradation from thermal or chemical changes. Likewise, induced mechanical stresses from mismatched coefficients of thermal expansion of the optical elements or their mounting assemblies must also be minimized or managed to avoid stress, deformation, or breakage.

As one particularly subtle effect, which effects polarization based projection systems, including those for 3D projection, small portions of the high light intensity light can be absorbed by the optical materials, thereby inducing stress birefringence with the elements. That in turn can change the polarization orientations of the transiting light, thereby impacting image contrast, image contrast uniformity, color uniformity or other attributes that reduce the perceived on-screen image quality.

In the case of spatial light modulator devices, and liquid crystal on silicon (LCOS) devices in particular, a problem can occur where the intense light causes thermal loading and stress birefringence in the counter electrode substrate, which is internal to the device itself. To give further context, FIG. 1B illustrates a prior art projector 101, in which incident illumination light beams 140 are directed into respective modulation optical systems 80 for each color, which are projector sub-systems that comprise a polarization beamsplitter 60 (also known as a polarization prism), a polarization compensator 360, and a spatial light modulator 170g, 170b or 170r. The modulated beams from the modulation optical systems 80 are combined using an X-prism 65, and directed to projection lens 270 for projection onto a display screen (not shown). Typically, the polarization behavior and properties of these components within the modulation optical system 80 determines the on-screen polarization contrast provided by the projector 101.

The counter electrode substrate (not shown) is a thin plate of optical glass that is laid parallel to the silicon substrate within LCD spatial light modulators 170g, 170b and 170r. Liquid crystal materials, as well as pixel structures formed into (or on) the silicon, then fill the thin gap between these substrates. The counter electrode substrate is coated with a patterned transparent electrode (typically of ITO), to enable electric fields to be applied between the substrates to control the orientations of the liquid crystal molecules on a pixel wise basis.

This structure works well at low light intensities, such that the polarization orientations commanded by the pixels are maintained as the light transits the counter electrode substrate, and the resulting polarized image light can then encounter downstream polarization optics, such as polarization beam splitters, analyzers, or switches, with the polarized image light having the intended orientations. However, under high light intensities, the portion of the light transiting the counter electrode substrate that is absorbed can cause sufficient internal heating to induce stress birefringence, which in turn alters polarization orientations.

In recognition of this problem, U.S. Pat. No. 5,576,854 to Schmidt et al., proposes a method for identifying optimal glasses that can be used to fabricate the counter electrode substrate of an LCOS panel. In particular, they proposed a figure of merit M for identifying candidate glasses given by the product:

$$M = \rho E \kappa \quad (1)$$

where ρ is the coefficient of thermal expansion (CTE), κ is the stress optical coefficient, and E is the modulus of elasticity (E). Schmidt et al. identified two glasses as particularly valuable candidates; Schott SF-57 for its unusually low stress optical coefficient, and fused silica for its unusually low coefficient of thermal expansion. According to Schmidt et al., in the case of fused silica, heating causes minimal expansion of the glass, which in turn cause little thermally induced stress. In the case of SF-57, the thermal stress coefficient itself is very low, which means little direct translation of heat into stress birefringence. As alluded to earlier, a similar problem presently exists with the cover glass windows for DLP modulators; but as these devices have generally not been used to modulate intense polarized light with an expectation of maintaining polarization states, neither the glass selection nor the glass mounting design were undertaken with the goal of minimizing stress birefringence.

The relationship of glass selection and thermal stress birefringence in projection displays is also explored in the article "Thermal Stress Birefringence in LCOS Projection Displays", by R. Cline et al., which was published in Displays, Vol. 23, pp. 151-159, 2002. This article is concerned with identifying glasses appropriate for use in polarization beam-splitters 60 (FIG. 1B) or Philips prism assemblies 55 (FIG. 1A) in projection display systems. In particular, the authors introduce an expanded figure of merit for assessing candidate glasses that includes not only the coefficient of thermal expansion (ρ), the stress optical coefficient (κ), and the modulus of elasticity (E), but also the glass thermal conductivity (K), light absorption (α), and Poisson's ratio (μ):

$$M = \frac{\alpha \rho E \kappa}{K(1-\mu)} \quad (2)$$

Cline et al. propose that only Schott SF-57, Ohara PBH56, and fused silica can be used in prisms for high power polarization sensitive projectors (1000+ lumens), while a wider range of glasses, including Schott SK5 or Schott BK7, can be used for prisms in low power (≤500 lumen) projectors.

In contrast, in U.S. Pat. No. 7,357,511 to Aastuen et al., the inventors suggest that the glasses proposed by Cline et al., for satisfactory low stress birefringence (such as Schott SK5 or Schott BK7) are actually inadequate, and that contrast degradation from these alternate glasses is actually too large. Aastuen et al. then propose an alternate modulation optical system 80 where the polarization contrast of the polarization beamsplitter 60 can be improved relative to stress birefringence in the glass comprising the prism, including thermally induced stress birefringence, by providing a polarization compensator 360 between the polarization beamsplitter 60 and the spatial light modulator 170 (see FIG. 1B). They provide evidence that a polarization compensator 360 having a quarter wave of retardance can provide sufficient compensation for stress birefringence such that the prism glass choice is no longer limited to low stress optical coefficient (κ) glasses, such as Schott SF-57.

It is also noted that unwanted birefringence has caused image quality problems in fields outside of the projection space, including in the area of micro-lithography. For example, in U.S. Pat. No. 6,785,051 to Allan et al., describes a refractive/reflective imaging system directed at 200 nm UV microlithography. In that spectral range, the very small selection of available optical materials is dominated by crystalline materials such as calcium fluoride ($CaF_2$) that exhibit significant intrinsic birefringence. In order to reduce the accumulative birefringence or polarization state changes in the optics, Allan et al. provide one or more corrective optical elements (optical plates or beam-splitters) which are also fabricated from the same type of intrinsically birefringent materials. In this case, a corrective photoelastic birefringence is provided by an externally applied stress or strain (from tensile, compressive or shear stress) which was imparted to the corrective element by mechanical fixturing, a piezoelectric actuator, a thermal element or other stress inducer.

Likewise, U.S. Pat. No. 6,879,379 to Brunotte et al., also discloses a UV microlithographic imaging system using lens elements comprising intrinsically birefringent materials such as $CaF_2$ and a corrective element. The intrinsic birefringence imparts unwanted polarization rotation effects with position and angle. In this case, the corrective element is an optical plate or lens which is located proximate to an aperture stop, and which is also made from $CaF_2$. Mechanical stresses are then applied in a pulsed fashion using piezoelectric actuators, so as to impart stress birefringence to the element that compensates for the angle dependent polarization effects caused by the intrinsic birefringence.

While interesting, the solutions of Brunotte et al. ('379) and Allan et al. ('051) apply to imaging systems using a limited set of intrinsically birefringent materials. By comparison, the solutions provided by Schmidt et al. ('854), Cline et al., and Aastuen et al. ('511) were developed in the context of lamp-based projection systems that were targeted for low power applications, but are potentially extendable to digital cinema. However, these solutions are narrowly targeted at the optical components (cover glasses and prisms) within the modulation optical systems 80 for a projector 101.

In laser projection systems the localized light intensities and power densities can be appreciably higher as compared to white-light systems, due to the coherence or focusing power of the laser light, and thermal effects can be induced throughout an optical system. In extreme cases, optical self-focusing effects in non-linear optical materials can cause optical damage or breakdown.

In the case of laser-based digital cinema projectors, while permanent damage mechanisms such as self-focusing are likely not germane, other thermal effects such as thermally induced stress birefringence can affect optical elements, including components other than those residing in the modulation optical subsystems, such as the prism assemblies, spatial light modulators, or cover plates or counter electrode substrate therein. In particular, the design and use of imaging lens assemblies, which comprise a complex multitude of lens elements, and which are tasked to image intense laser light while not being subject to thermally induced stress birefringence and resulting polarization effects, is a concern, particularly at the digital cinema power levels, which are much higher than managed previously for stress birefringence. As is known to those skilled in the lens design arts, an imaging lens assembly utilizes an arrangement of non-planar lens elements, whose materials, thicknesses, curvatures, and relative placements are carefully designed to provide the desired image quality, relative to aberrations and diffraction. However, the added complexity of further controlling thermally induced stress birefringence, relative to the design of an imaging lens system and the constituent lens elements, is a problem that is neither taught nor anticipated in the prior art.

SUMMARY OF THE INVENTION

The present invention represents an imaging lens having reduced susceptibility to thermally-induced stress birefringence for imaging an object plane to an image plane; comprising:

an aperture stop positioned between the object plane and the image plane;

a first group of lens elements located on the object plane side of the aperture stop; and a second group of lens elements located on the image plane side of the aperture stop;

wherein the lens elements immediately adjacent to the aperture stop, on both the object plane side and the image plane side, are fabricated using glasses having a negligible susceptibility to thermal stress birefringence as characterized by a thermal stress birefringence metric; and wherein the other lens elements in the first or second groups of lens elements, that are not the lens elements immediately adjacent to the aperture stop, are fabricated using glasses having at most a moderate susceptibility to thermal stress birefringence as characterized by the thermal stress birefringence metric.

It has the advantage that the performance of the imaging lenses when they are used to produce images using polarized light will not be significantly affected by thermal changes resulting from the absorption of the imaging light.

It has the further advantage that such imaging lenses can be used for stereoscopic projection systems without producing objectionable cross-talk between the left- and right-eye images due to stress-birefringence-induced depolarization.

It has the additional advantage that the reduced birefringence susceptibility is achieved while simultaneously achieving an acceptable image quality level.

BRIEF DESCRIPTION OF THE DRAWINGS

The present invention will be more readily understood from the detailed description of exemplary embodiments presented below considered in conjunction with the attached drawings, of which:

FIG. 6B depicts the optical performance of the projection lens of FIG. 6A using MTF plots;

FIG. 6D depicts the optical performance of the relay lens of FIG. 6C using MTF plots;

FIGS. 8A-8D are tables showing optical glass properties;

FIG. 9A is a table summarizing the thermal stress birefringence performance of the first exemplary projection lens of FIG. 6A;

FIG. 9B is a table summarizing the thermal stress birefringence performance of the first exemplary relay lens of FIG. 6C;

FIG. 10D depicts the optical performance of the second exemplary relay lens of FIG. 10C using MTF plots;

FIG. 11A is a table summarizing the thermal stress birefringence performance of the second exemplary projection lens of FIG. 10A;

FIG. 11B is a table summarizing the thermal stress birefringence performance of the second exemplary relay lens of FIG. 10C;

FIG. 12B depicts the optical performance of the third exemplary projection lens of FIG. 12A using MTF plots;

FIG. 12D depicts the optical performance of the third exemplary relay lens of FIG. 12C using MTF plots;

FIG. 13A is a table summarizing the thermal stress birefringence performance of the third exemplary projection lens of FIG. 12A;

FIG. 13B is a table summarizing the thermal stress birefringence performance of the third exemplary relay lens of FIG. 12C;

FIG. 14A is a table specifying the lens design parameters for the third exemplary projection lens of FIG. 12A;

FIG. 14B is a table specifying the lens design parameters for the third exemplary relay lens of FIG. 12C;

It is to be understood that the attached drawings are for purposes of illustrating the concepts of the invention and may not be to scale.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 2:
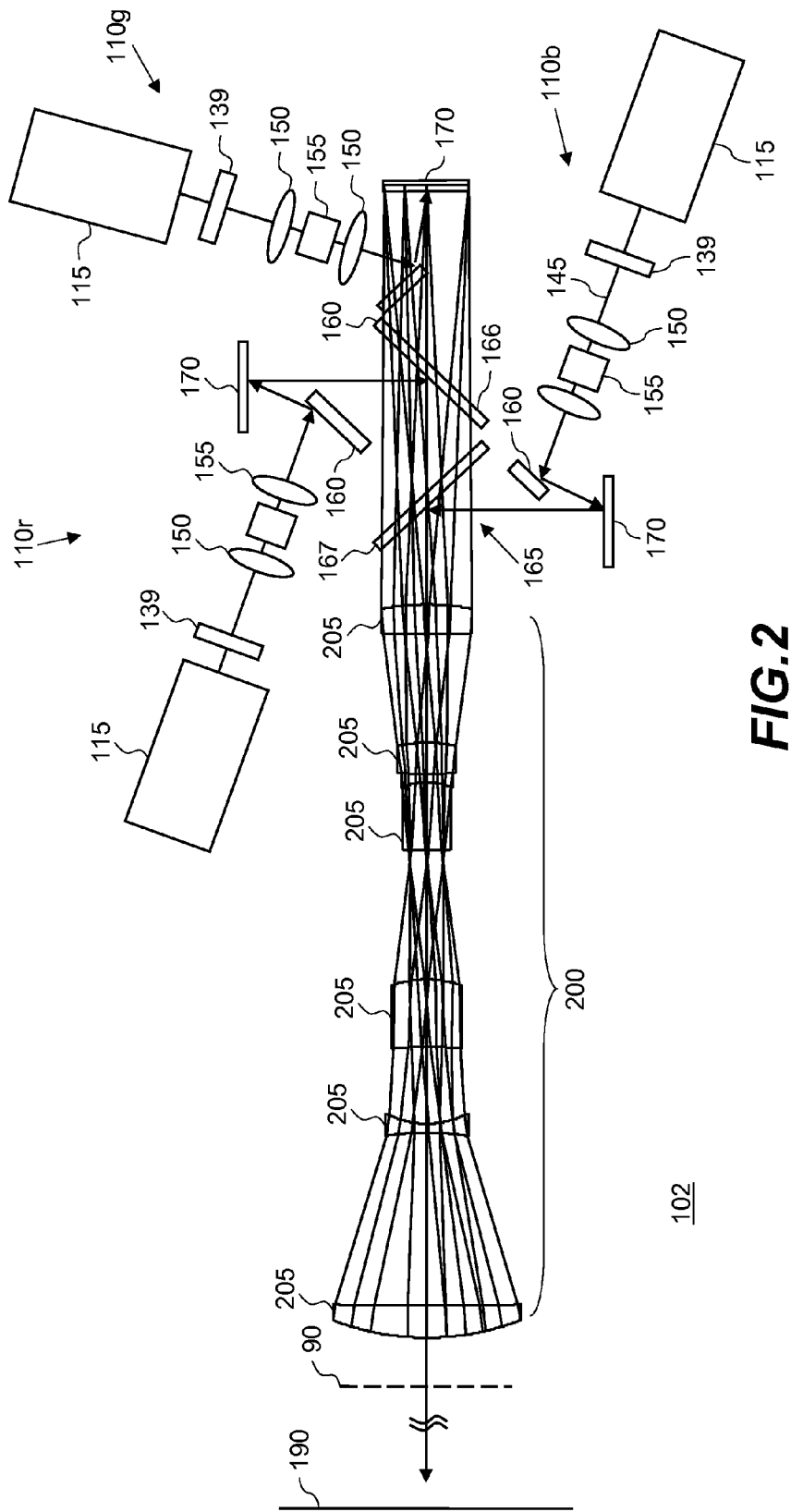
FIG. 2 illustrates the overall system architecture for a projector incorporating an imaging lens of the present invention.

In order to better understand the present invention, it is instructive to describe the overall context within which apparatus and methods of the present invention can be operable. The schematic diagram of FIG. 2 shows a basic arrangement for a projector 102 that is used in a number of embodiments of the present invention. Three illumination assemblies 110r, 110g and 110b are shown, each providing one of the primary Red, Green, or Blue (RGB) colors from a respective light source assembly 115. The light source assemblies 115 include one or more light sources, which in particular are laser light source devices. (The laser light source devices are not shown in FIG. 2, but are shown in representative fashion in FIGS. 3A and 3B.)

Figure 3A:
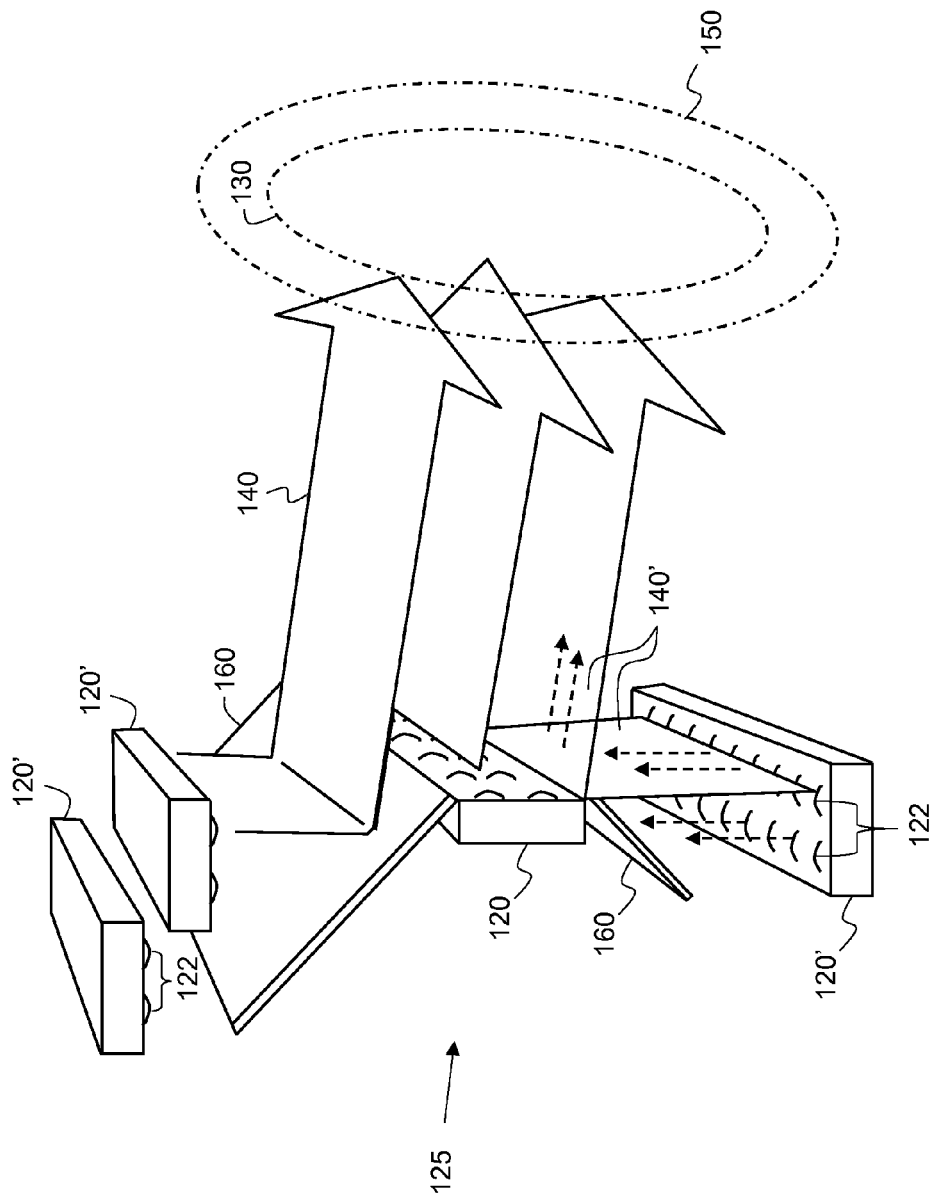
FIGS. 3A and 3B illustrate exemplary light source assemblies, including multiple laser devices and a laser combiner, as used in a projection system of the present invention.

FIG. 3A shows one approach for combining light from multiple laser arrays 120 and 120' to form a laser combining assembly 125, which is a sub-portion of a light source assembly 115 (FIG. 2). High power semiconductor (or solid state) laser arrays of several Watts or more optical output have been readily available in the red and infrared (IR) for many years. These lasers typically comprise a single row of single mode by multimode laser emitters 122. However, high power compact green and blue laser arrays are only now becoming available. Thus far, the previously mentioned lasers from Necsel, which are a type of IR pumped, frequency doubled, VECSEL (Vertical Extended Cavity Surface-Emitting Laser) laser, have shown particular promise. Due largely to heat and packaging problems for critical components, the currently available pre-commercialized devices have a constrained architecture that provides two parallel rows laser emitters 122 (24 emitters per row).

While it is optically beneficial to closely arrange the output light beams from the constituent laser arrays, it is also desirable to mechanically separate the laser arrays 120 from each other to reduce thermal crosstalk and concentrated thermal loads. It can also be desirable to separate the light source assemblies 115 (FIG. 2), as well as the electronic delivery and connection and the associated heat, from the thermally-sensitive, optical projection system, to allow optimal performance of the projection engine. In FIG. 3A, one or more interspersed mirrors 160 can be used to place the optical axis of additional laser arrays 120' in line with laser array 120 to provide a multitude of light beams 140, each comprised of a plurality of individual light beams 140', directed together toward an illumination lens 150 having an associated aperture 130, which is a component of the respective illumination assembly 110r, 110g and 110b (FIG. 2).

Figure 3B:
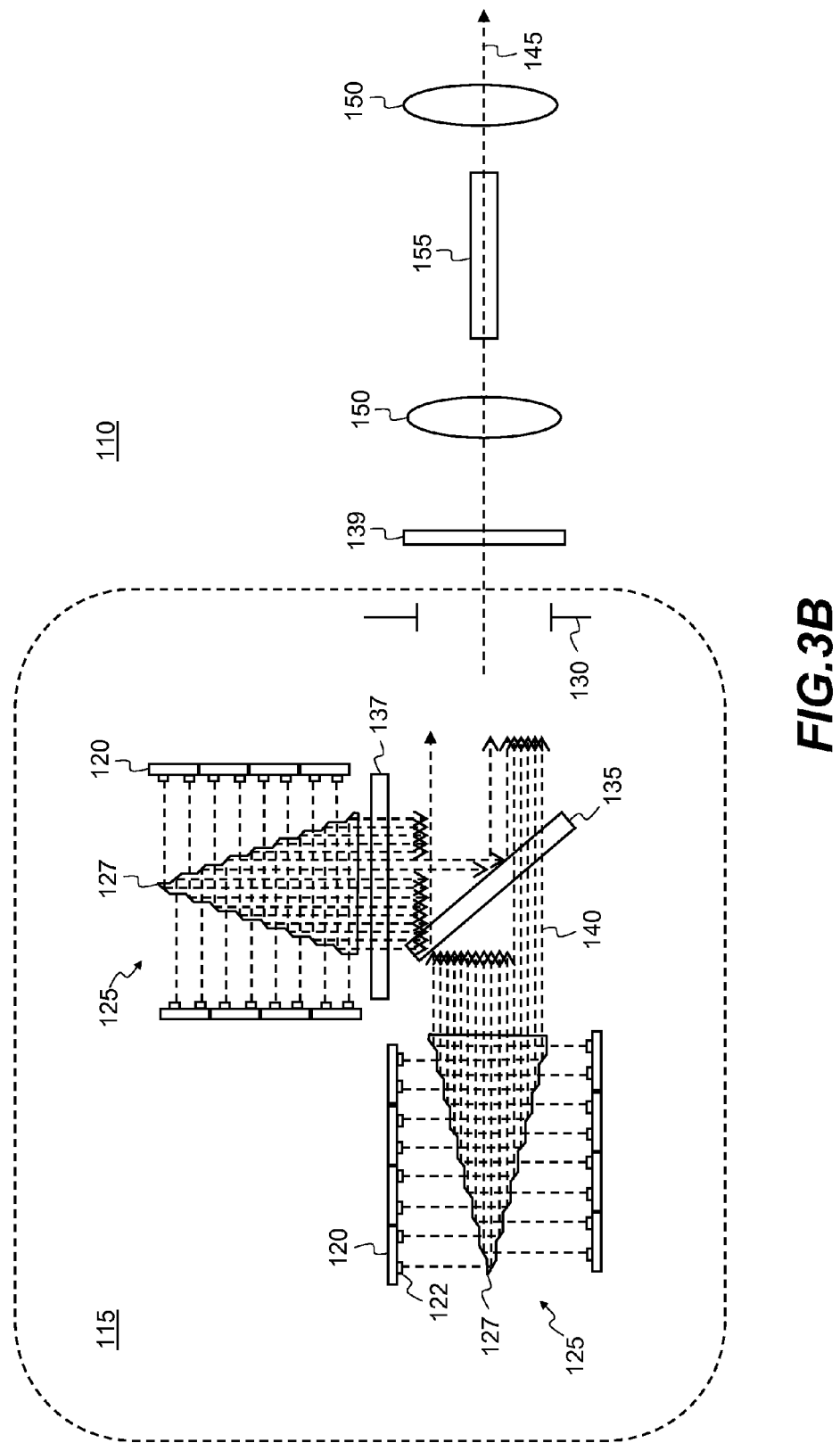

FIG. 3B then depicts a portion of an exemplary illumination assembly 110 according to an alternate embodiment. The illumination assembly 110 includes a light source assembly 115 for a given color that comprises two laser combining assemblies 125. Using such an arrangement, the power output can be increased, to support larger screens with higher screen lumen requirements. In this example, each of the two laser combining assemblies 125 utilizes a faceted prism 127 with window facets and reflecting facets (which work by total internal reflectance) on each side, to redirect light beams 140 from laser emitters 122 in laser arrays 120 down a common optical path. The output light from the two laser combining assemblies 125 is directed by illumination beam combiner 135 down a common optical path towards the other illumination optics, as represented by illumination lenses 150 and light integrator 155. The illumination beam combiner 135 can combine the light beams 140 by a variety of approaches, including spectrally (for the case where the laser arrays 120 in the laser combining assemblies 125 are clustered on opposite sides of a central wavelength), spatially, or by polarization. One path can have an optional half wave plate 137.

Considering FIGS. 2 and 3B in combination, each illumination assembly 110r, 110g and 110b, typically includes one or more illumination lenses 150, a light integrator 155 (such as a fly's eye integrator or integrating bar, for example) that shapes and direct the transiting light beams, and further illumination lenses 150 and mirrors 160, that together direct illumination light along an optical axis 145 to an associated spatial light modulator 170. For example, incoming light from the light source assembly 115 can be directed into a light integrator 155 using an illumination lens 150. The resulting homogenized light fills an output aperture of the light integrator 155. The output aperture is then re-imaged to an area in an optical plane to which the spatial light modulator 170 is aligned. The illumination lenses 150 and the light integrator 155 can be fabricated using fused silica in order to reduce any polarization degradation effects that might occur from induced stress birefringence in these elements.

The spatial light modulators 170 can be micro-electromechanical systems (MEMS) devices, such as a DLP or some other type of reflective MEMS device, including any of the types of MEMS modulators that modulate light by reflection or by diffraction. The spatial light modulators 170 can also be LCD-type devices or of other technologies. In the case of DLP-type devices, modulation provides "On" state or image light that is directed to the display surface, and "Off" state light that is directed into a beam dump (not shown). In the case that projector 102 switches the orientations of polarized light sources to drive stereo image projection (3D), then "polarization state neutral" modulator devices are preferred. In particular, spatial light modulators 170 are preferred that do not modulate light at each pixel by modulating the polarization state of the pixel, such that any change to the polarization state of the incident light for any pixel is inadvertent and small. This means the spatial light modulators 170 will preferably modulate the incident light identically on a pixel wise basis, regardless of the polarization state of the incident light. Therefore, it is presumed that audience members are wearing polarization sensitive glasses so as to view the stereoscopic or 3D images. It should also be understood that the projector 102 can provide conventional images that are perceived as two dimensional.

Unlike projectors that provide 3D imagery with a polarization switching accessory added externally to the projector, in this projector 102, illuminating light from illumination assemblies 110 is intended to be polarized. In particular, the light sources are arranged to provide a common polarization state, known as "s-polarized" or "p-polarized" in the language of the field. The illumination assemblies 110 can include a variety of optics, including wave plates or polarizers (not shown) to align, preserve, or accentuate the native polarization states of the light sources. The illumination assemblies 110 can also include a polarization switch 139, which can be electro-optically or electro-mechanically actuated, to change the polarization state of the light illuminating spatial light modulators 170 to s-polarized, p-polarized, or other polarization states (such as left or right circular) that are useful for 3D image projection. As a result, it is preferred that the various illumination components, including the illumination lenses 150 and the light integrator 155 be polarization preserving. The light path within each illumination assembly 110*r*, 110*g* and 110*b* follows the same basic pattern, although there can be differences to accommodate differences in light source (laser) properties from one color channel compared to another. Each illumination assembly 110 can have its own polarization switch 139, which can be operated in synchronized fashion with each other, or a common polarization switch 139 can be used for multiple color channels.

As shown in FIG. 2, illumination light is directed onto spatial light modulators 170 by redirection with one or more mirrors 160. Modulated image light, bearing image data imparted into the transiting light by the addressed pixels of the spatial light modulators 170 is combined to traverse a common optical path passing through imaging lens 200 and onto a display surface 190 (such as a projection screen). In the illustrated embodiment, a dichroic combiner 165 comprises a first combiner 166 and a second combiner 167, each of which is a dichroic element having appropriate thin film optical coatings that selectively transmits or reflects light according to its wavelength. As this projector 102 is designed to provide 3-D image content using internal modulation of the optical polarization states, the dichroic combiner 165 and the imaging lens 200 should also be polarization neutral, such that little or no differences in efficiency, polarization contrast, or image quality are induced by these elements. Likewise, display surface 190 is preferably a polarization-preserving screen.

Figure 1A:
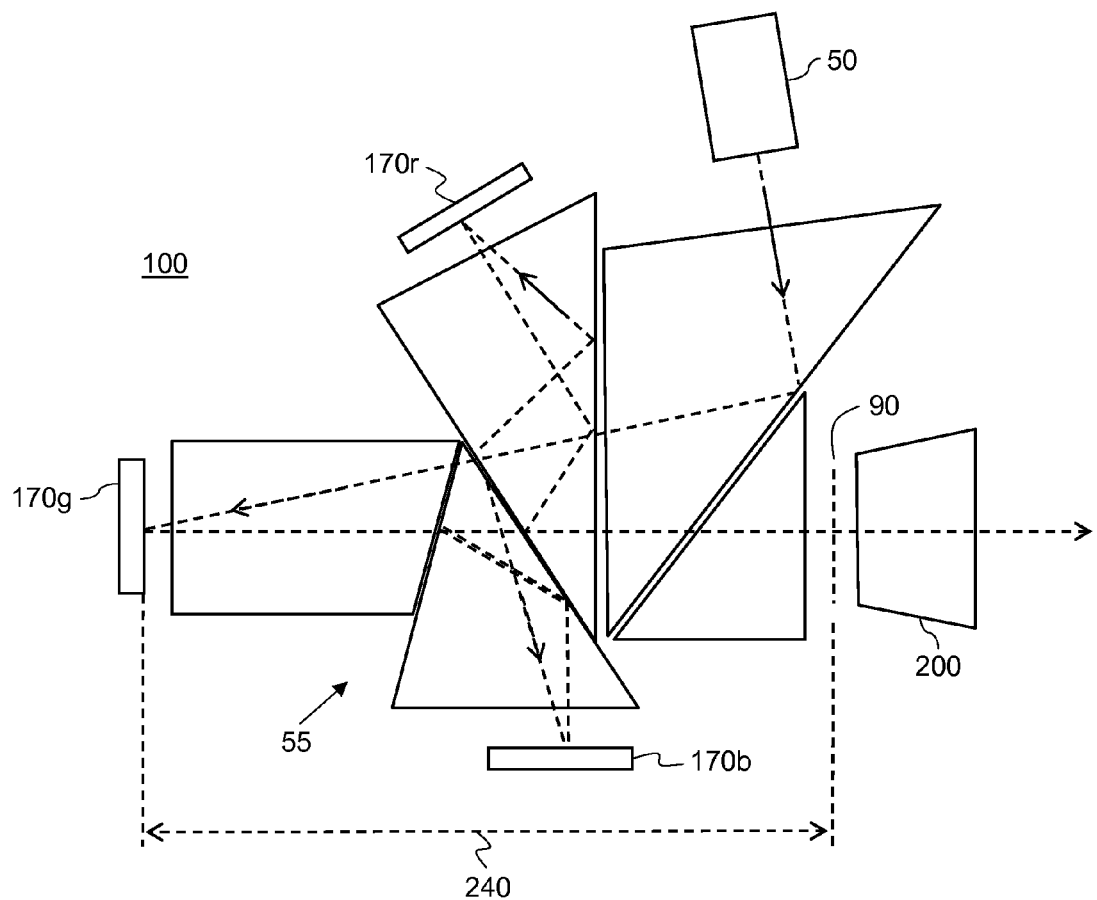
FIGS. 1A and 1B illustrate portions of prior art digital projection systems.
Figure 1B:
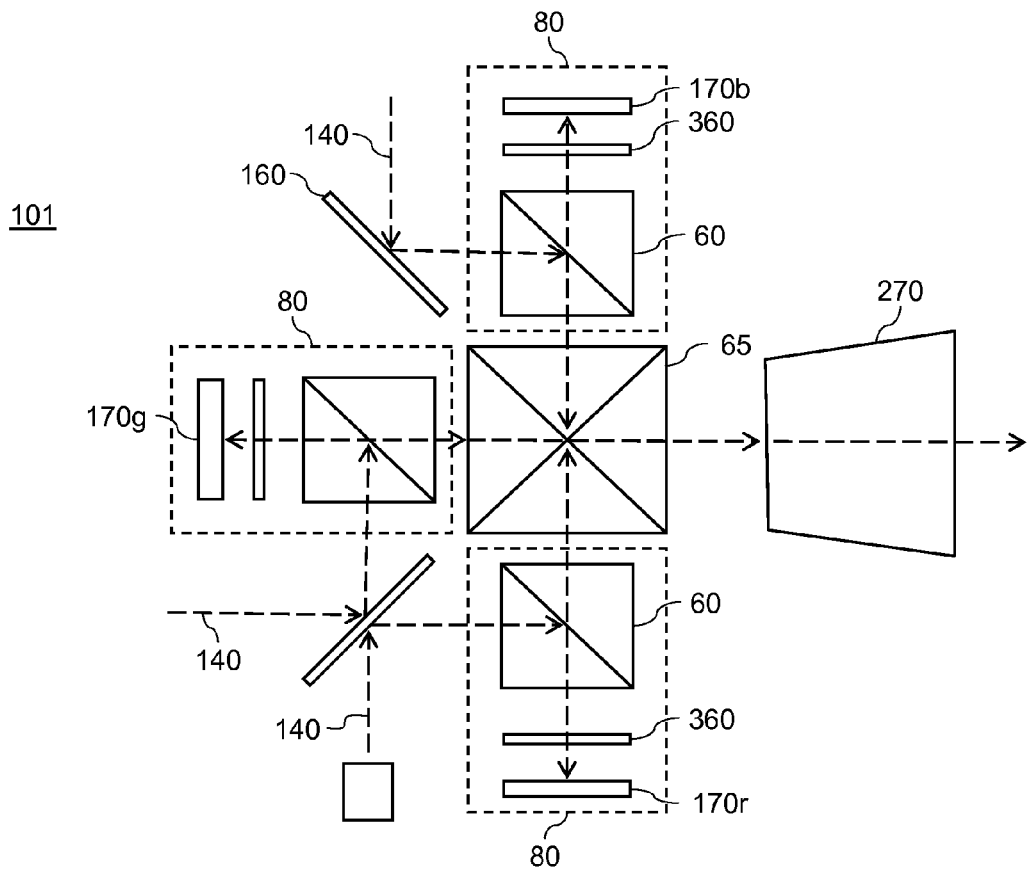

It should be understood that mirrors 160 need not lie in the plane of the optical system. Thus the mirror 160 in the optical path for the green channel can be out of plane, and not obstructing light passing to projection lens 270, as might be otherwise implied by FIG. 2. Additionally, while dichroic combiner 165 is shown as a pair of tilted glass plates, other exemplary constructions can be used, including X-prisms 65 (FIG. 1B), V-prisms, or Philips (or Plumbicon) type prisms (FIG. 1A). In other embodiments, mirrors 160 can also be provided in the form of prisms, such as the widely used TIR (total internal reflection) prism that is often used in combination with the Philips prism and DLP devices.

In FIG. 2, imaging lens 200 is depicted as a multi-element assembly comprising multiple lens elements 205 that images spatial light modulators 170*r*, 170*g* and 170*b* at their respective object planes directly onto an image plane (display surface 190) at high magnification (typically 100×-400×).

Figure 4:
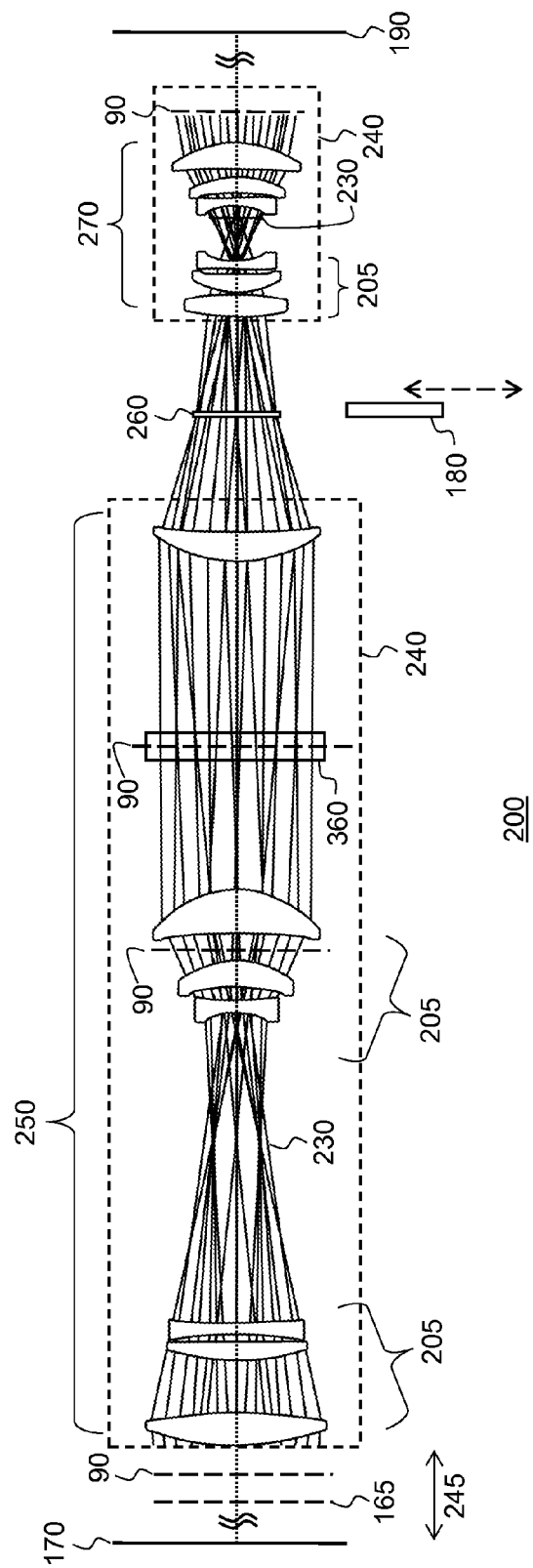
FIG. 4 illustrates the general construction of an imaging lens of the present invention, comprising both a relay lens and a projection lens.

FIG. 4 expands on the design of the imaging lens 200, depicting an embodiment where the imaging lens 200 comprises two portions, a relay lens 250 and a projection lens 270, each of which comprise a multitude of lens elements 205 operating at finite conjugates and assembled into a lens housing 240. For example, relay lens 250 is designed to collect and image F/6 light from the object planes of the spatial light modulators 170 to form a real aerial intermediate image 260 at a corresponding image plane. This intermediate image 260 is then the object plane for projection lens 270, which provides a magnified image of the intermediate image to distant image plane (display surface 190), which is the nominal image plane, within an allowed depth of focus. That is, the spatial light modulators 170 are image conjugate to the intermediate image 260, which in turn is image conjugate to the display surface 190.

The relay lens 250 preferably provides a long working distance 245, of 150-200 mm or more, to provide clearance for the dichroic combiner 165 and the mirrors 160 (FIG. 2) in the vicinity of the spatial light modulators 170. An exemplary relay lens 250 images the spatial light modulators 170 with a lateral magnification of 1× or slightly larger, providing a real intermediate image 260 whose size is comparable to the image area of a frame of 35 mm movie film. As a result, projection lens 270 can potentially be a conventional projection lens designed to project 35 mm film images, such as the projection lenses currently manufactured by Schneider-Kreuznach of Bad Kreuznach, Germany.

While the imaging lens 200 depicted in FIG. 4 can seem more complicated than that of FIG. 2, in practice the relay lens 250 and the projection lens 270 of FIG. 4 are easier to design and produce, and therefore are of lower cost, then the equivalent unified imaging lens 200 present in commercial DLP cinema projectors today. In part this is because it is easier to provide a long working distance 245 while working near 1× magnification than when working at high magnification. Additionally, this approach enables laser de-speckling, by providing a convenient location for insertion of a despeckler 180, such as a moving diffuser, at or near the intermediate image 260. In this system, the despeckler 180 is preferably a lenslet array comprising sparsely placed lenslets having dimensions the size of one or more imaged pixels. With the despeckler 180 in operation, the projection lens 270 is preferably a faster lens (~F/3) than the relay lens 250.

Given this background, it is noted that an experimental laser based projector 102, having the general configuration depicted in FIGS. 2, 3A, and 3B, but utilizing the imaging lens 200 of FIG. 4, with the relay lens 250, intermediate image 260, and projection lens 270 has been assembled and tested by the inventors. In operation, one prototype version of the system exhibited a loss of polarization contrast, such that the blue channel polarization contrast was ~400:1 or greater when the projector was operated for low luminance output (at 3000 lumens for example), but was degraded to ~100:1 when the projector is operated at levels above ~6000 lumens without the despeckler 180, and to ~150:1 with the despeckler 180 in operation. In particular, a polarization change or loss was most apparent for blue imagery as blue light experiences higher light absorption levels. The polarization change caused perceptible crosstalk or ghosts for projected stereoscopic images by viewers wearing polarization discriminating glasses. While this crosstalk can be remedied using the ghost correction digital post processing methods offered by Real-D, the present invention provides a preferable solution where internal lens design corrections can be used to eliminate the need for such correction.

In particular, as the polarization contrast degrades with light level, this is consistent with the finding that the problem originates with thermally induced stress birefringence. As will become apparent, a solution is provided which involves the selective use of optical glasses in the design of the relay lens 250 and the projection lens 270. Both of these lenses, as depicted in the embodiment of FIG. 4, are generally double Gauss type lenses. The basic double Gauss lens dates back to the 1800's, with C. F. Gauss and then Alvan Clark developing the original form. First, C. F. Gauss improved upon a Fraunhofer telescope objective by adding a meniscus lens to its single convex and concave lens design. Alvan Clark then took two of these lenses and placed them back to back to obtain the double Gauss design. Paul Rudolph improved upon this further, with the use of cemented doublets to correct for chromatic aberrations, as described in U.S. Pat. No. 583,336. A double Gauss lens consists of two Gauss lenses back to back, forming two groups of lens elements 208 positioned about the aperture stop 230, in which the lens elements of the two groups may be identical, as demonstrated by Rudolph.

Figure 5A:
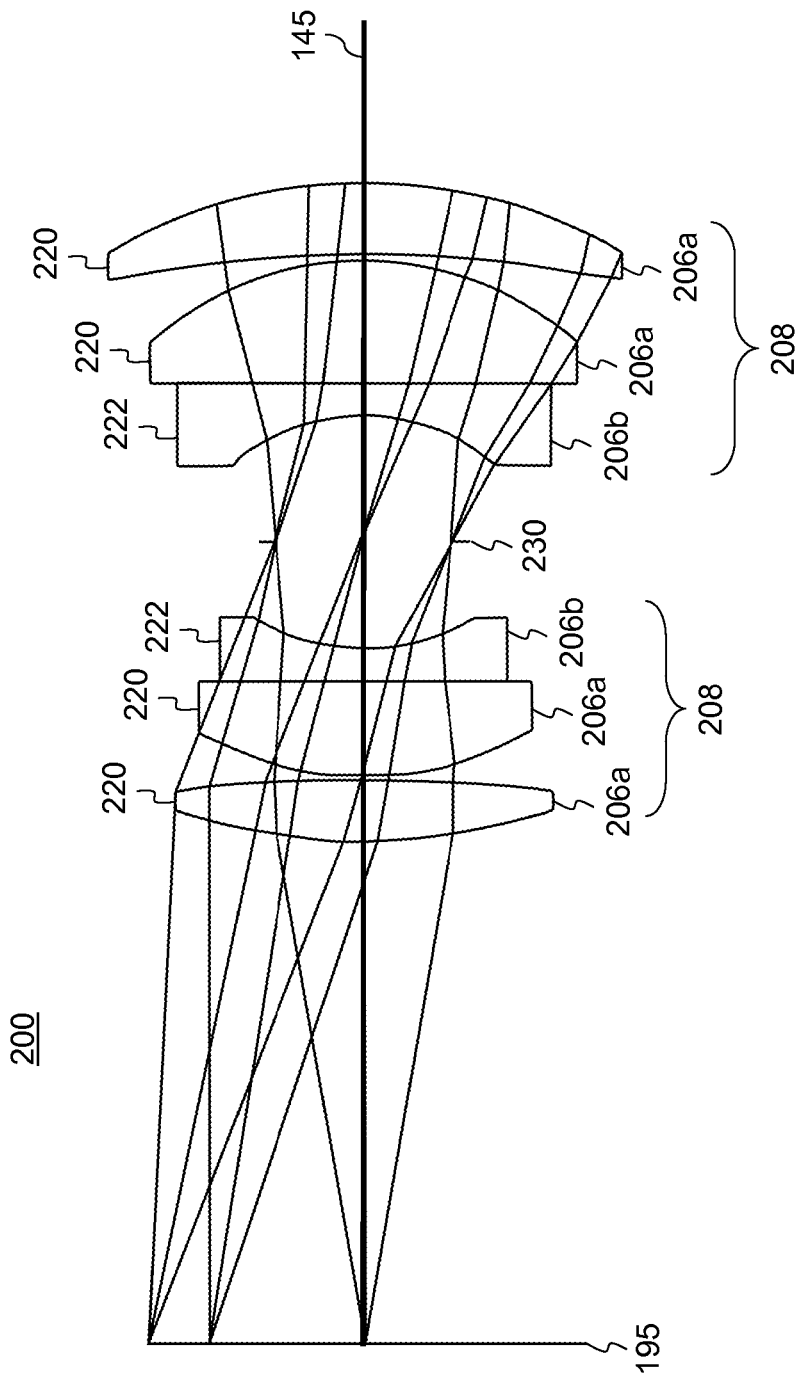
FIG. 5A depicts a prior art double gauss type imaging lens.

FIG. 5A depicts a prior art double gauss type imaging lens 200 that images an object surface 195 along an optical axis 145 to a distant image plane (not shown). In a common basic form, it consists of an inner pair of negative lens elements 206b of flint type glasses positioned about the aperture stop 230, and outer pairings of positive lens elements 206a consisting of crown type glasses. In this example, the lens element designs on either side of the aperture stop 230 (the Gauss lens assemblies) are not identical.

Figure 5B:
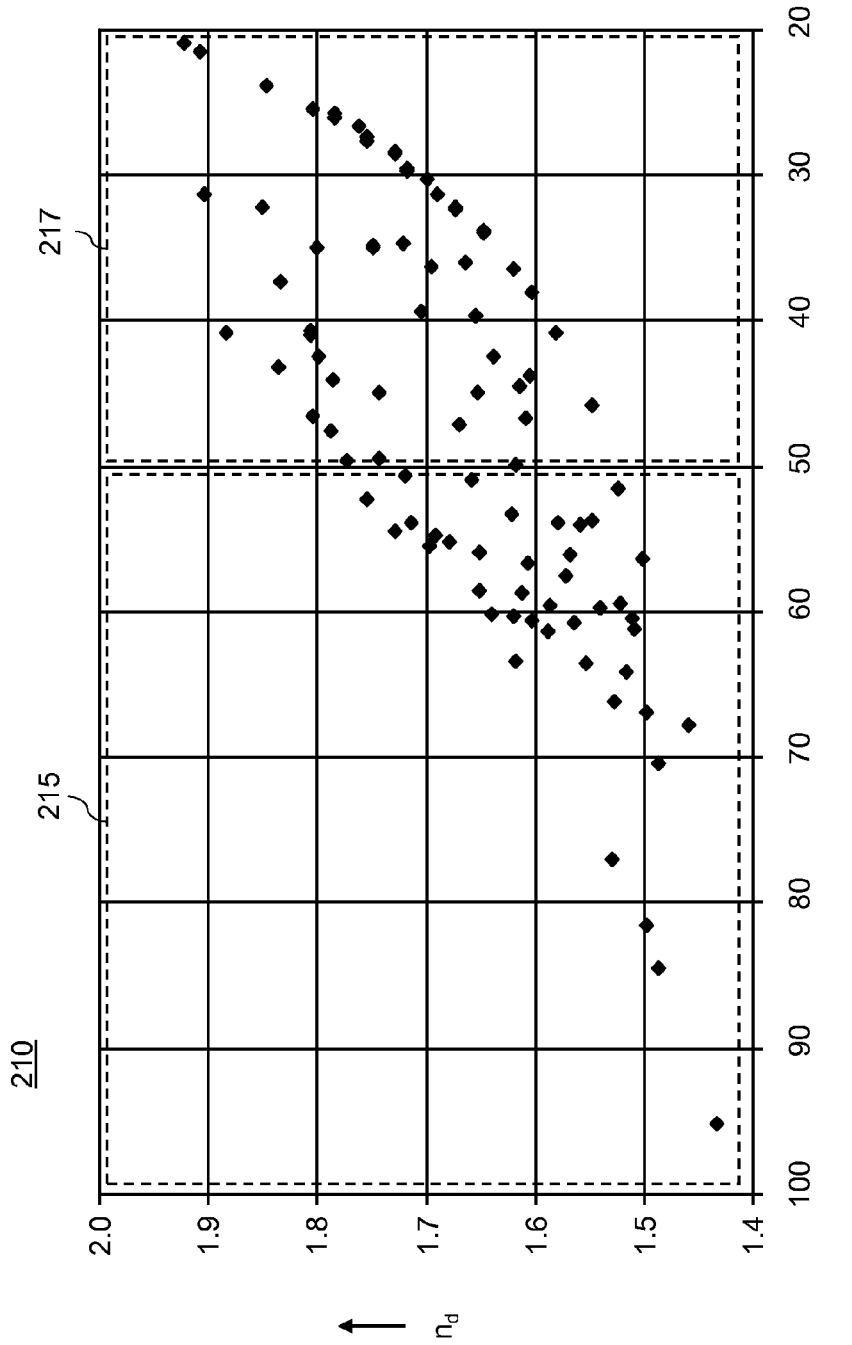
FIG. 5B depicts a glass chart, plotting optical glasses relative to their index of refraction and Abbe number.

The significance of crown and flint glasses is illustrated by the glass chart 210 shown in FIG. 5B, which is an "Abbe-diagram" plotting the widely recognized glass chart data published by Schott Glass, Inc. Crown glasses 215 have low dispersion (indicated by a high Abbe number $v_d$>50) and generally have a low refractive index ($n_d$), while flint glasses 217 have comparatively high dispersions (low Abbe number $v_d$<50) and generally have higher refractive indices. Weak-flints or weak-crowns, with intermediate dispersion characteristics, are found near the intermediate Abbe number, $v_d$~50. In FIG. 5A, the lens elements are also identified as either crown lens elements 220 which is made using a crown glass 215 or a flint lens elements 222 which is made from a flint glass 217.

The general symmetry of the double Gauss design approach and the splitting of the optical power into many elements reduces the optical aberrations imparted by the lens system. It forms the basis for many camera lenses in use today, especially the wide-aperture standard lenses used on 35 mm and other small-format cameras. A completely symmetrical design is free of coma, distortion and TCA (transverse chromatic aberration or lateral color). There are many variations of the design, with extra lens elements added, or with asymmetrical designs about the aperture stop 230, with the symmetry sacrificed to achieve other goals. As examples, U.S. Pat. No. 4,704,011 to R. Mercado describes a double Gauss type photographic objective, while U.S. Pat. No. 6,795, 255 to W. Reinecke et al. describes a double Gauss type movie lens for projecting images from film, and commonly assigned U.S. Pat. No. 5,172,275 to D. DeJager describes a complex double Gauss type lens applicable to motion picture film scanning.

Figure 6A:
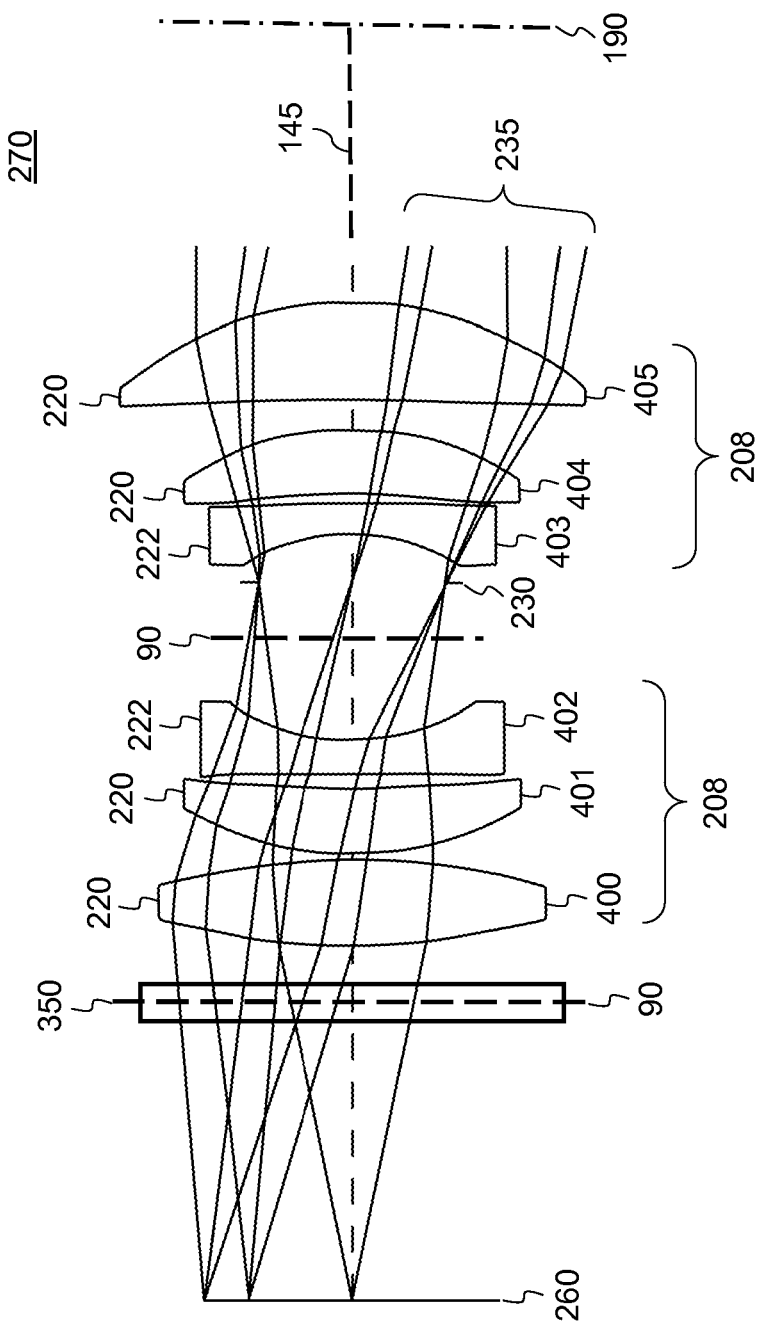
FIG. 6A depicts the optical design of a first exemplary projection lens, having moderate thermal stress susceptibility and good image quality.

FIG. 6A illustrates the design of a first exemplary projection lens 270 having a double Gauss lens design with two groups of lens elements 208 similar to the projection lens 270 within the imaging lens 200 illustrated in FIG. 4. The projection lens 270 has two inner negative lens elements 402 and 403 positioned about an aperture stop 230 that are flint lens elements 222, negative lens elements 402 being fabricated using Schott SF1 glass and negative lens elements 403 being fabricated using SF2 glass. The projection lens 270 also has 4 outer positive lens elements 400, 401, 404 and 405, all of which are crown lens elements 220. The largest positive lens element 405 on the far right is fabricated using Ohara S-BSM-10, while the other positive lens elements 400, 401 and 404 are all fabricated using Ohara S-LAM-60, from Ohara Glass Inc. These glasses have close Schott glass equivalents, which are N-SK10 and N-LAF35, respectively. Optical rays 235 are shown tracing the path of light rays through the projection lens 270.

FIG. 6B shows a modulation transfer function (MTF) plot 300 which depicts the broad spectrum MTF performance of the exemplary projection lens 270 in FIG. 6A. While not diffraction limited, it can be seen that the MTF averages ~65% at 50 cy/mm over the imaged field.

Figure 6C:
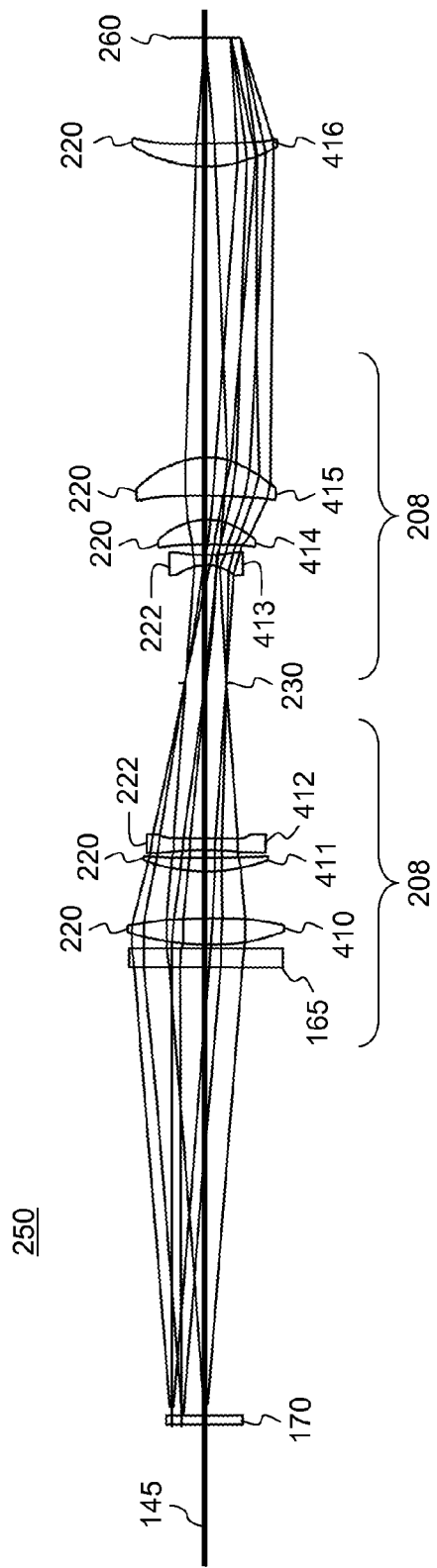
FIG. 6C depicts the optical design of a first exemplary relay lens, having moderate thermal stress susceptibility and good image quality.

FIG. 6C depicts the design of a first exemplary relay lens 250, which is a stretched version of a double Gauss lens design, similar to the relay lens 250 illustrated in FIG. 4. The relay lens 250, which has two groups of lens elements 208 plus a field lens (lens element 416) is used to form an intermediate image 260 (at an image plane) of the spatial light modulator 170 (which is positioned at an object plane). This lens design includes a pair of negative lens elements 412 and 413 positioned around the aperture stop 230 that are flint lens elements 222 fabricated using Schott SF4 glass. The relay lens 250 also includes a collection of positive lens elements 410, 411, 414 and 415 that are crown lens elements 220. The positive lens elements 410 and 411 are fabricated using Ohara S-BAL35. The positive lens element 414 is fabricated using Ohara S-LAM54, and the positive lens element 415 is fabricated using Ohara S-NSL3. The relay lens 250 also includes a positive field lens element 416 positioned near the intermediate image 260, also fabricated using Ohara S-LAM54. Dichroic combiner 165 is also shown represented by a non-tilted planar element.

FIG. 6D depicts the optical performance of the relay lens 250 from FIG. 6C with MTF plot 300. The optical performance is nearly diffraction limited, with an average MTF of ~79% at 50 cy/mm over the image field.

As noted previously, a conventional imaging lens 200, comprising the combination of a conventional relay lens 250 (i.e., that shown in FIG. 6C) and a conventional projection lens 270 (i.e., that shown in FIG. 6A), was found to experience a drop in blue light polarization image contrast to ~150:1 or less and blue image ghosting, when transmitting laser light to the display surface 190 for moderately high screen brightness levels (6,000-11,000 lumens), compared to ~400:1 polarization contrast at low screen lumen levels. Separate measurements of the polarization contrast of the output light when the imaging lens assemblies were not present showed little change with luminance levels, thus confirming that the relay lens 250 and projection lens 270 were the primary culprits. In particular, these measurements showed that the blue channel (465 nm) polarization contrast degraded to ~100:1, while the green and red contrast levels remained higher (~300:1). Taken together, this data strongly suggested that the polarization contrast was degrading due to thermally induced stress birefringence effects, which would only worsen at yet higher power levels. As most optical glasses (except most notably fused silica) experience higher absorption in the blue, stress birefringence can be induced more readily by blue light absorption. As a result, stress birefringence can affect image quality in the different color channels to varying extents.

Thermally-induced stress birefringence is the change in refractive index ($\Delta n(\lambda,T)$) induced in the glass with temperature (T), and it functionally depends on many parameters, including the wavelength $\lambda$, the absorption of the glass ($\alpha$), the optical stress susceptibility of the glass ($\kappa$), and the coefficient of thermal expansion ($\rho$). It also depends on the spatio-temporal distribution of light intensity (irradiance) or power density (for example, in units of $W/mm^2$, lumens/$mm^2$, or lux) for the light transiting the glass.

FIGS. 7A-7F illustrate exemplary light intensity distributions that can transit the optics of the projector 102 depicted in FIGS. 2, 3A, 3B and 4. As depicted in FIGS. 3A and 3B, the laser combining assemblies 125 can produce a multitude of output light beams 140, which combine to fill or partially fill an aperture 130. Because of the structure of the laser arrays 120, which can have one or more spaced arrays of offset laser emitters 122, a multitude of individual light beams 140' within a depicted light beam 140 are obtained. Combining beams from multiple laser arrays 120 increases the multitude of individual light beams 140', many of which have traversed different optical path lengths in reaching the aperture 130. As the individual light beams 140' propagate, they merge and overlap into each other. Depending on the position in the optical system, the relative optical path lengths traversed by the various individual light beams 140', and the use of light homogenizers, integrators, or diffusers, some light beams 140' or images of laser arrays 120 or combinations thereof, may be more distinguishable then other individual light beams 140' or combinations thereof. The net result is that cross-sections of the light intensity distributions can show varying amounts of structure, depending on the location within the optical system.

Figures 7A, 7B:
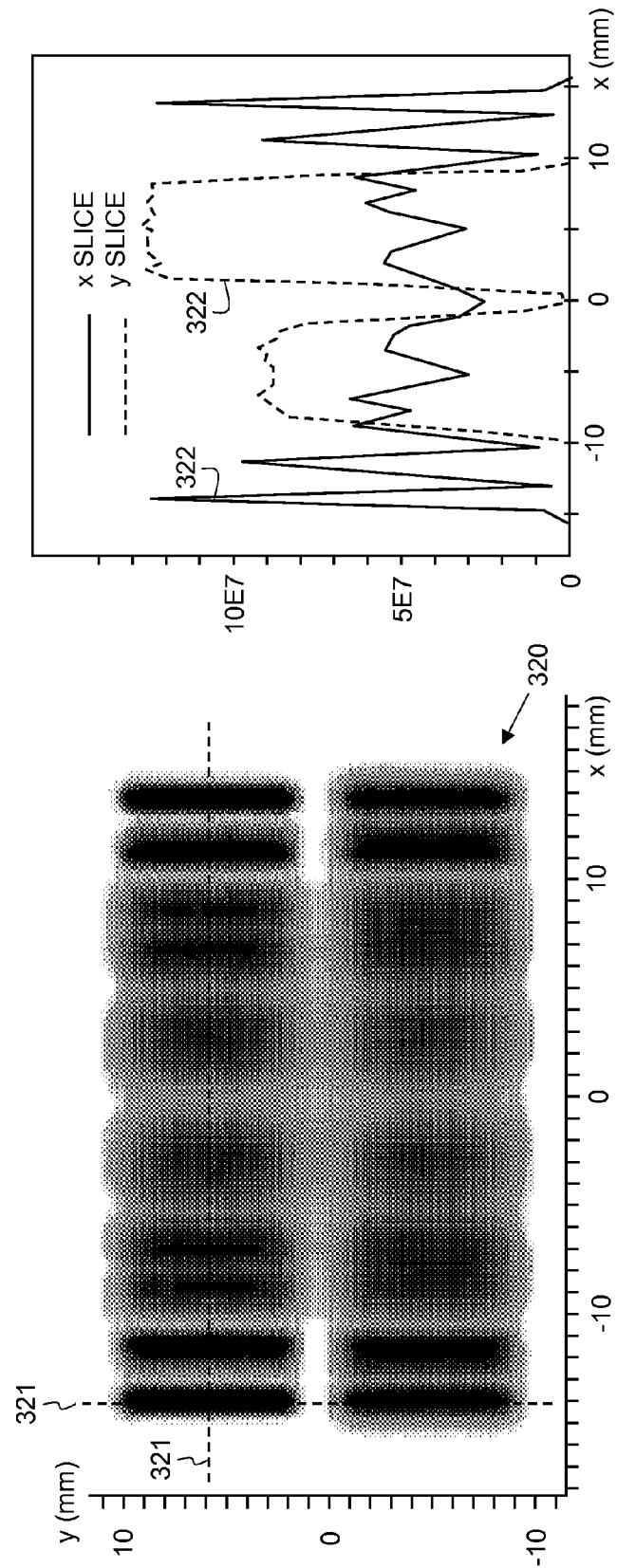
FIGS. 7A and 7B illustrate contour and cross-sectional beam profiles of light beams emergent from the laser combining assembly.

To expand upon this last point, FIG. 7A illustrates a modeled light intensity distribution 320 near the aperture 130 of a light source assembly 115, in which the individual light beams 140' from the innermost laser arrays 120 are more defocused than the light beams from the outermost laser arrays. FIG. 7B illustrates two cross-sectional profiles 322 through the light intensity distribution 320 of FIG. 7A at slice positions 321. These light intensity distributions 320 are highly structured, rather than spatially uniform, as the multitude of light beams 140' are only partially overlapped with each other, and the amount of overlap differs from center to edge.

Figure 7D:
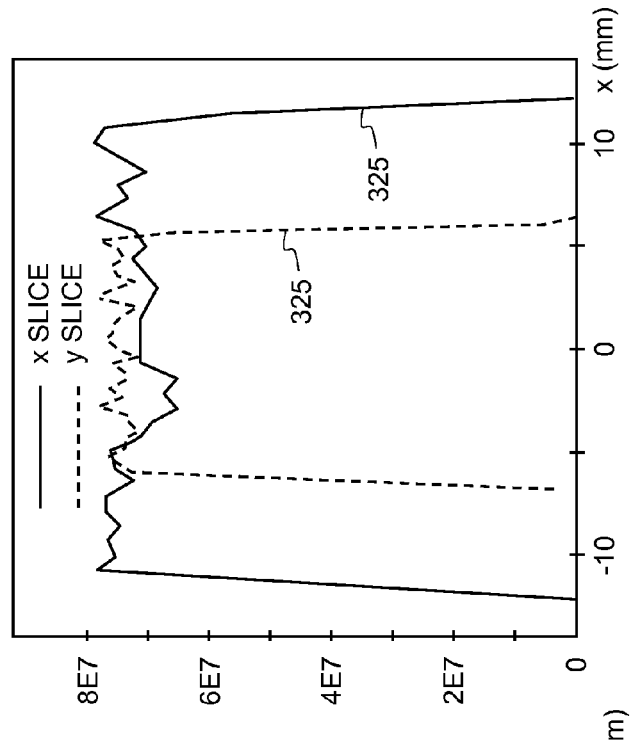
FIGS. 7C and 7D illustrate contour and cross-sectional illumination profiles incident to the spatial light modulators.
Figure 7C:
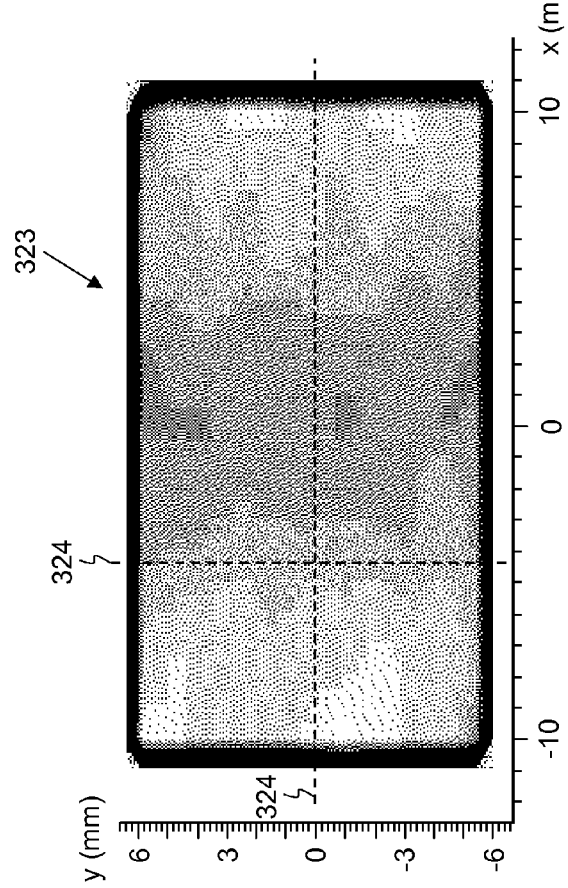
Figures 7E, 7F:
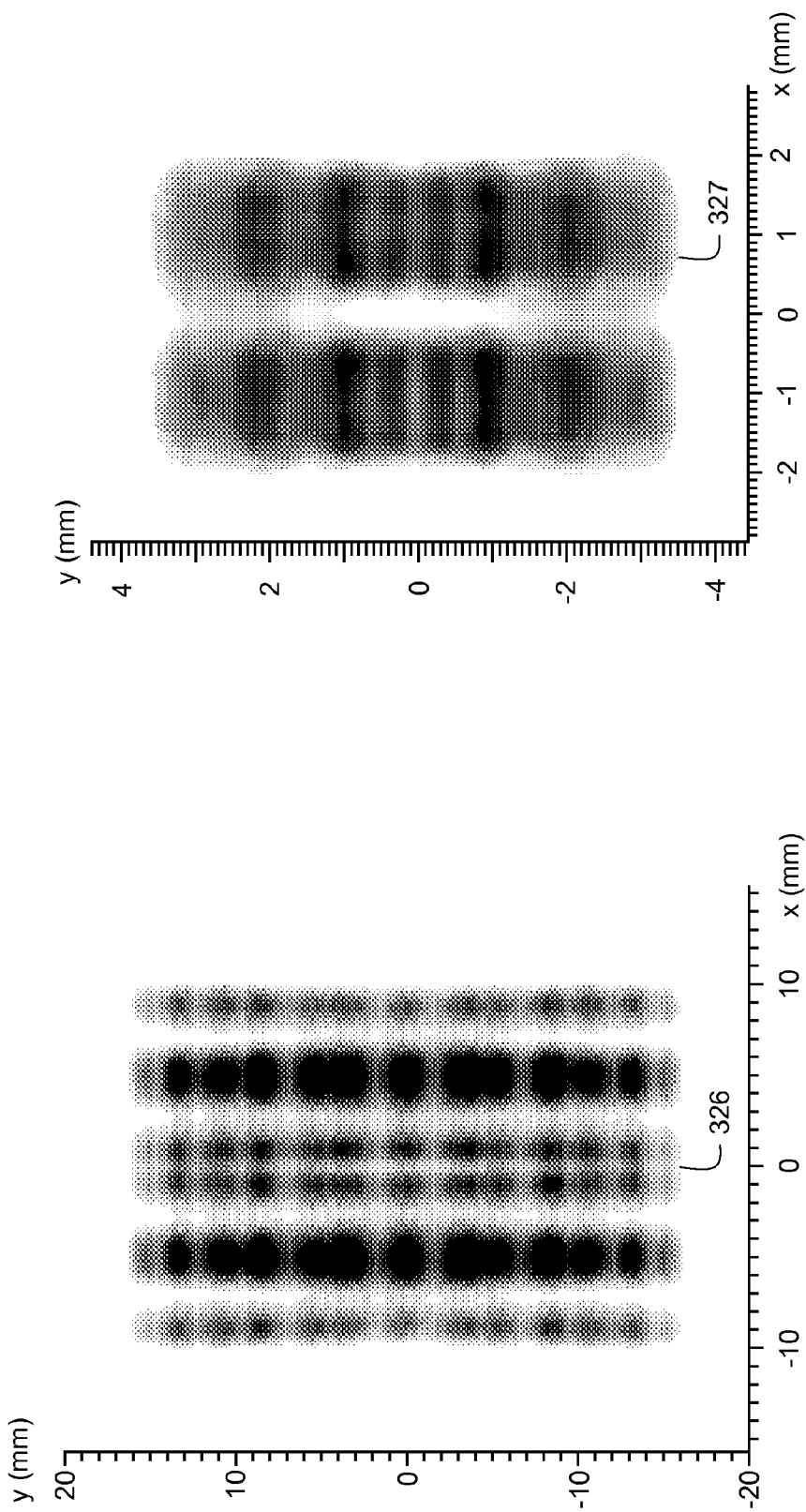
FIG. 7E illustrates a light intensity distribution in telecentric space following the integrating bar.
FIG. 7F illustrates a light intensity distribution near the aperture stop of the relay lens.

Patterns similar to that shown in FIG. 7A re-occur throughout the optical system. For example, in the angular far field of the light integrator 155 (FIG. 3B), a similarly patterned light intensity distribution 326 emerges as shown in FIG. 7E, although multiple bounces within an integrating bar have made it more complicated. Per the design intent, the integrating bar produces a nominally uniform light intensity distributions 323 at its output face as shown in the contour view of FIG. 7C. FIG. 7D shows corresponding cross-sectional profiles 325 corresponding to the slice positions 324 shown in FIG. 7C.

Figure 7G:
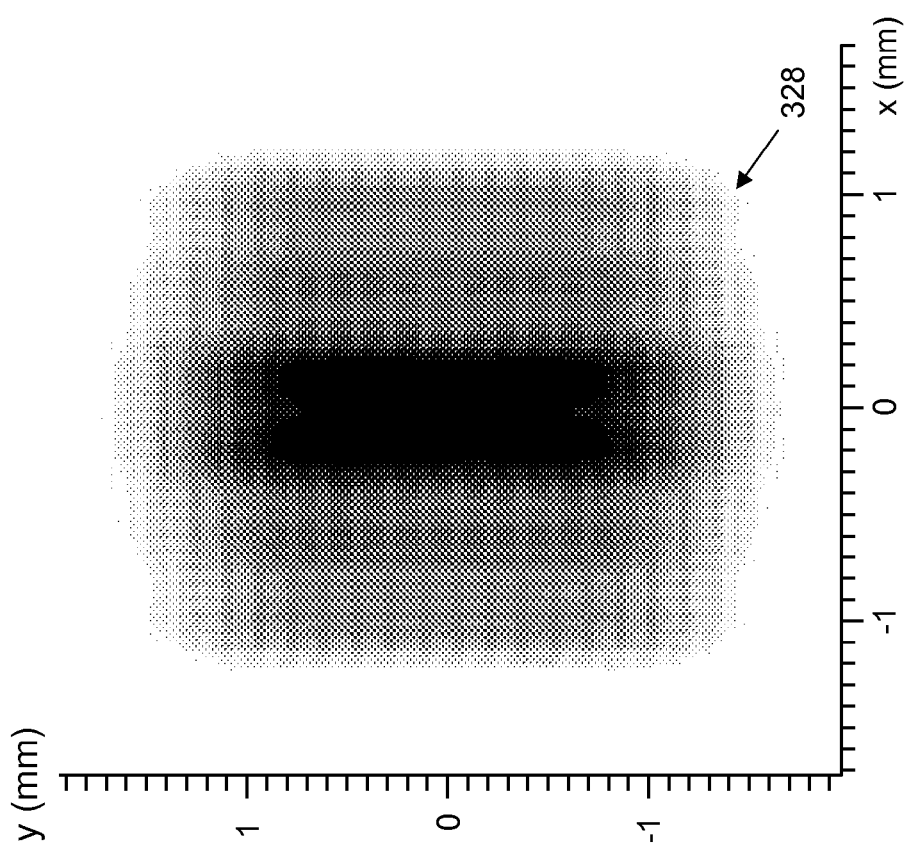
FIG. 7G illustrates a light intensity distribution near the aperture stop of the projection lens.

The light intensity distribution 323 at the output face of the integrating bar is then re-imaged to illuminate the spatial light modulator 170 of that color channel. Relay lens 250 (FIG. 4) re-images the spatial light modulators 170 to form a combined white light image (depending on image content) as real aerial intermediate image 260, which the projection lens 270 subsequently re-images onto the display surface 190. At, or near to, the aperture stops 230 of the relay lens 250 and the projection lens 270, highly structured light intensity patterns, echoing the light intensity distribution 326 of FIG. 7E, can appear, depending on the optical diffusion or angular averaging applied in the system. For example, FIG. 7F illustrates an exemplary modeled light intensity distribution 327 near the aperture stop 230 of the relay lens 250, while FIG. 7G illustrates an exemplary modeled light intensity distribution 328 near the aperture stop 230 of the projection lens 270 (without the inclusion of a despeckler 180).

It is noted that the use of despeckler 180 can cause the propagating light to be angular broadened, or spatio-temporally averaged within the projection lens, or both. As a result, the micro-structure of the light intensity distribution 320 at or near the aperture stop 230 of the projection lens 270 may not be as sharply defined, nor temporally stationary. Nonetheless, the lens elements 205 within the relay lens 250 and the projection lens 270 can experience transiting light having high optical power densities, particularly near the aperture stops 230 where the light intensity distributions 326 and 327 can have the light concentrated in numerous peaks in the microstructure of the light intensity distributions. These concentrations of light energy can cause thermally induced optical stress birefringence throughout these lens assemblies, but particularly in lens elements 205 near the aperture stops 230.

As further background to understanding birefringence, it is known that the propagation of light can be described by wave equations, including Eq. (3) which describes a plane polarized wave $\psi(x,t)$ as a function of the distance x and the time t, where $A(x,t)$ is the amplitude function, and $\phi(x,t)$ is the phase of the disturbance:

$$\Psi(x,t)=A(x,t)e^{i\phi(x,t)} \quad (3)$$

The phase of the propagating wave can be written as:

$$\phi(x,t)=\omega t-kx=\omega(t-x/v) \quad (4)$$

where, $\omega$ is the rate of change of phase with time, k is the rate of change of phase with distance, and v is wave velocity. The value $\omega$ is also known as the angular frequency, where $\omega=2\pi/v$, and the value k is also known as the propagation number, where $k=2\pi/\lambda_o$. The frequency $\nu$ and the wavelength $\lambda_o$ of light in free space are related by the speed of light, $c=\lambda_o/\nu$.

As light enters and traverses an optical material, it can experience a variable reflectivity and phase change $\Delta\phi$, depending on the angle of incidence, the polarization orientation of the incident light relative to the media, the refractive index n of the optical material, and the thickness of the material. The Fresnel equations, which model surface reflectance or transmission, affect the amplitude term of Eq. (3). The refractive index in a material or medium is basically the ratio of the speed of light in vacuum c to the speed v in the medium (n=c/v). Substituting into Eq. (4) puts the phase in terms of the refractive index:

$$\phi(x,t)=\omega t-(2\pi n/\lambda_0)x \quad (5)$$

Even in an isotropic material of constant refractive index, a differential phase change $\Delta\phi$ can occur across different beam propagation angles, as the optical path length (d/n) in the material changes from one angle to another, where d is the thickness of the material. However, in the case of a complex structure, such as a birefringent material, a differential amount of rotation and ellipticity can be induced in the transiting light. Thus, differential phase changes $\Delta\phi$ can occur depending on the angle and polarization states of the incident light; ($\Delta\phi=\Delta\phi_{sp}=\phi_p-\phi_p$). In this nomenclature, "s" and "p" denote whether the electric field vector of the light oscillates perpendicularly to the plane of incidence (s-polarization) to a surface, or p-polarized light, where the electric field vector oscillates parallel to the plane of incidence over the entire range of incidence angles.

Birefringent materials are non-istropic materials with respect to polarization. That is, birefringence is a directional variation of refractive index ($\Delta n_{sp}=n_s-n_p=n_x-n_y$), and it can be provided by intrinsic material properties, by form-birefringent sub-wavelength structures, or by induced mechanical stresses. Retardance is the resulting phase change $\Delta\phi$ expressed as distance ($R=\Delta\phi\lambda$) where the phase change $\Delta\phi(x, d,\lambda)=2\pi d(\Delta n/\lambda)$. For example a $\pi/2$ (or 90°) phase change $\Delta\phi$ can be provided by a properly oriented birefringent element (wave plate) having a quarter wave $\lambda/4$ of retardance, which, at 550 nm, equals ~138 nm retardance.

In particular, the application of uniform temperature produces changes in the mechanical stress σ optical components, such as cemented elements, due to mismatches in coefficients of thermal expansion between the elements and/or the mounting materials. Temperature gradients, as can be associated with light intensity distribution micro-structures discussed previously, also induce stress in single, homogeneous elements. Either residual stresses imparted during manufacturing or fabrication processes, or states of stress from pressure, inertial, or vibratory loads can cause birefringence in optical elements. In essence, the effect of stress, whether mechanically-induced or residual, is to change the index of refraction of the optical material.

In this case, the application of sufficient temperatures within the relay and projection lens elements of projector 102, particularly in localized regions, causes thermally induced optical stress birefringence. The induced birefringence difference is directly proportional to the induced difference in the principal mechanical stresses or stress tensors, $\Delta\sigma_{1,2}=(\sigma_1(x,y,z)-\sigma_2(x,y,z))$ between two spatial proximate locations, as given by equation (4);

$$\Delta n = \Delta n_{1,2}(x,y,z) = \kappa \Delta\sigma_{1,2} \tag{6}$$

where κ is the stress optical coefficient of the material, given in units of mm$^2$/N and the induced mechanical stress σ is typically given in N/mm$^2$ (or MFa). The induced stress σ, or equivalently the induced stress birefringence Δn, can be written in terms of the material temperature change induced by heating:

$$\Delta n \approx \rho E \Delta T \kappa/(1-\mu) \tag{7}$$

where ΔT is the induced temperature change. In this equation, ρ is the coefficient of thermal expansion (CTE), which for room temperature range glass, is typically given in units of $10^{-6}/°$ K. The variable E is the Young's modulus, which is a measure of the stiffness of an isotropic elastic material, and which is often given in units of N/mm$^2$. Poisson's ratio, the unit-less variable μ, is a metric for the orthogonal response of a material to a strain (stretching or contraction).

The induced temperature change ΔT, can be related to the light absorption. The amplitude function A(x,t) can be expanded to show its dependence on light absorption α:

$$A(x,t)=A(x)=A_0 e^{-\alpha x/2} \tag{8}$$

where $A_0$ is the initial amplitude. This leads to Beer's Law that describes the exponential nature of light absorption:

$$I(x)=I_0 e^{-\alpha x} \tag{9}$$

where I(x) is the light intensity (or irradiance) in units of W/m$^2$, and $I_0$ is the initial light intensity.

The volume heat generation Q(x), in W/m$^3$, from the light absorbed within a thickness x of a material, as a function of the light intensity I(x), and the internal transmittance $t_i$ or the absorption coefficient α, is:

$$Q(x)=I(x)(1-t_i)/x=I(x)(1-e^{-\alpha x})/x \tag{10}$$

The law of Heat Conduction, or Fourier's Law, in a one-dimensional form is given by $q_x=-K\, dT/dx$, where $q_x$ is the local heat flux, in W/m$^2$, and K is the thermal conductivity (in W·m$^{-1}$·K$^{-1}$). It is noted that while heat transfer and balance (steady state) depends on heat conduction, convection, and radiation, for an optical structure, conduction is often the most important factor in determining temperature gradients or changes. Also, the thermal conductivity K of most materials, including glass, is fairly constant over a broad range or temperatures. Fourier's Law can be integrated to derive a change in temperature ΔT affecting an area from light absorption:

$$\Delta T \approx I_0 L x \alpha /4K \tag{11}$$

where L is the axial thickness of the optical element

Substituting Eq. (11) into Eq. (7) links the stress induced birefringence to the incident light intensity and the material absorption:

$$\Delta n \approx I_0 L \times \frac{\rho \kappa \alpha E}{4K(1-\mu)} \tag{12}$$

This equation suggests several figure of merits or metrics which are useful to the present invention. The first thermal stress birefringence metric:

$$M_1 = \frac{\rho \kappa \alpha E}{K(1-\mu)} \tag{13}$$

is a materials (glass) only stress birefringence metric which can be useful in selecting candidate glasses. A second intensity-weighted thermal stress birefringence metric:

$$M_2 = I_0 L M_1 = I_0 L \frac{\rho \kappa \alpha E}{K(1-\mu)} \tag{14}$$

is valuable because it factors in the light intensity (i.e., optical power density) incident ($I_0$) to the optical element and the axial thickness (L) of the optical element.

In Eq. (12), the distance x is a position within the material, relating to the fact that the intensity given in Eq. (9) and the change in temperature given in Eq. (11) cause localized changes in stress birefringence Δn as a function of position. Including x in metrics $M_1$ or $M_2$ would add little insight relative to glass selection for different lens elements.

An intermediate thermal stress birefringence metric, $M_3=M_1 \cdot L$, suggests that thinner lens elements (smaller thickness L) can tolerate higher values of $M_1$. However, as will be seen, the variations in $M_1$ and $I_0$ tend to dominate the selection and design process.

The second metric $M_2$ factors in the power densities present in the lens elements 205, which can vary through the lens assemblies of the relay lens 250 and the projection lens 270. As the light intensity distributions in the lenses (see FIGS. 7A-7E) can evidence, micro-structures with the highest light intensities occur in regions proximate to the aperture stops 230. As a result, the inventors have discovered that glass selection is most critical for lens elements in these regions. Therefore, the intensity-weighted thermal stress birefringence metric $M_2$ has been found to be helpful, provided that peak light intensities ($I_0$) can be reasonably estimated.

The inventors used finite element analysis (FEA) to thermal-mechanically model the temperature induced stress from light absorption in the projection lens 270 of FIG. 6A. This modeling indicated that the optical flux levels transiting the negative lens elements 402 and 403 nearest the aperture stop 230 of the projection lens 270 can be 8× (or more) higher than the light levels transiting the outermost positive lens elements 400 and 405, causing localized temperature changes of ΔT~5° C. These localized temperature changes in turn cause mechanical stress, and thus birefringent refractive index changes Δn.

With this background, The tables given in FIG. 8A-8D provides data on an assortment of modern glasses by name, along with key parameters including their refractive indices $n_d$, Abbe number $v_d$, internal transmission $t_i$, absorption $\alpha$ (where $\alpha=-\ln(t_i)/x$), stress optical coefficient $\kappa$, thermal conductivity K, coefficient of thermal expansion (CTE) $\rho$, Poisson's ratio ($\mu$), Young's modulus (E), and the glass-only figure of merit $M_1$. The absorption coefficient values ($\alpha$) were calculated using internal transmittance values at $\lambda=460$ nm. Although other assessment wavelengths can be used, most glasses experience an increase in internal absorptance in the UV-to-blue spectral range, and thus have increased stress birefringence potential compared to green or red spectral ranges. FIG. 8A shows various glass properties for a collection of low stress birefringence susceptibility glasses. FIG. 8B shows the same properties for a collection of moderate and high stress birefringence susceptibility glasses. FIGS. 8C and 8D show the calculated values for the thermal stress birefringence metrics $M_1'$, $M_1''$ and $M_1$, for the glasses in FIGS. 8A and 8B, respectively.

The tables of FIGS. 8A-8D show a subset of the glasses (<15%) available in the combined Schott and Ohara glass catalogs, which feature a disproportionate share of glasses that have advantageous properties for low thermally induced stress birefringence. One of the most common glasses, Schott BK-7 glass, has a good low value for the figure of merit $M_1$ (~$0.51\times10^{-6}$ $W^{-1}$), while the new lead free glasses (such as N-SF2 and N-SF4) tend to have higher $M_1$ values than the original glasses (SF-2 and SF-4) that they replace. The tables of FIGS. 8A-8D includes only Schott or Ohara optical glasses, but alternative or equivalent glasses from other manufacturers can be analyzed and used in design appropriately.

The glasses in the tables of FIG. 8A-8D are also identified as to whether they are considered to be crowns or flints. By this glass metric, the best potential glasses, relative to minimizing thermally induced stress birefringence continue to be fused silica (represented by Schott Lithosil-Q) and Schott SF-57 (or its equivalents, such as Ohara PBH56), as they have very low or negligible thermal stress birefringence metric values ($M_1 < 0.1\times10^{-6}$ $W^{-1}$). These glasses are the same ones suggested by Schmidt et al., and others. In examining this table, which spans nearly the full range of available glasses, it is noted that the glass only thermal stress birefringence metric $M_1$ varies over a range of 25,000:1 from the best glass (Lithosil; $M_1 \sim 0.001\times10^{-6}$ $W^{-1}$) to the worst glass (Ohara S-NPH2; $M_1 \sim 28.5\times10^{-6}$ $W^{-1}$). Notably, there is a ~8× or more jump in the $M_1$ values from the negligible stress birefringence susceptibility glass group ($M_1 \approx 0.001\times10^{-6}$ $W^{-1}$ to $0.05\times10^{-6}$ $W^{-1}$) that contains fused silica, SF-57, and PBH56, to the best of the low stress birefringence susceptibility glasses, such as Schott LLF1 or Ohara S-NSL36 ($M_1 \approx 0.36\times10^{-6}$ $W^{-1}$ to $0.46\times10^{-6}$ $W^{-1}$).

The Tables of FIGS. 8C-8D also include two constituent figures of merit $M_1'$ and $M_1''$. The first constituent figure of merit $M_1'=\rho\kappa\alpha$, and accounts only for the dominant parameters: the coefficient of thermal expansion ($\rho$), the stress optical coefficient ($\kappa$), and the absorption coefficient ($\alpha$), whose values vary widely, by ~30×, ~200×, and ~950×, respectively, amongst the different glasses. Relative to the first constituent figure of merit $M_1'$, fused silica has the smallest value as its absorption and CTE are both very low, while SF-57 and PBH56 do well because their stress optical coefficients are low. Likewise, the worst glasses relative to the glass-only thermal stress birefringence metric $M_1$, Schott N-SF4 and Ohara S-NPH4, are the worst relative to the first constituent figure of merit $M_1'$ metric as well, with values 6,000-12,000 greater than Lithosil fused silica.

However, for the purposes of choosing glasses for lens design, accurately discriminating among the glasses with low or moderate stress birefringence susceptibility is important. It is noted that several materials properties, namely Poisson's ratio $\mu$, Young's modulus E, and the thermal conductivity K all individually vary in a limited range of ~2-2.5×, and thus have secondary impact on the glass-only thermal stress birefringence metric $M_1$. However, in making glass selection decisions for lens design, these secondary factors can be important. Thus, the tables of FIGS. 8C-8D also shows a secondary constituent metric $M_1''$ for just these terms, where $M_1''=E/(K(1-\mu))$ and $M_1=M_1' \cdot M_1''$.

In looking at the data column for the secondary constituent metric $M_1''$, it is noted that fused silica (Lithosil) does well again, because it's Poisson's ratio $\mu$ and thermal conductivity K have advantageous values. But glasses such as Ohara S-NSL36, Ohara S-NSL-3, Schott LF-5, and Schott LLF1 are also comparatively advantaged relative to other glasses, as their $M_1''$ values are 2-3× lower than the most penalized glasses. Thus, using $M_1'$ as a surrogate for $M_1$ can give an incorrect indication of the stress sensitivity relative to the glasses with low or moderate $M_1$ values, and potentially lead to poor glass choices during lens design.

The accompanying tables shown in FIGS. 9A and 9B provide estimates for the intensity-weighted thermal stress birefringence metric $M_2$ for the lens elements in the first exemplary designs, projection lens 270 of FIG. 6A and the relay lens 250 of FIG. 6C, respectively. In each of these tables, the lens elements are identified with the lens element part numbers from FIG. 6A. In both tables, values for the glass-only thermal stress birefringence metric $M_1$ are given for each of the lens elements, corresponding to the values given in the tables of FIGS. 8A-8D. An aggregate $M_1$ value is also given for each lens assembly. In estimating the intensity-weighted thermal stress birefringence metric $M_2$, axial thickness values (L) are used for the lens elements, although alternate values, such as the average lens thickness of the traversed clear aperture of a given lens element, could be used instead. The tables also include values for the normalized power loads on each element, based on modeled estimated optical power loads in $W/mm^2$ or lux. The intensity-weighted thermal stress birefringence metric $M_2$ is then estimated for each lens element using the normalized power load values. An aggregate $M_2$ value is also given for each lens assembly.

The first exemplary projection lens design of FIGS. 6A-6B was designed with priority for image quality, and with thermally induced stress birefringence not ignored, but treated as a secondary consideration. Thus, the table of FIG. 9A shows a glass set comprising glasses which are all solidly in the moderate range for the glass-only thermal stress birefringence metric ($M_1 \approx 1.0\times10^{-6}$ $W^{-1}$ on average). The glasses used in this design do not include any glasses having negligible $M_1$ values (such as PBH56 or fused silica), or any glasses having very high $M_1$ values (such as Schott N-SF2 or N-SF4). As the various elements have comparable thermal stress birefringence metric $M_1$ values, and as the highest applied power densities occur at lens elements 400-402, which are closest to the spatial light modulator 170, the aggregate intensity-weighted thermal stress birefringence metric $M_2$ is dominated by lens elements 400-402.

Figure 10A:
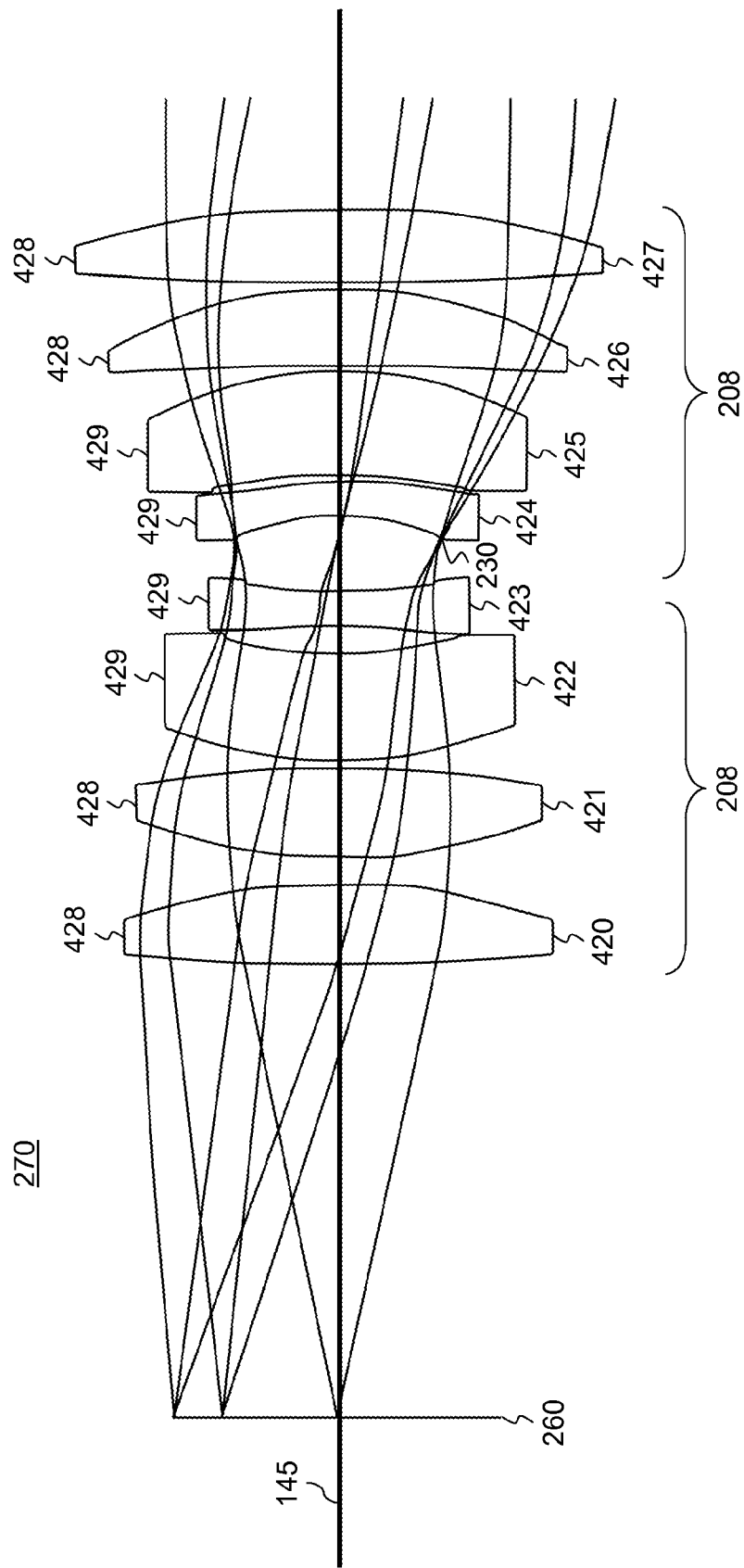
FIG. 10A depicts the optical design of a second exemplary projection lens, having low thermal stress susceptibility and poor image quality.

FIG. 10A illustrates the design of a second exemplary projection lens 270. Like the first exemplary projection lens of FIG. 6A, this lens generally has the classic double Gauss form with two groups of lens elements 208, with four inner negative lens elements 422, 423, 424 and 425 about the aperture stop 230, and four outer positive lens elements 420, 421, 426 and 427. This lens was designed with a priority on reducing thermally stress birefringence, therefore all of the lens elements are either fused silica lens elements 428 or Ohara PBH56 lens elements 429. In particular, the four inner flint glass lens elements 422, 423, 424 and 425 are fabricated using the very low stress Ohara PBH56 glass, and the four outer crown glass lens elements 420, 421, 426 and 427 are all fabricated using the lowest absorption crown glass, fused silica.

In considering the tables of FIGS. 8A-8D, it is noted that the Schott SF57 glasses and Ohara S-FSL-5 have glass-only thermal stress birefringence metric $M_1$ values that are ~½ that of Ohara PBH56. However, other considerations influence the design choices. In particular, the Schott SF57 types are in rare supply, whereas PBH56 is readily obtainable in fairly large quantities. Furthermore, the Ohara S-FSL5 glass is very expensive (about 13× that of BK7), and is not very desirable relative to high susceptibility to staining.

Figure 10B:
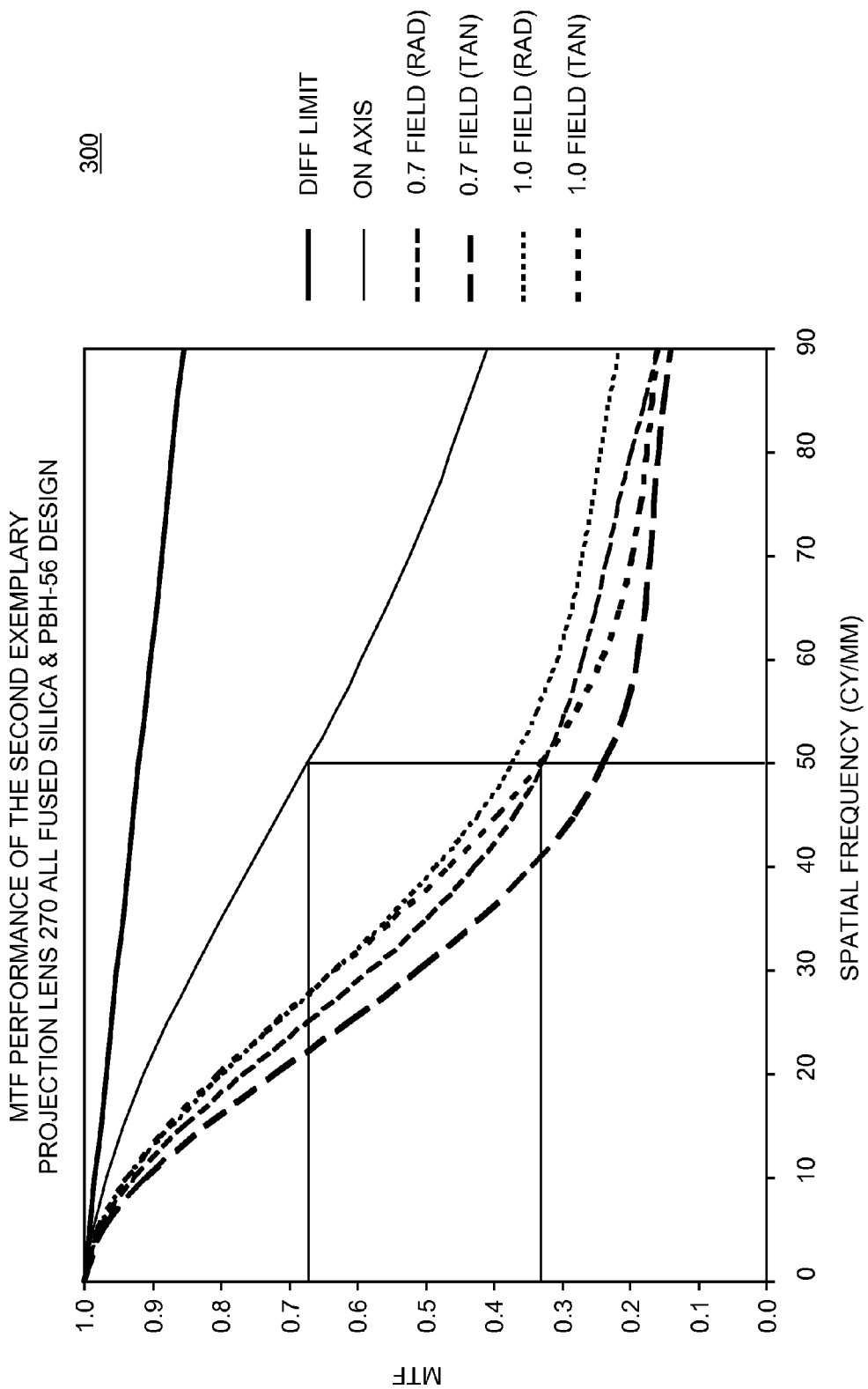
FIG. 10B depicts the optical performance of the second exemplary projection lens of FIG. 10A using MTF plots.

The table of FIG. 11A shows thermal stress birefringence metric values for the second exemplary projection lens of FIG. 10A. It can be seen that this configuration has a greatly reduced $M_1$ figure of merit that is ~35× lower in value than the first exemplary projection lens of FIG. 6A (compared to the table of FIG. 9A). However, as can be seen from the MTF plot 300 in FIG. 10B, the image quality has comparatively suffered, even though the second exemplary projection lens of FIG. 10A has eight lens elements instead of six. In particular, as previously discussed with respect to FIG. 6B, the first exemplary projection lens provides ~65% MTF at 50 cy/mm over the imaged field. By comparison, the second exemplary projection lens of FIG. 10A provides ~68% MTF on-axis, but averages an unacceptable 32% MTF off-axis. The off-axis MTF is only half of what was achieved with the first exemplary projection lens.

Figure 10C:
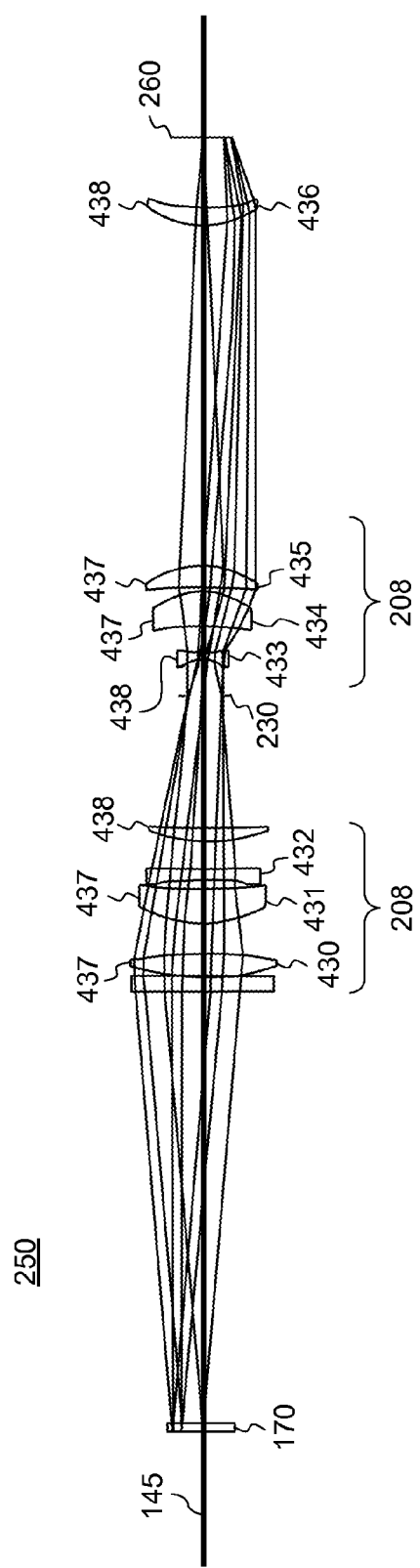
FIG. 10C depicts the optical design of a second exemplary relay lens, having low thermal stress susceptibility and poor image quality.

Similarly, FIG. 10C illustrates a second exemplary relay lens 250 which was designed with high prioritization to reducing susceptibility to thermally induced stress birefringence. In particular, all the lens elements 430-436 have negligible $M_1$ values, and are either fused silica lens elements 437 or SF-57 lens elements 438. This lens has the same general configuration of the relay lens 250 of FIG. 6C, except that it resembles a double Gauss type lens even more weakly. However, like the projection lens 270 of FIG. 10A, the two innermost lens elements 432 and 433 positioned about the aperture stop 230 are negative lenses fabricated using a low stress flint glass (SF-57 in this case). The outer lens elements 430, 431, 434 and 435 are fabricated using the low absorption crown glass fused silica. Additionally, a field lens element 436 positioned near the intermediate image 260 is fabricated using SF-57.

FIG. 11B shows a table giving the values of the thermal stress birefringence metrics $M_1$ and $M_2$ for the second exemplary relay lens of FIG. 10C. Comparing them to the values given in FIG. 9B, it can be seen that they are much lower (~90×) than the first exemplary relay lens of FIG. 6C, indicating that the expected susceptibility to thermally induced stress birefringence would be greatly reduced. However, as demonstrated by the corresponding MTF plot 300 of FIG. 10D, the image quality of the second exemplary relay lens of FIG. 10C has also suffered relative to the first exemplary relay lens of FIG. 6C. In particular, whereas FIG. 6D showed ~79% MTF at 50 cy/mm over the imaged field for the first exemplary relay lens, FIG. 10D shows that the second exemplary relay lens provides ~71% MTF on-axis, and an average of only ~56% MTF off-axis.

Figure 12A:
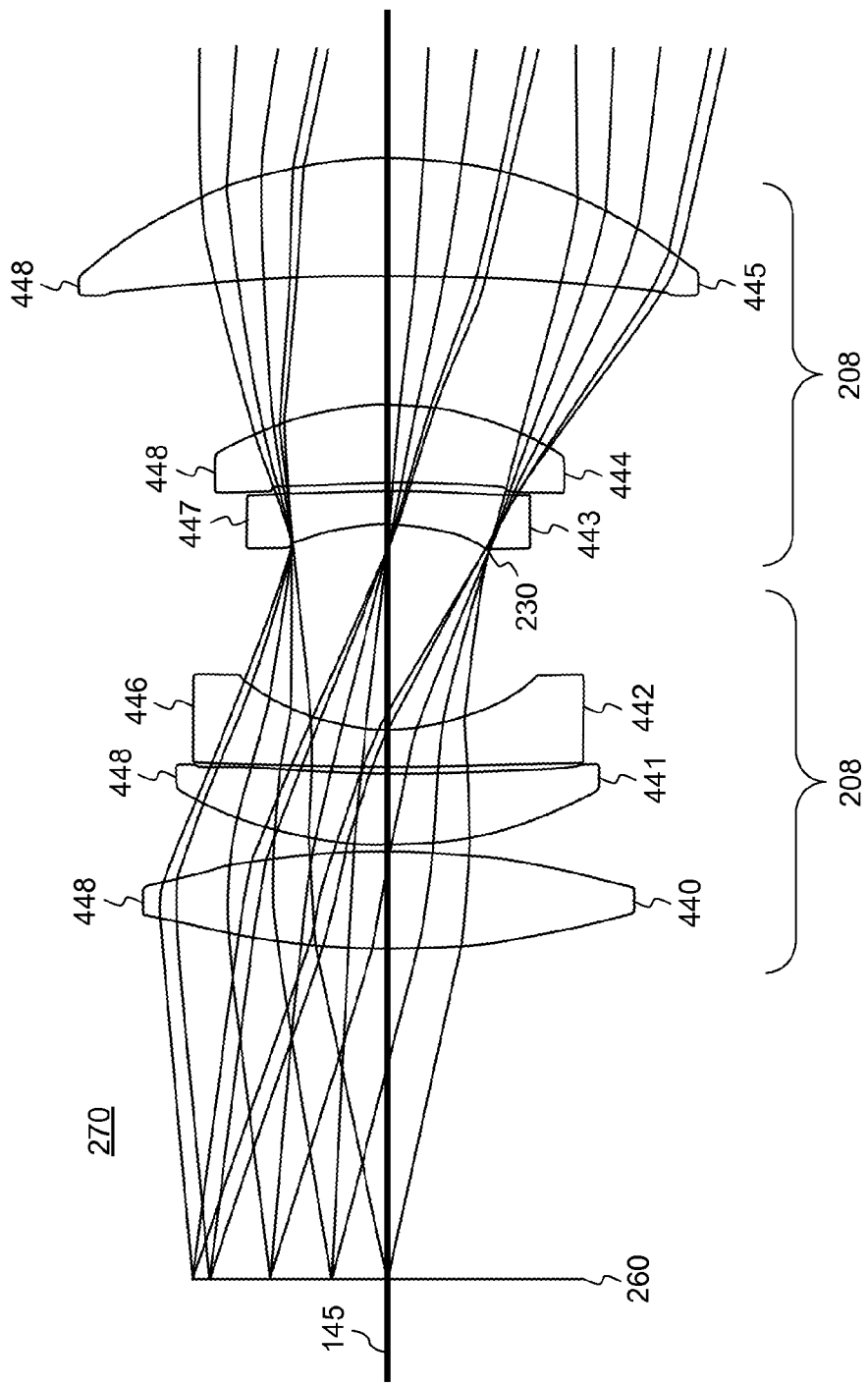
FIG. 12A depicts the optical designs of a third exemplary projection lens, having low thermal stress susceptibility and good image quality.

These results suggest that a balanced design approach, giving comparable priority to attaining both good image quality and low thermally induced stress birefringence, is advantageous to the designs of both the projection lens and the relay lens. FIG. 12A illustrates the design of a third exemplary projection lens 270, which differs from its predecessors in that a balanced design emphasis was given to both good image quality and low thermally induced stress birefringence. Like the first and second exemplary projection lenses shown in FIGS. 6A and 10A, this projection lens by appearance also has the classic double Gauss forth with two groups of lens elements 208, except that the larger negative meniscus lens element 442 to the left of the aperture stop 230, is a crown fused silica lens element 446 instead of a flint (PBH56), which goes against the classical form of this lens type. The smaller negative meniscus lens element 443 is a flint glass PBH56 lens element 447. However, the other lens elements, the four outer crown lens elements 440, 441, 444 and 445 are Ohara S-LAL18 lens elements 448, rather than fused silica or PBH56 lens elements.

In undertaking the design of this lens system, the use of a high-index, weak-crown glass, such as Ohara S-LAL18, was useful for these outer elements to provide an improved MTF performance relative to the second exemplary projection lens of FIG. 10A, while providing improved thermal stress birefringence performance relative to the first exemplary projection lens of FIG. 6A. Amongst the candidate high-index, weak-crown glasses, Ohara S-LAL18 glass has the lowest glass-only thermal stress birefringence metric $M_1$ value available ($M_1$=0.726×10$^{-6}$ W$^{-1}$), compared to other such glasses, like Ohara S-LAL8 ($M_1$=1.15×10$^{-6}$ W$^{-1}$), Ohara S-LAL54 ($M_1$=1.31×10$^{-6}$ W$^{-1}$), or Ohara S-LAL61 ($M_1$=1.56×10$^{-6}$ W$^{-1}$), or high-index, weak-flint glasses like Ohara S-LAH66 ($M_1$=1.09×10$^{-6}$ W$^{-1}$).

FIG. 12B depicts the MTF plot 300 for the third exemplary projection lens 270 of FIG. 12A. The MTF averages ~59% at 50 cy/mm at all field points. While the image quality is not quite as good as the first exemplary projection lens (see FIG. 6B), it is much better than the performance provided by the second exemplary projection lens (see FIG. 10B).

Accompanying tables FIGS. 13A and 13B are provided for these third exemplary projection lens and relay lens designs, which give calculated values for the thermal stress birefringence metrics $M_1$ and $M_2$. These tables can be compared to those for the two alternate designs for the projection lens 270 and relay lens 250, given in FIGS. 9A-9B and FIGS. 11A-11B, to explore the different trade-offs with respect to reducing stress birefringence versus providing enhanced image quality.

The table in FIG. 13A shows that the aggregate glass-only thermal stress birefringence metric has a value $M_1$=2.95×10$^{-6}$ W$^{-1}$, which is ~2× smaller than the value for the first exemplary lens of FIG. 6A (see FIG. 9A). This table also shows that the intensity-weighted thermal stress birefringence metric $M_2$, which factors in lens element thickness and the incident light intensity, is even larger, approaching a 3× improvement. While the innermost lens elements 442 and 443 experience the highest thermal loads, their $M_1$ values are so low that the $M_2$ values remain low even with the incident light intensity factored in. As a result, minimal contrast loss is expected from these elements. While the outer lens elements 440, 441, 444 and 445 have higher $M_1$ values, their power loads are much more modest, and their $M_2$ values are muted.

Comparing the data of FIG. 13A to that of FIG. 9A suggests that further opportunities to improve the lens design relative to stress birefringence, particularly with respect to lens element 444. If this lens element could be fabricated using a glass with a lower $M_1$ value, the susceptibility to stress birefringence could be measurably improved. While using fused silica or PBH56 would certainly help for stress birefringence, their dispersion properties would have a negative impact on the image quality. As an alternative, a glass near the middle of the glass chart (FIG. 5B), such as a weak-crown or weak-flint, that has both intermediate dispersion and low stress birefringence characteristics can be used for this element, to help balance color aberrations while also reducing stress birefringence.

As one example, a low-index ($n_d$=1.517) weak-crown glass ($v_d$=52.4), such as Ohara S-NSL36, which has a smaller glass-only thermal stress birefringence metric ($M_1$=0.463× $10^{-6}$ $W^{-1}$) than does the high-index ($n_d$=1.729) weak-crown ($v_d$=54.7) Ohara S-LAL18 ($M_1$=0.726×$10^{-6}$ $W^{-1}$), can be used instead. This can be helpful, potentially reducing the stress birefringence susceptibility per $M_2$ by 25% compared to the current third exemplary projection lens. Likewise, other neighboring glasses like Ohara S-BAL-11 (a low-index crown, $n_d$=1.572, $v_d$=57.7, $M_1$=0.529×$10^{-6}$ $W^{-1}$), Schott LLF-1 (a low-index weak-flint, $n_d$=1.548, $v_d$=45.8, $M_1$=0.375×$10^{-6}$ $W^{-1}$) or Schott LF5 (a low-index flint, $n_d$=1.581, $v_d$=40.9, $M_1$=0.453×$10^{-6}$ $W^{-1}$), all with relatively low glass-only figure of merit values ($M_1$<0.53×$10^{-6}$ $W^{-1}$) can also be used advantageously. However, as these glasses have lower refractive indices than does Ohara S-LAL18, the shape of lens element 444, or any lens elements that such a change was applied to, would likely become more severe to deliver the same optical power, which in turn can introduce more aberrations. Understandably such substitutions cannot be done without incurring further design optimizations, including perhaps corrective glass changes for other elements. For example, another lens element may be required between lens elements 444 and 445 (FIG. 12A).

In considering FIGS. 8, 11A and 13A, a threshold is suggested for choosing glasses for lens design where the stress birefringence susceptibility must be low or negligible. In particular, applying a glass selection limit restricting choices to glasses having low thermal stress birefringence metric values (e.g., $M_1$≤0.80×$10^{-6}$ $W^{-1}$) is useful in many cases. This limit includes not only the negligible $M_1$ glasses like fused silica and PBH56, but also BK7 (the most commonly used glass), together with middle-of-the-glass-chart low-index weak-flints or crowns (such as LLF1, S-NSL36) and other similar glasses (LF5, S-BAL11). It also includes high-index, middle-of-the-glass-chart glasses (S-LAL18 and SLAL7 ($M_1$=0.736×$10^{-6}$ $W^{-1}$), a high-index flint (SF6), a middle-index flint (F2) and two glasses with useful partial dispersion characteristics for color correction (N-PK52A and N-FK51A). Certainly, the development of new optical glasses, resident in the middle of the glass chart with high ($n_d$>1.70) or low ($n_d$<1.60) refractive indices, but with yet lower stress birefringence susceptibility ($M_1$~0.2×$10^{-6}$ $W^{-1}$, for example) would help this class of design problems significantly.

For lens designs where thermally induced stress birefringence is a high priority, the inventors have found that advantaged results can be obtained if the lens elements nearest the aperture stop 230 (such as lens elements 442 and 443 in FIG. 12A) are made using glasses with negligible thermal stress birefringence metric $M_1$ values (e.g., $M_1$≤0.1×$10^{-6}$ $W^{-1}$). Other lens elements having small clear apertures (radial size), or experiencing high power densities (typically in the next grouping of lens elements outward from the aperture stop 230 such as lens elements 441 and 444 in FIG. 12A), or a field lens near a small object (such as lens element 456 of FIG. 12C) can also benefit from the use of these same negligible $M_1$ glasses. However, for cases where image quality optimization motivates other glass choices, then opening up the glass choices to include the low $M_1$ value glasses (e.g., 0.1×$10^{-6}$ $W^{-1}$≤$M_1$≤0.8×$10^{-6}$ $W^{-1}$) can help significantly. For lens elements experiencing even less power density exposure, the glass selection list can be relaxed further, for example to include additional moderate $M_1$ value glasses (e.g., 0.8×$10^{-6}$ $W^{-1}$≤$M_1$≤1.6×$10^{-6}$ $W^{-1}$). As this threshold expands the list to include several high-index flint glasses (such as SF1, SF2, or SF4) and high-index, middle-of-the-glass-chart glasses (such as LAH-66, LAM60, LAL54, and LAL61), the lens design latitude is opened up significantly. In some cases, these same moderate $M_1$ glasses (0.8×$10^{-6}$ $W^{-1}$≤$M_1$≤1.6×$10^{-6}$ $W^{-1}$) can be used for more interior lens elements that experience higher power densities if it is found that this would provide a significant improvement in image quality. However, in order to keep thermal stress birefringence levels low, the thickness (L) of such lens elements should generally be kept small (a few millimeters, for example). Using the more restrictive low $M_1$ threshold ($M_1$≤0.80×$10^{-6}$ $W^{-1}$) eliminates more than 85% of the glasses in the glass chart from consideration, while using the less restrictive moderate $M_1$ threshold ($M_1$≤1.60×$10^{-6}$ $W^{-1}$) eliminates about 60% of the glasses (relative to the current Schott and Ohara optical glass catalogs). Obviously, a lens designer can choose to select glasses where $M_1$>1.60× $10^{-6}$ $W^{-1}$ in order to meet image quality requirements, particularly for lens elements experiencing a low power density, however this will come at the cost of increased thermal stress birefringence susceptibility.

The prescription for the third exemplary projection lens 270, shown in FIG. 12A, is provided in the table of FIG. 14A, with the data for radii (lens shape or curvature), thicknesses, and materials included. All the lens surfaces have spherical, rather than aspheric, toric, or cylindrical profiles. Potentially the use of rotationally symmetric aspheric surfaces on one or more lens elements can provide even greater design freedom, such that more lens elements can be made using low thermal stress birefringence susceptibility glasses (e.g., $M_1$≤0.80× $10^{-6}$ $W^{-1}$ instead of $M_1$≤1.6×$10^{-6}$ $W^{-1}$) while maintaining image quality.

Parameters, such as aspheric coefficients, are commonly used to describe aspheric surfaces in lens design programs such as Code V and Zemax and are described in optical texts such as "Lens Design Fundamentals," by R. Kingslake (Academic Press, New York, 1978). Aspheric surfaces usually enable improvements (reduced magnitudes) to the monochromatic aberrations of a lens system. However, the use of aspheric surfaces profiles can indirectly improve color aberrations as well by redistributing optical power in a lens system. Such surfaces may also yield solutions that depart from the traditional double gauss lens form described earlier. Thus, the use of aspheric surfaces can enable an alternate design for an imaging lens or lens system, including the projection lens 270 of FIG. 12A, potentially providing both better image quality performance and a better selection of glasses for low thermal stress birefringence susceptibility. For example, the use of one or more aspheric surfaces in the design of the third exemplary projection lens could enable lens element 444, which according to its $M_2$ value, experiences high power loading, to be switched to the low stress Ohara S-NSL36 glass from the higher stress Ohara S-LAL18 glass, without the need to the aberration compensating lens element proposed earlier.

Figure 12C:
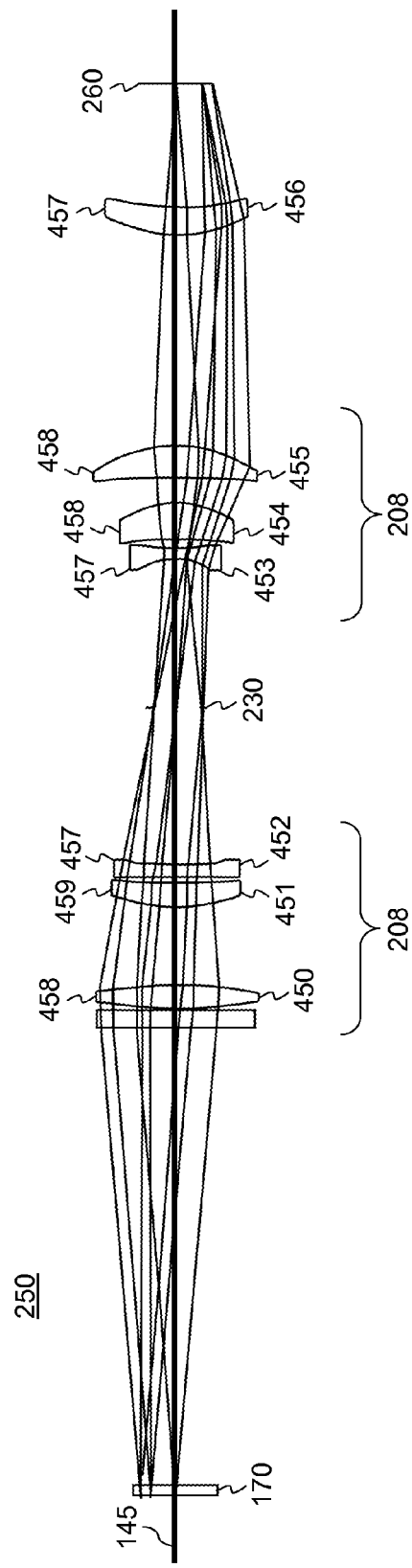
FIG. 12C depicts the optical design of a third exemplary relay lens, having low thermal stress susceptibility and good image quality.

FIG. 12C illustrates a third exemplary relay lens 250 which was designed with a balanced prioritization relative to achieving both low stress birefringence susceptibility and good image quality. This third exemplary relay lens has the same general configuration of the first and second exemplary relay lenses of FIGS. 6C and 10C, although it resembles a classic double Gauss type lens more closely than does the FIG. 10C lens. In this lens system, the two innermost lens elements 452 and 453 positioned about the aperture stop 230 are negative PBH56 lens elements 457 fabricated using the low-stress flint glass PBH56. The field lens element 456 near the image plane or intermediate image 260 is also a PBH56 lens element 457. Lens element 451 is a low-absorption crown glass fused silica lens element 459. The other lens elements 450, 454 and 455 are Ohara S-LAL18 lens elements 458, which have a relatively low $M_1$ value ($M_1$=0.726×10$^{-6}$ W$^{-1}$). The prescription for the third exemplary relay lens 250, shown in FIG. 12C, is provided in the table of FIG. 14B, with the data for radii, thicknesses, and materials included.

The table given in FIG. 13B shows the thermal stress birefringence metric values for the third exemplary relay lens of FIG. 12C. In considering the data of FIGS. 9B, 11B and 13B, it can be seen that the thermal stress birefringence metrics $M_1$ and $M_2$ for the second exemplary relay lens (FIG. 11B) are much lower (~0.90×) compared to the first exemplary relay lens (FIG. 9B), whereas the third exemplary relay lens (FIG. 13B) has thermal stress birefringence metrics $M_1$ and $M_2$ that are only 2-3× lower compared to the first exemplary relay lens. (FIG. 9B). However, the smaller improvements in the thermal stress birefringence susceptibility is offset by better image quality performance.

FIG. 12D shows an MTF plot 300 characterizing the imaging quality performance for the third exemplary relay lens of FIG. 12C. As per the balanced design intent, the image quality of this third exemplary relay lens is substantially improved relative to the second exemplary relay lens (see FIG. 10D), having ~79% MTF at 50 cy/mm. The third exemplary relay lens provides nearly diffraction limited performance for all field positions, much like the first exemplary relay lens (see FIG. 6D).

In examining the thermal stress birefringence susceptibility data in FIG. 13B for the third exemplary relay lens of FIG. 12C 250, it is seen that lens element 454 is the dominant contributor to the intensity-weighted thermal stress birefringence metric $M_2$. This suggests that changing lens element 454 from SLAL-18 ($M_1$=0.726×10$^{-6}$ W$^{-1}$) to a lower stress glass, such as Ohara S-NSL36 ($M_1$=0.462×10$^{-6}$ W$^{-1}$), would significantly reduce the thermal stress birefringence susceptibility. Of course, as this glass has a lower refractive index, the lens would have to be redesigned to compensate for the loss of optical power, while nominally maintaining the image quality. Additional lens elements, aspheric surfaces, or other corrective approaches can be employed to accomplish this.

The lens designs prescribed in FIGS. 14A and 14B, and shown in FIGS. 12A and 12C, were fabricated, assembled, and tested in the projector 102 (FIG. 2) of the present invention. This projector used light source assemblies 115 comprising multiple laser arrays 120 and combining optics, in general accordance with the design principle associated with FIGS. 2, 3A and 3B. This projector also used the basic imaging lens architecture of FIG. 4, with the third exemplary projection and relay lenses of FIGS. 12A and 12C substituted for the first exemplary projection and relay lenses of FIGS. 6A and 6C.

Significantly improved levels of polarization contrast were observed in an operational projector providing ~11,000 screen lumens when using the third exemplary projection and relay lenses of FIGS. 12A and 12C, with ~200:1 stabilized polarization contrast without a despeckler 180, and ~250:1 polarization contrast with an operating despeckler 180. As discussed earlier, it is expected that even further improvements can be realized by making additional adjustments to the lens designs.

In considering the prior discussion, it is noted that lens designers typically guide their efforts using a lens design program merit function to combine differentially weighted terms that express their design intent. For example, a multi-factorial lens design merit function can contain terms for focal length, aberration correction, working distance, glass selection, and numerous other parameters. However, at present, stress birefringence is not available as a design control parameter or term available for lens design merit functions in common optical design programs such as Code V™ (Optical Research Associates, Pasadena, Calif.) or Zemax™ (Zemax Inc., Bellevue, Wash.). Moreover, many of the constituent factors on which the glass-only thermal stress birefringence metric $M_1$ depends (such as Poisson's ratio ($\mu$) or the stress optical coefficient ($\kappa$)) are also not directly available as sourced data in the databases of the lens design programs. As a result, in order to reduce stress birefringence while optimizing image quality, the lens designer will generally need to be guided less by automated computer processor calculations than is typical today.

In some cases, lens design programs may have capabilities that would enable a lens designer to import the additional optical materials data into the program databases, and then supply the $M_1$ and $M_2$ equations as calculative and weighted parameters for a lens design program merit function to provide a method for more fully automating the design of an imaging lens having a reduced susceptibility to thermally induced stress birefringence.

The merit function should generally include one or more image quality performance terms and at least one term related to a thermally-induced stress birefringence performance term computed using a thermal stress birefringence metric. The lens design can then be automatically optimized by optimizing the merit function. In this way, the program will be enabled to automatically balance the thermal stress birefringence susceptibility and the image quality performance, as well as any other relevant lens attributes.

An example of a lens design merit function Q that can be used to guide the lens optimization process is:

$$Q = w_a \sum_n w_A A_n + w_b \sum_m w_B G_m + w_c \sum_i w_C M_{2,i} \qquad (15)$$

where $A_n$ are aberration or image quality correction terms (for example, for spherical aberration, astigmatism, MTF, PSF (point spread function) or encircled energy), $G_m$ are terms for geometrical limits or attributes (for example, for working distances, angular limits, collected numerical aperture (NA) or F-number (F/#), field of view, magnification, focal length, track length, lens element thickness limits, or depth of focus) and $M_{2,i}$ are terms for the intensity-weighted thermal stress birefringence metric for the i$^{th}$ lens element. The weighting factors $w_a$, $w_b$, $w_c$ $w_A$, $W_B$ and $w_C$ are used to adjust the relative importance of the various terms in the merit function according to the requirements of a particular application. It is recognized that early in the lens design process, knowledge of the optical power loads may be limited. Therefore, in some embodiments, the lens design merit function Q can use terms for thermal stress birefringence that express the glass only stress birefringence metric $M_1$ instead of the intensity weighted $M_2$ metric. The lens design merit function Q can include numerous other terms, including ones that enable automated glass optimization. In this context, other lens design parameters, such as lens element curvatures (radii), thicknesses, positions (including cemented or not), use of aspheric coefficients, glass choices, or the number of lens elements, are the variables that are adjusted when attempting to optimize the lens relative to the merit function Q. These variable parameters can have targets, ranges, or limits within the lens design merit function.

Figure 15:
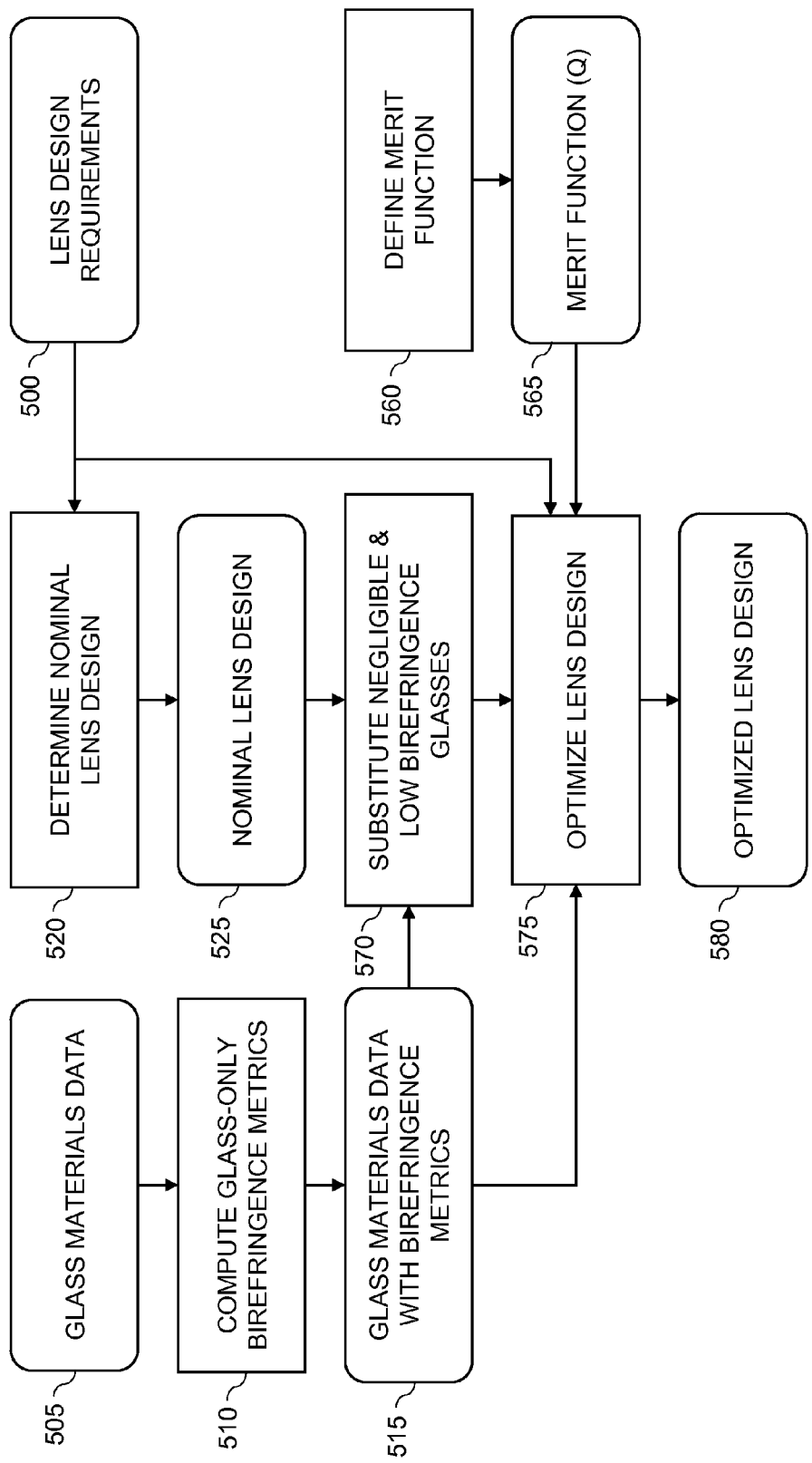
FIG. 15 is a flowchart illustrating a method for designing imaging lens with reduced thermal stress birefringence susceptibility according to an embodiment of the present invention.

FIG. 15 shows a flow chart of an exemplary method for designing an imaging lens having reduced susceptibility to thermally-induced stress birefringence which involves optimizing a merit function that includes a thermally-induced stress birefringence performance term. An input to the lens design process is a set of lens design requirements 500. The lens design requirements would include lens design attributes such as various geometrical properties (e.g., focal length, F/#, working distance and magnification), as well as image quality requirements and thermal stress birefringence susceptibility requirements.

Another input to the lens design process is a database of glass materials data 505 accessible from a memory having glass information relevant to the lens design process. Preferably, the glass materials data 505 would include refractive indices ($n_d$), Abbe number ($v_d$), absorption coefficient ($\alpha$), stress optical coefficient ($\kappa$), thermal conductivity (K), coefficient of thermal expansion ($\rho$), Poisson's ratio ($\mu$) and Young's Modulus (E).

A compute glass-only birefringence metrics step 510 is used to determine glass-only thermal stress birefringence metrics (e.g., $M_1$) for the glasses in the glass materials data 505 to determine an updated table of glass materials data with birefringence metrics 515. Generally, glasses having a negligible or low susceptibility to thermal stress birefringence should be used to design imaging lenses having a reduced susceptibility to thermally-induced stress birefringence. Therefore, it is useful to define two sets of candidate glasses: a first set of candidate glasses having a negligible susceptibility to thermal stress birefringence (e.g., $M_1$ 0.1×10$^{-6}$ W$^{-1}$), and a second set of candidate glasses having at most a moderate susceptibility to thermal stress birefringence (e.g., $0.1 \times 10^{-6}$ W$^{-1} \leq M_1 \leq 1.60 \times 10^{-6}$ W$^{-1}$).

A determine nominal lens design step 520 is used to determine a nominal lens design 525 that stultifies the lens design requirements 500, responsive to the glass materials data 505. Preferably, the determine nominal lens design step 520 is performed using any one of the common lens design software packages (e.g., Code V™, or Zemax™) available for use on personal computers leveraging well-known lens design methods. This effort is commonly undertaken using a lens design merit function Q and an iterative optimization process. Generally, such lens design methods include using the lens design software to determine shapes, sizes, spacings and optical glasses for a plurality of lens elements. The resulting nominal design can be stored in a memory, and used as a baseline for both further optimization and comparison.

A define merit function step 560 is used to define a merit function 565, such as the example given in Eq. 15. The merit function 565 will generally include one or more image quality performance terms and a thermally-induced stress birefringence performance term in order to select a lens design that simultaneously produces high image quality and low stress birefringence susceptibility. It is understood that the merit function 565 is mutable, and that a lens designer may add or remove terms from a lens design merit function Q, or change weighting factors, limits, or ranges of acceptability, during the course of the design effort.

A substitute negligible and low birefringence glasses step 570 is used to substitute glasses having a negligible or a low susceptibility to thermal stress birefringence for the glasses in the nominal lens design 525. This step can be done automatically using software executed by a computer processor. Alternately, it can be done manually be a lens designer. In one embodiment, a lens designer substitutes glasses from the first set of candidate glasses for one or more of the lens elements having the highest power densities. In many cases, these will be the lens elements located immediately adjacent to the aperture stop. Glasses for the rest of the lens elements can be selected from either the first or second sets of candidate glasses. Generally, the glasses that are substituted for the original glasses in the nominal lens design 525 are determined by identifying the glasses from the first and second sets of candidate glasses that most closely match the refractive index and dispersive properties of the original glasses.

Next an optimize lens design step 575 is used to determine an optimized lens design 580 responsive to the merit function 565. A computer processor performs this step using an optimization process to adjust various parameters for the lens elements (e.g., thicknesses, spacings and shapes) to provide the best performance. Both interim and final results can be stored in a memory. In some cases, the optimization process can also be used to automatically choose glasses for the lens elements. Since the merit function 565 includes both image quality performance terms and a thermally-induced stress birefringence performance term, the optimized lens design 580 will balance both of these important attributes of the design. The lens designer can choose to emphasize the importance of one attribute or the other by adjusting the weights of the corresponding terms in the merit function 565. There are many optimization processes well known to those skilled in the art that can be used to determine the optimized lens design 580. Examples of common optimization processes include damped least squares, orthonormalization and simulated annealing.

In some cases, the lens designer may conclude that the optimized lens design 580 determined by the optimize lens design step 575 is not adequate to satisfy the requirements of a particular application. In this case, the lens designer may choose to take steps such as substituting different glasses for one or more of the lens elements, adding additional lens elements, allowing one or more of the surfaces to have an aspheric surface profile or adding a diffractive optical surface. The optimize lens design step 575 can then be executed again to determine a new optimized lens design 580.

Even without having the benefit of the automated calculation of lens design program merit functions that include the thermal stress birefringence metrics, the lens designer can successfully design lenses having a reduced susceptibility to thermal stress birefringence by following the principles of this invention. This can be accomplished by using the tables of FIG. 8A-8D (or an expanded version thereof) to guide the lens designer in the selection of optical materials, and then using the optimization tools in a conventional lens design program running on a computer to determine an optimized lens design.

Generally, this process will involve defining a set of lens performance criteria that the imaging lens must satisfy, including one or more image quality performance criteria, and a thermally-induced stress birefringence performance criterion. The image quality performance criteria can, for example, be a specification of the required MTF performance. The thermally-induced stress birefringence performance criterion can, for example, be an allowable maximum value for an aggregate thermal stress birefringence metric which combines intensity-weighted thermal stress birefringence metrics for each of the lens elements.

The most important factor that must be considered in the process of producing a lens design that exhibits minimal thermal stress birefringence, especially under high optical power density conditions, is the selection of the optical glasses. A few glasses are obvious choices such as Schott SF57 and Ohara PBH56 for their near zero stress coefficient, and Fused Silica for its extremely low absorption and low coefficient of thermal expansion. All other glasses impart some larger degree of polarization degradation under thermal stress. A figure of merit such as the previously discussed glass-only thermal stress birefringence metric $M_1$ can be used to create a list that orders the glasses from best (lowest metric value) to worst (highest metric value), such as the list given in FIGS. 8C-8D, or an expanded version thereof. This properties summarized in this glass list are also useful during the lens design process for choosing glass types that have desirable optical aberration control attributes (index and dispersion). A balance between aberration control and thermal stress birefringence control must be made for the glass choice for each lens element, as was previously discussed.

For illustrative purposes, a lens design process similar to that used for designing the third exemplary projection lens 270 of FIG. 12A will now be described with reference to FIG. 16. Again, in this process, the lens designer has the benefit of a lens design program, a computer with a processor and memory, but a lens design merit function Q that lacks terms for directly optimizing thermally induced stress birefringence. Instead the lens designer can use the tables of FIGS. 8A-8D, or their more complete equivalents, including potentially data from other glass manufacturers, as input to the lens designer's efforts. As with the FIG. 15 process, inputs to the lens design process are a set of lens design requirements 500 and a database of glass materials data 505 having glass information relevant to the lens design process.

As with the FIG. 15 process, a compute glass-only birefringence metrics step 510 is used to determine glass-only thermal stress birefringence metrics (e.g., $M_1$) for the glasses in the glass materials data 505 to determine an updated table of glass materials data with birefringence metrics 515. Likewise, a determine nominal lens design step 520 is used to determine a nominal lens design 525 that stultifies the lens design requirements 500, but which may include lens elements that use glasses having poor thermal stress birefringence susceptibility.

Next a substitute negligible stress birefringence glass step 530 is used to determine an intermediate lens design 535. Preferably, this step includes identifying the lens element in the nominal lens design 525 that has an optical glass that most closely matches the refractive index and dispersion characteristics of a high-index/high-dispersion glass having negligible stress birefringence susceptibility (e.g., Schott SF 57 or Ohara PBH56). The optical glass for the identified lens element is replaced by the glass having the negligible stress birefringence susceptibility glass, and the lens design is then re-optimized using the lens design software.

If there are any other optical elements that have glasses that are similar to the high-index/high-dispersion negligible stress birefringence glasses (e.g., refractive index within ±0.1 and v-number within ±20) then the substitute negligible stress birefringence glass step 530 can be applied iteratively until the optical glasses for all such lens elements have been substituted.

Similarly, if there are any other optical elements that have glasses that are similar to a low-index/low-dispersion negligible stress birefringence glass (e.g., fused silica) then the substitute negligible stress birefringence glass step 530 can be applied iteratively to substitute the optical glasses for all such lens elements with the low-index/low-dispersion negligible stress birefringence glass and re-optimize the lens design using the lens design software.

In another embodiment, the substitute negligible stress birefringence glass step 530 identifies which elements in the nominal lens design 525 have the highest optical power densities and substitutes negligible stress birefringence glass (e.g., a glass where $M_1 \leq 0.1 \times 10^{-6}$ $W^{-1}$) for those lens elements. Generally, the negligible stress birefringence glass that most closely matches the refractive index and v-number of the original optical glass of the identified lens element is used to substitute for the original optical glass. Generally, the lens elements having the highest power densities will be the lens elements that are closest to the aperture stop 230. Therefore, it is not always necessary to compute the optical power densities. In some embodiments, the optical glass for the lens elements immediately adjacent to the aperture stop are automatically substituted using negligible stress birefringence glass.

Next, a substitute low stress birefringence glass step 540 is used to determine a new intermediate lens design 545 by substituting the optical material for one of the lens elements with an optical material having a low stress birefringence susceptibility (e.g., $M_1 \leq 0.8 \times 10^{-6}$ $W^{-1}$). Preferably, this step includes identifying the low stress birefringence susceptibility glass from the glass materials data with birefringence metrics 515 that most closely matches the refractive index and v-number of a selected lens element. The optical glass for the selected lens element is replaced by the low stress birefringence susceptibility glass, and the lens design is then re-optimized using the lens design software. The substitute low stress birefringence glass step 540 can be applied iteratively until low stress birefringence susceptibility glasses have been substituted for all of the lens elements.

Next an evaluate composite metrics and update lens design step 550 is used to determine a final lens design 555. For this step, the intermediate lens design 545 is analyzed to determine whether it has acceptable image quality performance. It is also analyzed to determine thermal stress birefringence metrics for the lens elements that incorporates the lens element geometry (e.g., $M_2$), provided that estimates of the optical flux loading on the different lens elements is available. If the image quality performance of the intermediate lens design 545 has been degraded too much, than alternate glass choices can be made. For example, the optical glass for those lens elements which experience a lower power density can be updated to select materials from an expanded set of optical glasses where the threshold thermal stress birefringence metrics is increased somewhat to include intermediate stress birefringence susceptibility glasses (e.g., $M_1 \leq 1.6 \times 10^{-6}$ $W^{-1}$).

An additional supportive step is possible, in which the lens design is modeled thermal-mechanically, for example by finite element analysis (FEA), to model the light absorption volumetric profiles within the lens elements, the resulting heat load and temperature changes $\Delta T$, and then the resulting induced stress birefringence $\Delta n$. This modeling can account for heat conduction, convection, and radiation effects within or around the lens elements and the housing 240, including any lens cooling techniques applied to reduce the thermal effects imparted by light absorption. The results can then be used to test or validate the lens design expectations, including the use of the $M_2$ metric. The resulting information can guide the lens design process, verifying the need for negligible, low, or moderate thermal stress birefringent glasses for given lens elements, or indicating opportunities to select less restrictive glasses.

In some cases, it may also be necessary to relax one or more of the glass selections made in the substitute negligible stress birefringence glass step to use a low stress birefringent glass instead of the original negligible stress birefringent glass. If so, all of the glasses that were selected by the substitute low stress birefringence glass step 540 should be reevaluated.

If the resulting thermal stress birefringence susceptibility is too high, or if the image quality performance is too low, then lens elements can be selectively chosen where the use of aspheric surfaces can provide increased image quality performance while allowing glass materials to be used having a tighter threshold thermal stress birefringence metric (e.g., $M_1 \leq 0.8 \times 10^{-6}$ W$^{-1}$). Emphasis can be directed to changing glasses for lens elements that experience the highest optical power densities.

While the exemplary lens designs given in the description of the present invention have been based on a classical double Gauss lens design, it will be obvious to one skilled in the art that the same basic design principles can be used in the design of any other type of imaging lens, or systems of imaging lenses, where there is a need to reduce susceptibility to thermally-induced stress birefringence. For example, the design principles could be used to design imaging lenses falling into well-known lens design categories such as anastigmat lenses, Petzval lenses, telephoto lenses, zoom lenses, afocal lenses, and F-theta lenses.

As a particular example, F-theta lenses are used in laser printing in post objective or pre-objective scanner configurations, where a scanner such as a galvanometer is located proximate to the aperture stop plane, and all the lens elements of the F-theta objective lens are located on one side (pre- or post-) of the aperture stop plane. F-theta lenses typically have all their lens elements clustered in one group, to either side of the aperture stop. Again, the lens elements nearest the aperture stop are the elements most likely to benefit from careful glass choice selections for reducing thermally induced stress birefringence. As another example, zoom lenses can have multiple lens groups (2-4 for example), including moving groups.

The lens design concepts of the present invention are not limited in application to imaging lenses, but can be used for other lens systems such as illumination systems, or in combined reflective-refractive optical systems such as those based on telescope type design configurations. Again, the lens elements proximate to an aperture stop, or other elements experiencing high power densities are the elements most likely to benefit from the use of reduced stress birefringence susceptibility glasses. In accordance with the present invention, lens systems of any type can be made by selecting negligible stress birefringent susceptibility glasses for use with the lens elements having the highest optical power densities, and then using glasses having at most a moderate stress birefringent susceptibility for the remaining lens elements.

It is noted that the image quality of the exemplary projection lenses 270, per FIGS. 6B and 9B exhibit a limited MTF performance (~30%) at 100 cy/mm. To support the upper-end digital cinema industry specification for on-screen resolution, the ability to project discernable pixels with 4K horizontal resolution is required. To better achieve this goal, it would be preferable that the MTF at 100 cy/mm be improved to exceed 40%. Likewise, it would also be preferred to provide better MTF performance at 50 cy/mm (~75% or better, instead of 60-65%.) to provide improved image quality for 2K resolution images. At the same time, it would also be preferable to further reduce the susceptibility of the relay lens 250 and projection lens 270 to thermally induced stress birefringence, to provide more margin, as well as to better enable brighter screens (e.g., 20,000-60,000 lumens).

There are several potential approaches to achieving these goals, which can be applied either individually or in combination. Certainly, as discussed previously, strategic choices of select alternate glasses, such as LF-5 or S-NSL36, can help some lens elements significantly. The use of aspheric surfaces on one or more lens elements can also be very helpful. As another approach, the optical speed of the system can be increased, such that the projection lens 270 operates at F/2.5 or faster, so as to enhance the MTF performance. Although the projection lenses 270 are aberration limited, rather than diffraction limited, this can still provide some improvement. Increasing the system speed can also help reduce the thermally induced stress birefringence because the light will be spread over more glass area, thereby reducing the peak power densities. However, this approach can make the individual lens elements, as well as the lens assembly, more expensive and more difficult to design and fabricate.

It is also recognized that the lens housing 240, or more directly the lens elements themselves, can be cooled, either passively or actively, using heat sinks, conductive tapes, liquid cooling, passive or forced air, thermal-electric cooling devices, or other techniques, with the goal of reducing the effective thermal load on the lens elements, and thus the induced stress birefringence. Such cooling, if it is sufficiently effective and reliable, can change the glass choices for one or more lens elements. It is also recognized that the mounting of lens elements within the lens housing 240 needs to be done judiciously, so that thermal expansion of the lens elements against internal housing features does not cause stress birefringence from induced mechanical stress.

In considering image quality issues, it is noted that the MTF performance of the projection lens 270, including that of the third exemplary projection lens (FIG. 12A) is limited by the optical aberration known as primary axial color or longitudinal color. In a lens designed with primary axial color correction, the best focus plane for green light is offset from the best focus blue and red planes. That means that red and blue channels have planes of best focus that overlap at the same place in image space (at or near display surface 190), but they are both longitudinally shifted from the green channel's plane of best focus.

If the normal lens design rationale were followed, improved color correction can be obtained by designing the projection lens 270 as an apochromat, much as was done in the previously cited U.S. Pat. No. 5,172,275 to D. DeJager. Typically in lens design, secondary axial color is eliminated by designing lens assemblies with one or more lens elements consisting of an anomalous dispersion glasses such as the Schott PSK and NKZFS glass types. Unfortunately, these glasses have among the worst values for thermal stress birefringence susceptibility ($M_1 \sim 3.5 \times 10^{-6}$ W$^{-1}$), and thus trying to fix axial color with these glasses will significantly increase the stress birefringence at the same time. Schott PK52 and Schott FK51 also provide useful partial dispersions, and are nearly 10× better for thermal stress sensitivity ($M_1 \sim 0.36 \times 10^{-6}$ W$_{-1}$), but their locations on the glass chart (low indices ($n_d$) and high Abbe numbers ($v_d$) bring other compromises.

Alternately, as discussed in commonly assigned U.S. Pat. No. 6,317,268 to M. Harrigan, entitled "Movie Projection Lens," the inclusion of a diffractive optical element (DOE) is particularly useful for correcting color aberrations, including axial color (axial chromatic aberration). Diffractive optical elements are patterned with step structures that form thin phase elements and operate by means of interference and diffraction to effect light propagation. They can be formed on planar elements or curved lens surfaces. In the case of the present invention, one or more diffractive optical elements 350 can be provided within a projection lens 270 or the relay lens 250, such as at the exemplary positions 90 depicted in FIG. 6A. The use of diffractive optical elements can improve the image quality, and can also enable alternate glass selections, making it easier for the lens designer to use glasses with lower stress birefringence susceptibility (such as a weak-crown like Ohara SNSL36 or a weak-flint like Schott LF5) in key locations. However, diffractive optical elements can introduce flare light, thereby causing degradation in ANSI or in-frame contrast, so care is required.

Further consideration of the second exemplary projection lens 270 of FIG. 10A, which comprises only the very low stress birefringent PBH56 and fused silica glasses, together with the corresponding table in FIG. 11A, indicates that there is considerable room available to further reduce susceptibility to thermally induced stress birefringence if glass selections and design performance would allow it. As another approach, adding a polarization compensator 360 within projection lens 270, for example at position 90 of FIG. 4, can also be beneficial. In prior discussions, specifically with regard to the related patent by Aastuen et al. and FIG. 1B, the use of polarization compensators 360 was discussed in part. Within projector 101, polarization compensators typically reside within the modulation optical system 80, and provide polarization compensation to the spatial light modulators 170*r*, 170*g* and 170*b*, polarization beamsplitters 60, or both in combination. For example, in U.S. Pat. No. 6,909,473 to Mi et al., polarization compensation can be provided for both a vertically aligned LCD type modulator and a wire grid polarization beamsplitter. In the case of Aastuen et al., similar polarization compensation expands the list of candidate glasses for the substrate glass of a thin film, glass-embedded, polarization beamsplitter.

There are numerous examples of polarization compensators developed to enhance the polarization performance with LCDs, including those designed for vertically aligned or nematic LCDs. These compensators typically use polymer films to provide angular varying birefringence, structured in a spatially variant fashion, to affect polarization states in portions (that is, within certain spatial and angular areas) of the transiting light beam, without affecting the polarization states in other portions of the light beam. Alternately, as described in U.S. Pat. No. 7,170,574 to Tan et al., robust polarization compensators have been developed by creating form birefringent grating structures with dielectric thin film layers deposited on glass substrates. In general, the polarization compensators counteract the differential effects experienced by the polarization states of skew rays or oblique rays, which traverse different optical paths through birefringent materials, than do more normally incident rays.

In the instance of the present invention, the polarization compensator 360 does not reside in a modulation optical system 80, to adjust the polarization states of the traversing light beams 140 relative to a spatial light modulator 170 and a polarization beamsplitter 60. Instead, the polarization compensator can be provided at a position 90 within projection lens 270, and can provide polarization compensation for stress birefringence effects within the projection lens. In particular, and it can provide compensation for residual thermally induced stress birefringence. In this case, the compensator restores the polarization states or orientations that deviate from their incident conditions in accordance with the stress birefringence, such that they better resemble the incident states, and then provide the desired left-eye or right-eye polarization states to the viewers, who are wearing polarization sensitive glasses. The incident polarization states were, for example, largely defined in the illumination assembly 110, by the laser devices and the polarization switch 139. It should be understood that one or more polarization compensators 360 can also be provided within or about relay lens 250 to compensate for stress birefringence effects caused by that lens.

As shown in FIG. 4, polarization compensators 360 can be located at various exemplary positions 90 within the imaging lens 200, or at a position 90 proximate to both the dichroic combiner 165 and the relay lens 250. Polarization compensation can correct for polarization effects caused by multiple components, including the projection lens 270, the relay lens 250, and the dichroic combiner 165. Accordingly, the use of polarization compensators 360 can enable the projection lens 270 or relay lens 250 to be designed with a wider range of glasses than otherwise, as the effects of thermally induced stress birefringence are otherwise reduced. That can provide design freedom to further improve image quality.

Figure 17:
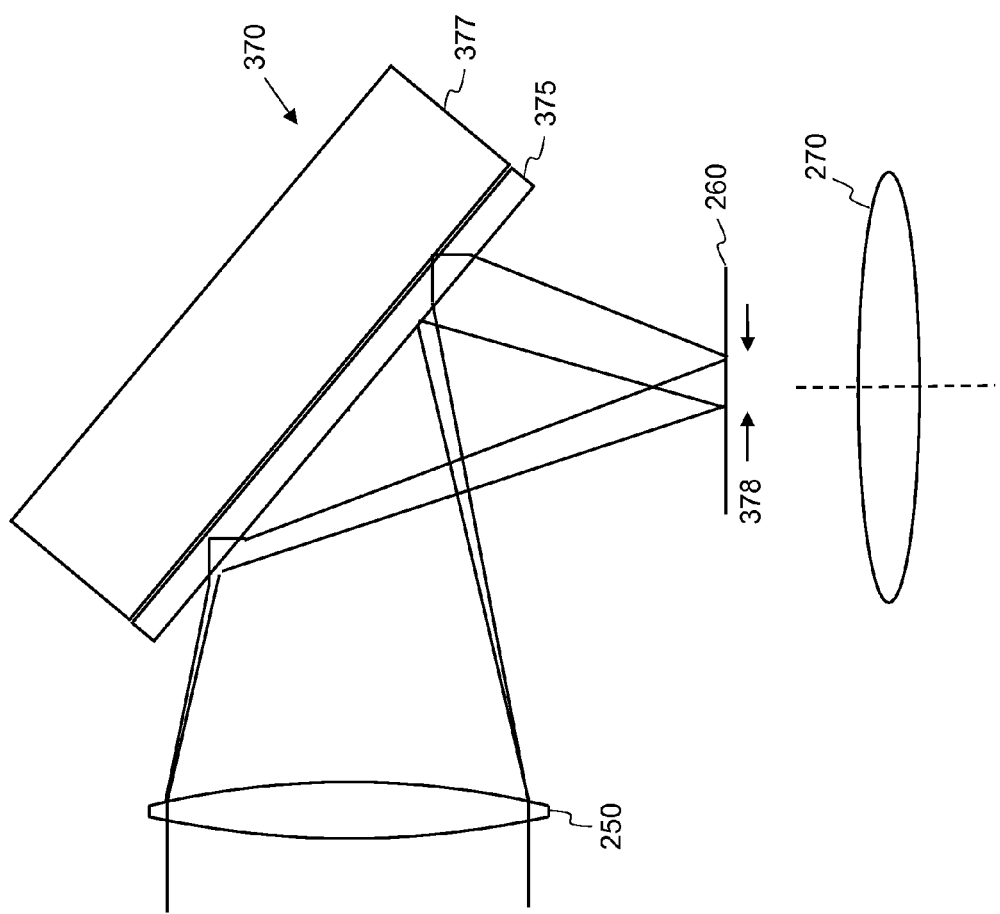
FIG. 17 depicts a method for reducing axial color while using a projection lens of the present invention.

Returning to the problematic issue of residual secondary axial color affecting the third exemplary projection lens (FIG. 12A), the red and blue channels have planes of best focus that overlap at the same place in image space (at or near display surface 190), but that are both longitudinally shifted from the green channel's plane of best focus. As the spatial light modulators 170 reside in different planes in FIG. 1, this effect can be reduced by adjusting the modulator positions, but with a resulting penalty of a small magnification difference. The color focus error is large enough that it can be noticed by a critical observer, and this problem can be exacerbated at higher resolutions. As another alternative to using polarization compensators 360 or diffractive optical elements 350, an additional optical element that increases the path of the red and blue light with respect to the green light can be used. This will effectively place all three colors at a common focus at the image plane. A simple way to accomplish this makes use of a first surface mirror 370, as shown in FIG. 17, where green light is reflected from the top layers of a multilayer coating 375 while transmitting the blue and red light. The red and blue light is then reflected from layers that are deeper into the multilayer dielectric coating 375 such that the increased travel distance to this lower layer is the same as the amount of secondary axial color in the projection lens 270.

First surface mirror 370 is shown in exaggerated fashion, as the amount of secondary axial color in the projection lens 270 is about 50 microns in object space, so the depth of the coating layers between the top and bottom will be less than that because the red and blue light experience two passes through the material indices of the coating layers (reduced OPD). The green and red/blue images are also shifted laterally from one another by a small image shift 378 at the intermediate image 260, but this can be adjusted by repositioning the spatial light modulators 170 appropriately.

It is noted that this concept can be extended to correct for primary axial color also, by having three reflective layers formed on the substrate 377, one for each color. This approach can be used to correct for the relay lens 250, the projection lens 270, or both in combination. Again, the thicknesses would be adjusted to compensate for the longitudinal shifts of the colors.

Figure 16:
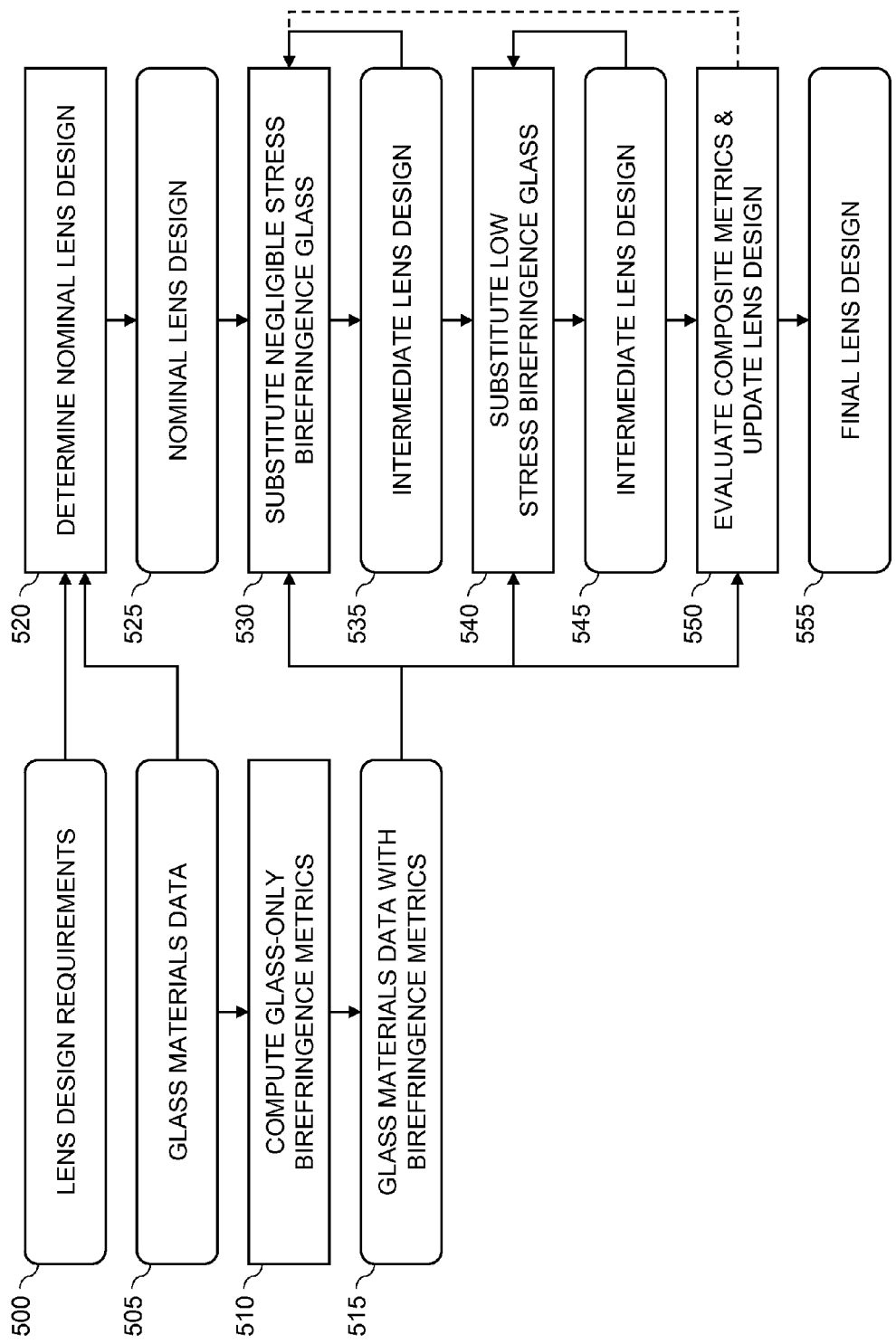
FIG. 16 is a flowchart illustrating another method for designing imaging lens with reduced thermal stress birefringence susceptibility according to an embodiment of the present invention.

The first surface mirror 370 is shown at 45 degrees in FIG. 16, but the idea works for correcting axial chromatic aberrations with any tilt angle as long as the light paths are not blocked by any physical obstructions. Additionally, the first surface mirror 370 can be angularly adjusted to change the amount of color correction introduced. If image shift is a problem, a two reflection arrangement can be used to counteract the shift, for example by positioning two reflective surfaces, each with a corrective coating, in a penta prism type configuration.

The present invention provides a basis for understanding thermally induced stress birefringence, including numeric metrics $M_1$ and $M_2$ (the latter accounting for the applied optical loading), an identification of glasses having comparatively negligible, low, moderate, or high values of thermal stress susceptibility (as measured by $M_1$), and supporting design principles and methods for selectively using these glasses for different lens elements within lens assemblies during lens design efforts. The present invention has also provided practical design examples of imaging lenses having differing levels of thermal stress susceptibility and imaging performance, and practical evidence of their impact on improved projector performance. In particular, a set of thermal stress susceptibility thresholds has been identified, which are used to designate negligible stress glasses ($0.1 \times 10^{-6}$ $W^{-1} \leq M_1$), low stress glasses ($0.1 \times 10^{-6}$ $W^{-1} \leq M_1 \leq 0.8 \times 10^{-6}$ $W^{-1}$), and moderate stress glasses ($0.8 \times 10^{-6}$ $W^{-1} \leq M_1 \leq 1.6 \times 10^{-6}$ $W^{-1}$), each of which include a set of glasses with valuable properties for lens design. It should be understood that within the spirit and scope of the present invention, that these thresholds are somewhat arbitrary. For example, a glass (perhaps not yet developed) having a value of $M_1 = 0.12 \times 10^{-6}$ $W^{-1}$ may be considered to have either a negligible or low thermal stress birefringence sensitivity. Indeed, the perception thereof may depend on the application or the lens designers involved. Likewise, the other thresholds, for low $M_1 \leq 0.8 \times 10^{-6}$ $W^{-1}$), and moderate ($M_1 \leq 1.6 \times 10^{-6}$ $W^{-1}$) thermal stress birefringence glasses are useful and effective, but again are somewhat arbitrary. For example, the low threshold could be set at $M_1 \leq 0.9 \times 10^{-6}$ $W^{-1}$ or $M_1 \leq 1.0 \times 10^{-6}$ $W^{-1}$, and the moderate threshold could be set at $M_1 \leq 1.8 \times 10^{-6}$ $W^{-1}$.

The invention has been described in detail with particular reference to certain preferred embodiments thereof, but it will be understood that variations and modifications can be effected within the scope of the invention. It is emphasized that the apparatus or methods described herein can be embodied in a number of different types of systems, using a wide variety of types of supporting hardware and software. It should also be noted that drawings are not drawn to scale, but are illustrative of key components and principles used in these embodiments.

| PARTS LIST | |
|---|---|
| 50 | light source |
| 55 | prism assembly |
| 60 | polarization beamsplitter |
| 65 | X-prism |
| 80 | modulation optical system |
| 90 | position |
| 100 | projector |
| 101 | projector |
| 102 | projector |
| 110 | Illumination assembly |
| 110r | Illumination assembly |
| 110g | Illumination assembly |
| 100b | Illumination assembly |
| 115 | light source assembly |
| 120 | laser array |
| 120' | laser array |
| 122 | laser emitter |
| 125 | laser combining assembly |
| 127 | faceted prism |
| 130 | aperture |
| 135 | illumination beam combiner |
| 137 | half wave plate |
| 139 | polarization switch |
| 140 | light beam |
| 140' | individual light beam |

-continued

| PARTS LIST | |
|---|---|
| 145 | optical axis |
| 150 | illumination lens |
| 155 | light integrator |
| 160 | mirror |
| 165 | dichroic combiner |
| 166 | first combiner |
| 167 | second combiner |
| 170 | spatial light modulator |
| 170r | spatial light modulator |
| 170g | spatial light modulator |
| 170b | spatial light modulator |
| 180 | despeckler |
| 190 | display surface |
| 195 | object surface |
| 200 | imaging lens |
| 205 | lens element |
| 206a | positive lens element |
| 206b | negative lens element |
| 208 | group of lens elements |
| 210 | glass chart |
| 215 | crown glasses |
| 217 | flint glasses |
| 220 | crown lens element |
| 222 | flint lens element |
| 230 | aperture stop |
| 235 | optical rays |
| 240 | lens housing |
| 245 | working distance |
| 250 | relay lens |
| 260 | intermediate image |
| 270 | projection lens |
| 300 | modulation transfer function (MTF) plot |
| 320 | light intensity distribution |
| 321 | slice positions |
| 322 | cross-sectional profiles |
| 323 | light intensity distribution |
| 324 | slice positions |
| 325 | cross-sectional profiles |
| 326 | light intensity distribution |
| 327 | light intensity distribution |
| 328 | light intensity distribution |
| 350 | diffractive optical element |
| 360 | polarization compensator |
| 370 | first surface mirror |
| 375 | multilayer coating |
| 377 | substrate |
| 378 | image shift |
| 400 | lens element |
| 401 | lens element |
| 402 | lens element |
| 403 | lens element |
| 404 | lens element |
| 405 | lens element |
| 410 | lens element |
| 411 | lens element |
| 412 | lens element |
| 413 | lens element |
| 414 | lens element |
| 415 | lens element |
| 416 | lens element |
| 420 | lens element |
| 421 | lens element |
| 422 | lens element |
| 423 | lens element |
| 424 | lens element |
| 425 | lens element |
| 426 | lens element |
| 427 | lens element |
| 428 | fused silica lens element |
| 429 | PBH56 lens element |
| 430 | lens element |
| 431 | lens element |
| 432 | lens element |
| 433 | lens element |
| 434 | lens element |
| 435 | lens element |
| 436 | lens element |
| 437 | fused silica lens element |

PARTS LIST

| | |
|---|---|
| 438 | SF-57 lens element |
| 440 | lens element |
| 441 | lens element |
| 442 | lens element |
| 443 | lens element |
| 444 | lens element |
| 445 | lens element |
| 446 | fused silica lens element |
| 447 | PBH56 lens element |
| 448 | S-LAL18 lens element |
| 450 | lens element |
| 451 | lens element |
| 452 | lens element |
| 453 | lens element |
| 454 | lens element |
| 455 | lens element |
| 456 | lens element |
| 457 | PBH56 lens element |
| 458 | S-LAL18 lens element |
| 459 | fused silica lens element |
| 500 | lens design requirements |
| 505 | glass materials data |
| 510 | compute glass-only birefringence metrics step |
| 515 | glass materials data with birefringence metrics |

The invention claimed is:

1. A lens system having reduced susceptibility to thermally-induced stress birefringence for imaging an object plane to an image plane; comprising:
an aperture stop positioned between the object plane and the image plane;
a first group of lens elements located on the object plane side of the aperture stop; and
a second group of lens elements located on the image plane side of the aperture stop;
wherein the lens elements immediately adjacent to the aperture stop, on both the object plane side and the image plane side, are fabricated using glasses having a negligible susceptibility to thermal stress birefringence as characterized by a thermal stress birefringence metric; and
wherein the other lens elements in the first or second groups of lens elements, that are not the lens elements immediately adjacent to the aperture stop, are fabricated using glasses having a negligible or a moderate susceptibility to thermal stress birefringence as characterized by the thermal stress birefringence metric, at least one of the other lens elements in the first or second groups of lens elements, that are not the lens elements immediately adjacent to the aperture stop, being fabricated using a glass having a moderate susceptibility to thermal stress birefringence;
wherein the thermal stress birefringence metric has the form:

$$M_1 = \rho \kappa \alpha E / (K \cdot (1-\mu)),$$

where $\rho$ is a coefficient of thermal expansion of the glass, $\kappa$ is a stress optical coefficient of the glass, $\alpha$ is a light absorption coefficient of the glass, E is a modulus of elasticity of the glass, K is a thermal conductivity of the glass, and $\mu$ is a Poisson's ratio of the glass, and wherein the glasses having the negligible susceptibility to thermal stress birefringence satisfy the condition that $M_1 \leq 0.1 \times 10^{-6}$ $W^{-1}$ and the glasses having the moderate susceptibility to thermal stress birefringence satisfy the condition that $0.1 \times 10^{-6}$ $W^{-1} \leq M_1 < 1.60 \times 10^{-6}$ $W^{-1}$.

2. The lens system of claim 1 wherein the thermal stress birefringence metric further includes at least one additional factor relating to an optical power density in the glass, a thickness of the lens element or a clear aperture size of the lens element.

3. The lens system of claim 1 wherein the other lens elements in the first or second groups of lens elements, that are not the lens elements immediately adjacent to the aperture stop are fabricated using glasses that satisfy the condition that $M_1 \leq 0.80 \times 10^{-6}$ $W^{-1}$.

4. The lens system of claim 1 wherein at least one of the other lens elements in the first or second groups of lens elements, that are not the lens elements immediately adjacent to the aperture stop is fabricated using a glass where $0.8 \times 10^{-6}$ $W^{-1} \leq M_1 \leq 1.60 \times 10^{-6}$ $W^{-1}$.

5. The lens system of claim 1 wherein the glasses used to fabricate the lens elements are selected based, at least in part, on evaluating an intensity-weighted thermal stress birefringence metric:

$$M_2 = I_0 L M_1$$

where $I_0$ is an optical power density in the glass, and L is a thickness of the lens element.

6. The lens system of claim 1 where the glasses used to fabricate the lens elements are also selected for properties that relate to achieving adequate image quality performance, including refractive index and chromatic dispersion properties.

7. The lens system of claim 1 wherein one or more surfaces of one or more of the lens elements have an aspheric surface profile.

8. The lens system of claim 1 wherein the lens system further includes a diffractive optical element or a polarization compensator.

9. The lens system of claim 1 wherein the lens system further includes mirror with a multi-layer dielectric coating which differentially alters a path length for different wavelength bands, thereby reducing chromatic aberrations.

10. The lens system of claim 1 wherein the lens system has the form of a classical double Gauss lens.

11. The lens system of claim 1 wherein the lens system has the form of a classical double Gauss lens, but where one of the lens elements adjacent to the aperture stop is fabricated using a crown glass.

12. The lens system of claim 1 wherein the lens system is used to image polarized light.

13. The lens system of claim 1 wherein the lens system is a relay lens or a projection lens for a digital projection system.

14. The lens system of claim 1 wherein the lens system is an imaging lens system or an illumination lens system.

* * * * *